US011049110B2

(12) United States Patent
Ver Hulst et al.

(10) Patent No.: US 11,049,110 B2
(45) Date of Patent: Jun. 29, 2021

(54) HEALTHCARE TRANSACTION FACILITATION PLATFORM APPARATUSES, METHODS AND SYSTEMS

(71) Applicant: Premier Healthcare Exchange, Inc., Bedminster, NJ (US)

(72) Inventors: Jay Ver Hulst, Belleair, FL (US); Todd Roberti, Boonton, NJ (US); Yusuf Qasim, Wall, NJ (US)

(73) Assignee: Zelis Payments, LLC, Clearwater, FL (US)

( * ) Notice: Subject to any disclaimer, the term of this patent is extended or adjusted under 35 U.S.C. 154(b) by 327 days.

(21) Appl. No.: 14/561,173

(22) Filed: Dec. 4, 2014

(65) Prior Publication Data

US 2015/0120561 A1    Apr. 30, 2015

Related U.S. Application Data

(63) Continuation-in-part of application No. 13/495,056, filed on Jun. 13, 2012, now abandoned.
(Continued)

(51) Int. Cl.
*G06Q 20/40* (2012.01)
*G06Q 40/02* (2012.01)
*G06Q 10/10* (2012.01)

(52) U.S. Cl.
CPC ....... *G06Q 20/4018* (2013.01); *G06Q 20/409* (2013.01); *G06Q 40/02* (2013.01); *G06Q 10/10* (2013.01)

(58) Field of Classification Search
CPC ...... G06Q 20/02; G06Q 20/042; G06Q 20/10; G06Q 20/102; G06Q 20/227; G06Q 20/24;
(Continued)

(56) References Cited

U.S. PATENT DOCUMENTS 5,914,472 A * 6/1999 Foladare ............... G06Q 20/04
235/380
5,930,777 A * 7/1999 Barber .................. G06Q 20/02
705/17
(Continued)

*Primary Examiner* — Slade E Smith
(74) *Attorney, Agent, or Firm* — Hanchuk Kheit LLP; Walter G Hanchuk

(57) ABSTRACT

The Healthcare Transaction Facilitation Platform Apparatuses, Methods and Systems ("HTFP") transforms payment file and EOP data inputs via HTFP components into ACH request, card generation request, card payment request, ACH CCD+ request, and EOP file outputs. A card generation request associated with a payment to a provider may be obtained via the card generating component via a network. A payment amount and a re-association trace number may be determined by parsing the card generation request. A card for the payment may be generated and the card may be associated with the payment amount and the re-association trace number. A card payment processing request associated with the card may be sent. The card payment processing request may be obtained via the card payment processing component. A Level 3 card payment request that includes the payment amount and the re-association trace number may be generated. A payment request route associated with the card may be determined and the Level 3 card payment request may be pushed via the payment request route.

21 Claims, 36 Drawing Sheets

EXEMPLARY HTFP CARD PAYMENT PROCESSING (CPP) COMPONENT

Related U.S. Application Data

(60) Provisional application No. 61/912,759, filed on Dec. 6, 2013, provisional application No. 62/055,556, filed on Sep. 25, 2014, provisional application No. 61/498,021, filed on Jun. 17, 2011, provisional application No. 61/604,722, filed on Feb. 29, 2012.

(58) Field of Classification Search
CPC .............. G06Q 20/40; G06Q 20/4018; G06Q 20/4037; G06Q 20/409; G06Q 30/04; G06Q 40/00; G06Q 40/02; G06Q 40/025; G06Q 40/04; G06Q 50/22; G07F 7/08
USPC .......................................................... 705/35
See application file for complete search history.

(56) References Cited

U.S. PATENT DOCUMENTS

| | | | | |
|---|---|---|---|---|
| 5,946,669 | A * | 8/1999 | Polk | G06Q 20/02 705/38 |
| 5,950,179 | A * | 9/1999 | Buchanan | G06Q 20/4037 705/35 |
| 5,991,750 | A * | 11/1999 | Watson | G06Q 20/40 705/44 |
| 6,000,832 | A * | 12/1999 | Franklin | G06Q 20/02 235/379 |
| 6,021,943 | A * | 2/2000 | Chastain | G06Q 20/227 235/379 |
| 6,088,682 | A * | 7/2000 | Burke | G06Q 20/04 235/375 |
| 6,105,008 | A * | 8/2000 | Davis | G06Q 20/02 235/375 |
| 6,282,522 | B1 * | 8/2001 | Davis | G06Q 20/02 235/375 |
| 6,327,578 | B1 * | 12/2001 | Linehan | G06Q 20/02 705/65 |
| 6,456,984 | B1 * | 9/2002 | Demoff | G06Q 20/02 705/38 |
| 6,876,971 | B1 * | 4/2005 | Burke | G06Q 20/04 705/14.1 |
| 7,225,155 | B1 * | 5/2007 | Polk | G06Q 10/10 705/35 |
| 7,685,067 | B1 * | 3/2010 | Britto | G06Q 30/0601 705/40 |
| 7,840,486 | B2 * | 11/2010 | D'Agostino | G06Q 20/02 705/44 |
| 8,392,208 | B1 * | 3/2013 | Klieman | G06Q 10/10 705/2 |
| 8,494,938 | B1 * | 7/2013 | Kazenas | G06Q 40/08 705/35 |
| 2002/0016745 | A1 * | 2/2002 | Kuwahara | G06Q 20/027 705/26.81 |
| 2002/0062224 | A1 * | 5/2002 | Thorsen | G06Q 40/02 705/2 |
| 2002/0120563 | A1 * | 8/2002 | McWilliam | G06Q 20/28 705/39 |
| 2002/0194027 | A1 * | 12/2002 | Smith | G06Q 40/08 705/2 |
| 2003/0028481 | A1 * | 2/2003 | Flitcroft | G07F 19/00 705/39 |
| 2003/0061171 | A1 * | 3/2003 | Gilbert | G06Q 20/367 705/65 |
| 2004/0030647 | A1 * | 2/2004 | Hansen | G06Q 30/0277 705/40 |
| 2004/0148255 | A1 * | 7/2004 | Beck | G06Q 40/12 705/39 |
| 2004/0215560 | A1 * | 10/2004 | Amalraj | G06Q 20/102 705/40 |
| 2004/0249854 | A1 * | 12/2004 | Barnes-Leon | G06Q 10/06 |
| 2005/0137972 | A1 * | 6/2005 | Krumlauf | G06Q 20/10 705/40 |
| 2005/0218213 | A1 * | 10/2005 | Rasnake | G06Q 50/10 235/380 |
| 2005/0252961 | A1 * | 11/2005 | Rasti | G06Q 20/385 235/380 |
| 2006/0022033 | A1 * | 2/2006 | Smets | G06Q 20/4018 235/380 |
| 2006/0085337 | A1 * | 4/2006 | Conforti | G06Q 20/40 705/40 |
| 2006/0253390 | A1 * | 11/2006 | McCarthy | G06Q 20/20 705/39 |
| 2006/0265326 | A1 * | 11/2006 | Barrett | G06Q 20/102 705/40 |
| 2007/0007335 | A1 * | 1/2007 | Cracchiolo | G06Q 40/00 235/380 |
| 2007/0016526 | A1 * | 1/2007 | Hansen | G06Q 20/108 705/40 |
| 2007/0136211 | A1 * | 6/2007 | Brown | G06Q 20/385 705/75 |
| 2007/0175982 | A1 * | 8/2007 | Bonalle | G06Q 20/26 235/380 |
| 2007/0185795 | A1 * | 8/2007 | Petrime | G06Q 40/025 705/35 |
| 2007/0228146 | A1 * | 10/2007 | Rogers | G06Q 10/10 235/379 |
| 2007/0265887 | A1 * | 11/2007 | McLaughlin | G16H 40/20 705/4 |
| 2007/0282741 | A1 * | 12/2007 | Kumar | G06Q 30/06 705/40 |
| 2007/0294168 | A1 * | 12/2007 | King | G06Q 50/18 705/44 |
| 2008/0077438 | A1 * | 3/2008 | Yanak | G06Q 10/00 705/2 |
| 2008/0099556 | A1 * | 5/2008 | Park | G06K 19/07345 235/382.5 |
| 2008/0162313 | A1 * | 7/2008 | Patton | G06Q 20/04 705/35 |
| 2008/0219421 | A1 * | 9/2008 | Enriquez | G06Q 20/322 379/114.21 |
| 2009/0076954 | A1 * | 3/2009 | Carmody | G06Q 20/10 705/40 |
| 2009/0125429 | A1 * | 5/2009 | Takayama | G06Q 20/327 705/35 |
| 2009/0173782 | A1 * | 7/2009 | Muscato | G06Q 20/40 235/379 |
| 2009/0177579 | A1 * | 7/2009 | Ling | G06Q 20/10 705/39 |
| 2010/0088204 | A1 * | 4/2010 | Nambiar | G06K 15/1882 705/30 |
| 2010/0088207 | A1 * | 4/2010 | McLaughlin | G06Q 30/04 705/34 |
| 2010/0100480 | A1 * | 4/2010 | Altman | G06Q 20/102 705/40 |
| 2010/0145848 | A1 * | 6/2010 | Robbins, Jr. | G06Q 20/10 705/39 |
| 2010/0250376 | A1 * | 9/2010 | Nandiraju | G06Q 20/40 705/17 |
| 2010/0274719 | A1 * | 10/2010 | Fordyce, III | G06Q 20/40 705/44 |
| 2011/0042456 | A1 * | 2/2011 | Masaryk | G06Q 20/343 235/380 |
| 2011/0093387 | A1 * | 4/2011 | Fuerstenberg | G06Q 20/14 705/40 |
| 2011/0119077 | A1 * | 5/2011 | Gice | G06Q 10/10 705/2 |
| 2011/0166872 | A1 * | 7/2011 | Cervenka | G06Q 20/20 705/2 |
| 2011/0218838 | A1 * | 9/2011 | Byce | G06Q 30/02 705/7.31 |
| 2011/0225058 | A1 * | 9/2011 | Patterson | G06Q 20/40 705/17 |
| 2011/0238553 | A1 * | 9/2011 | Raj | G06Q 20/405 705/37 |
| 2011/0258004 | A1 * | 10/2011 | Dean | G06Q 40/08 705/4 |
| 2011/0302080 | A1 * | 12/2011 | White | G06Q 40/02 705/39 |
| 2012/0036042 | A1 * | 2/2012 | Graylin | G06Q 20/322 705/26.41 |

(56) References Cited

U.S. PATENT DOCUMENTS

| | | | | |
|---|---|---|---|---|
| 2012/0123940 A1* | 5/2012 | Killian | ............... | G06Q 20/40 |
| | | | | 705/44 |
| 2012/0136790 A1* | 5/2012 | Templeton | ............ | G06Q 20/10 |
| | | | | 705/44 |
| 2012/0233073 A1* | 9/2012 | Salmon | ............... | G06Q 20/381 |
| | | | | 705/44 |
| 2012/0253852 A1* | 10/2012 | Pourfallah | ........... | G06Q 20/405 |
| | | | | 705/4 |
| 2012/0253989 A1* | 10/2012 | Otruba | ............... | G06Q 20/351 |
| | | | | 705/27.1 |
| 2012/0290375 A1* | 11/2012 | Truong | ............ | G06Q 30/0207 |
| | | | | 705/14.17 |
| 2012/0303425 A1* | 11/2012 | Katzin | ............... | G06Q 20/32 |
| | | | | 705/14.4 |
| 2013/0166332 A1* | 6/2013 | Hammad | ............. | G06Q 20/12 |
| | | | | 705/5 |
| 2014/0074497 A1* | 3/2014 | Griffin | ............... | G06Q 10/10 |
| | | | | 705/2 |
| 2017/0039549 A1* | 2/2017 | Quentin | ............... | G06Q 20/10 |

* cited by examiner

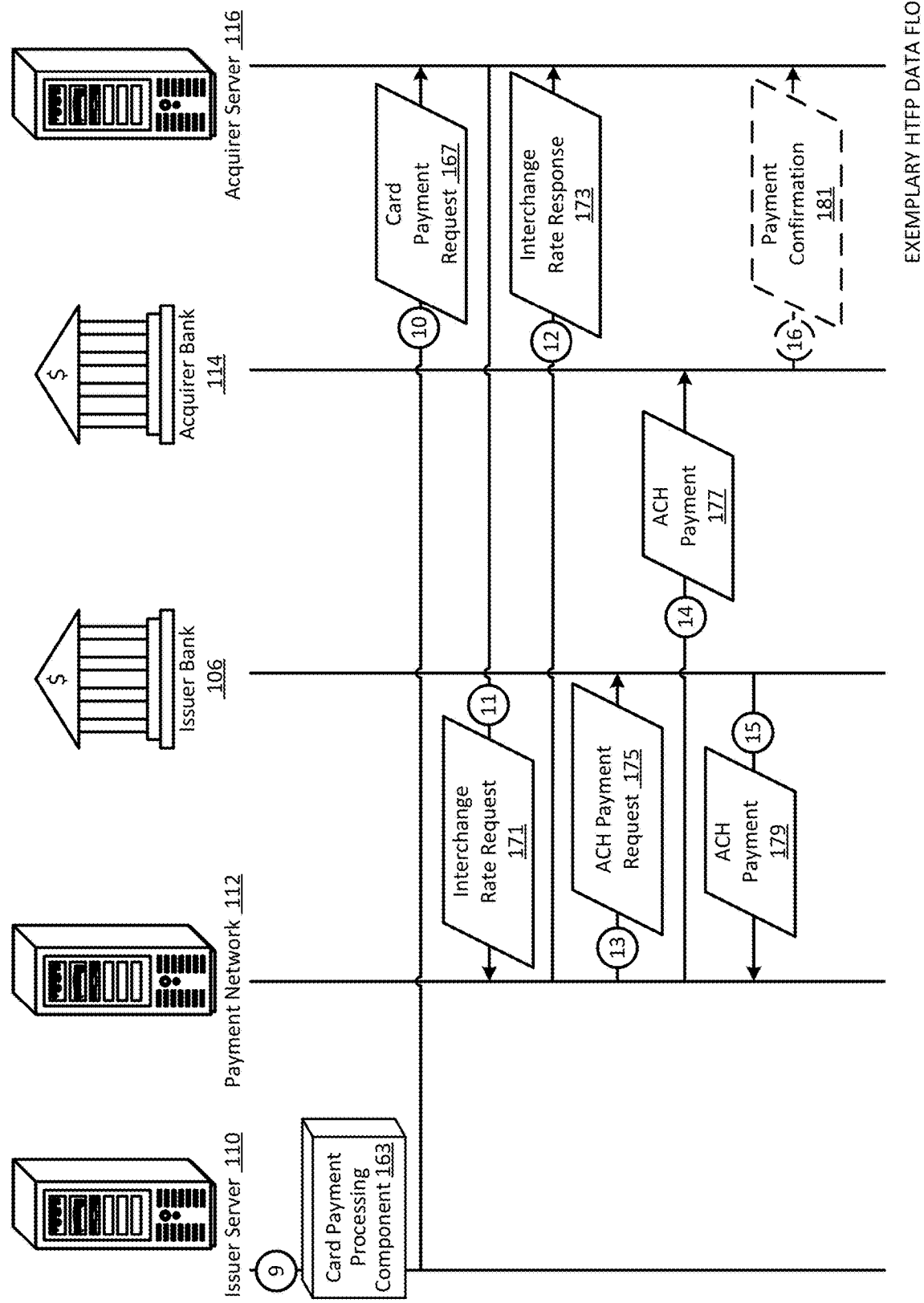
FIGURE 1B1

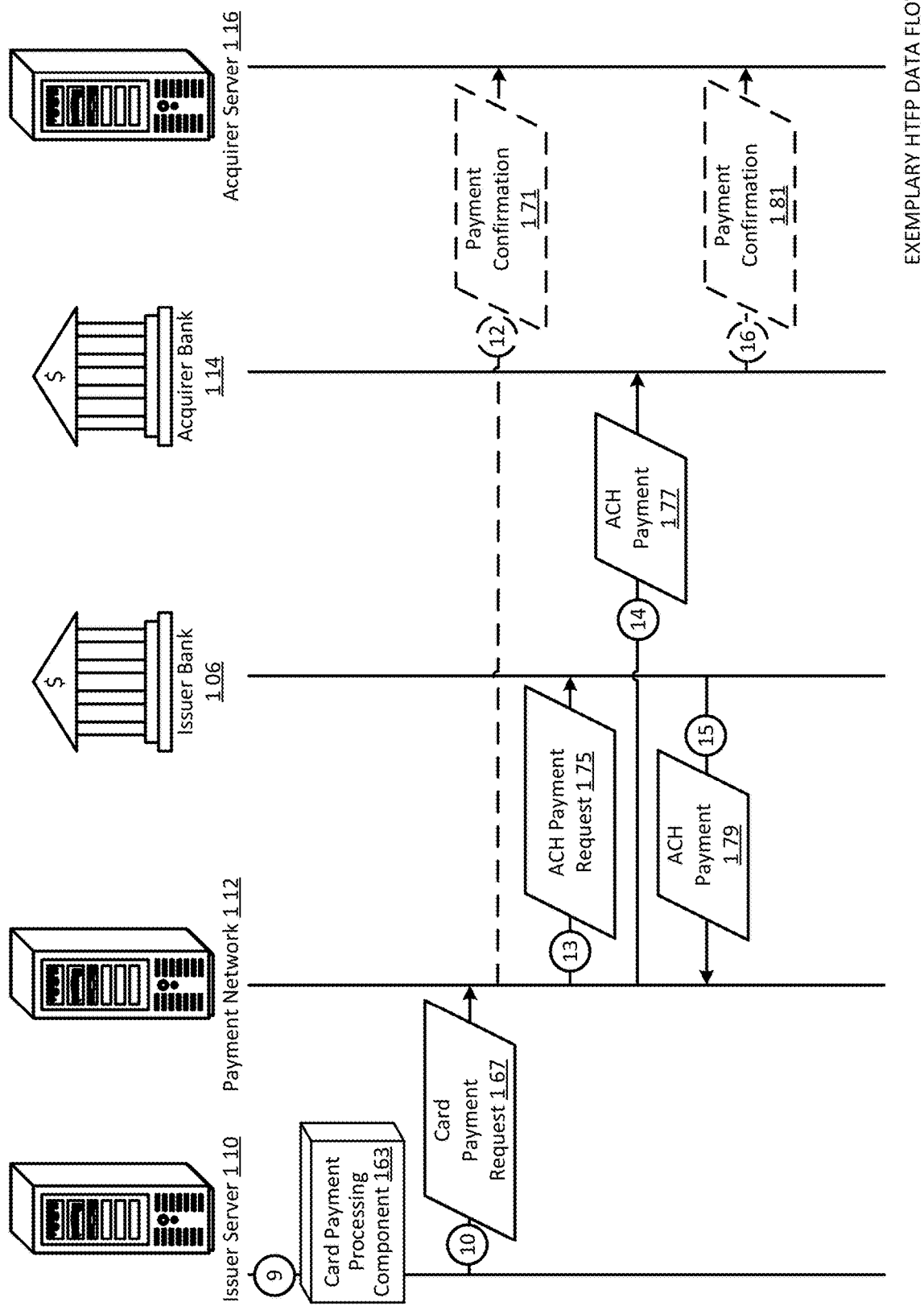

EXEMPLARY HTFP PAYMENT FILE PROCESSING (PFP) COMPONENT

EXEMPLARY HTFP CARD GENERATING (CG) COMPONENT

EXEMPLARY HTFP CARD PAYMENT PROCESSING (CPP) COMPONENT

EXEMPLARY HTFP PAYMENT SETTLING (PS) COMPONENT

EXEMPLARY HTFP EOP FILE DELIVERING (EFD) COMPONENT

FIGURE 7

```
700
0001|006A3521488868300|006A3521488868300|4900.42||122227522|1194752222|THE
NEWBURYPORT BANK|||NEWBURYPORT|MA|||E|JOHN DOE|14 YOUR ROAD||MERRIMACK|
NH|03054||Payment0002|006A3521488868300|006A3521488868300|||JOHN DOE||HHA350104
|JOHN DOE|14 YOUR ROAD||MERRIMACK|NH|03054||||11111111|11134649|ABC HEALTHCARE
PROVIDER|1500 MAINT ST.||WESTBOROUGH|MA|222222222|006A35||XYZ CORP|560.40|.00|.00|
.00|.00|.00|.00|.00|.00|4900.42|.00|1||||||10072014|0003|006A3521488868300|006A3521488
868300|1|10052014|10112014||||560.40|.00|.00|.00|.00|.00|.00|.00|.00|560.40|.00|||HC
0003|006A3521488868300|006A3521488868300|2|10052014|10112014||||.00|.00|.00|.00|.00|42.
87|.00|42.87|.00|-42.87|42.87|||HC0003|006A3521488868300|006A3521488868300|3|10052014
|10112014||||.00|.00|.00|.00|.00|84.06|.00|84.06|.00|-84.06|84.06|||HC
```

745 → 775 765

EXEMPLARY HTFP PAYMENT FILE SCREENSHOT

EXEMPLARY HTFP CARD GENERATION REQUEST SCREENSHOT

FIGURE 9

ACH CCD+ Format [900]

[905]

6221222275221194752222    0000490043529222    ABC Healthcare Provider 1101000222229641
705TRN*1*2262064*1452579291*123456789\                                    00012229641

[945] [965]

[925]
TRN – Re-association Trace Number

| | |
|---|---|
| Record Type Code: | "7" |
| Addenda Type Code: | "05" |
| TRN Header: | "TRN" |
| TRN Separator: | "*" |
| TRN Trace Type Code (TRN01): | "1" |
| TRN Separator: | "*" |
| [930] TRN EFT Trace Number [Payment ID] (TRN02): | "2262064" |
| TRN Separator: | "*" |
| [935] TRN Payer Identifier [Tax ID] (TRN03): | "1452579291" |
| TRN Separator: | "*" |
| (Optional) TRN Originating Company Supplemental Code (TRN04): | "123456789" |
| TRN Terminator: | "\" |

EXEMPLARY HTFP ACH CCD+ PAYMENT REQUEST SCREENSHOT

EXEMPLARY HTFP EOP FILE SCREENSHOT

FIGURE 13

CREATING RELOADABLE CARD UNIQUENESS

*Traditionally a "Single Use" card is used so that if the provider DOES NOT take off all the funds, because the card number is tied to that payment, it is known which Health Plan to return the unused funds to.* We have modified a "Reloadable Card" to accomplish this by adding ...

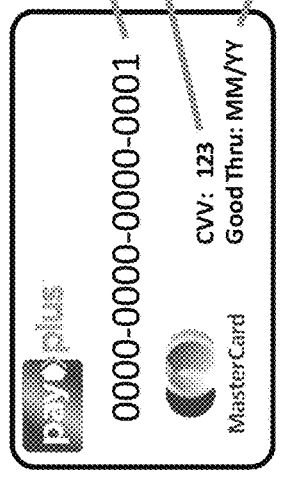

➢ The 16 digit Card number ... plus the

➢ Three digit CVV which would increment for each payment so that in combination with the card number, we are processing on 19 digits, plus the ...

➢ Date may also be incremented by month and then year to create additional uniqueness to the card number

Card Number is Processed Under:
0000-0000-0000-0001-123-MMYY

EXEMPLARY HTFP ALTERNATIVE EMBODIMENT

EXEMPLARY HTFP ALTERNATIVE EMBODIMENT

EXEMPLARY HTFP ALTERNATIVE EMBODIMENT

CCP = Credit Card Processor

HEALTHCARE TRANSACTION FACILITATION PLATFORM APPARATUSES, METHODS AND SYSTEMS

PRIORITY CLAIM

Applicant hereby claims benefit to priority under 35 USC § 119 as a non-provisional conversion of: U.S. provisional patent application Ser. No. 61/912,759, filed Dec. 6, 2013, entitled "Methods and Systems for Paying Healthcare Providers Using Multi-use Credit Cards and Push Payment Processing Techniques".

Applicant hereby claims benefit to priority under 35 USC § 119 as a non-provisional conversion of: U.S. provisional patent application Ser. No. 62/055,556, filed Sep. 25, 2014, entitled "Healthcare Transaction Facilitation Platform Apparatuses, Methods And Systems".

Applicant hereby claims benefit to priority under 35 USC § 120 as a continuation-in-part of: U.S. patent application Ser. No. 13/495,056, filed Jun. 13, 2012, entitled "Systems and Methods for Managing Payments and Related Payment Information for Healthcare Providers"; and which in turn claims benefit to priority under 35 USC § 119 as a non-provisional conversion of: U.S. provisional patent application Ser. No. 61/498,021, filed Jun. 17, 2011, entitled "System and Method for Payment Facilitation," and claims benefit to priority under 35 USC § 119 as a non-provisional conversion of: U.S. provisional patent application Ser. No. 61/604,722, filed Feb. 29, 2012, entitled "System and Methods for Managing Payments for Medical Services and Providing Payment Information."

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address payment platforms, and more particularly, include Healthcare Transaction Facilitation Platform Apparatuses, Methods and Systems.

BACKGROUND

Medical service providers are often paid for their services by payors other than a patient. For example, insurance companies, self-funded corporations, unions, and other third-party payors may adjudicate claims in accordance with a plan of benefits for their plan members (the insured patient). Payment from patients is typically accepted in the form of cash, check, or credit/debit card.

BRIEF DESCRIPTION OF THE DRAWINGS

Appendices and/or drawings illustrating various, non-limiting, example, innovative aspects of the Healthcare Transaction Facilitation Platform Apparatuses, Methods and Systems (hereinafter "HTFP") disclosure, include:

FIGS. 1A-1C show a datagraph diagram illustrating embodiments of a data flow for the HTFP;

FIG. 7 shows a screenshot diagram illustrating embodiments of a payment file for the HTFP;

FIG. 9 shows a screenshot diagram illustrating embodiments of an ACH CCD+ payment request for the HTFP;

FIGS. 12-33 show block diagrams illustrating alternative embodiments for the HTFP;

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Healthcare Transaction Facilitation Platform Apparatuses, Methods and Systems (hereinafter "HTFP") transforms payment file and EOP data inputs, via HTFP components (e.g., PFP, CG, CPP, PS, EFD, etc.), into ACH request, card generation request, card payment request, ACH CCD+ request, and EOP file outputs. The HTFP components, in various embodiments, implement advantageous features as set forth below.

INTRODUCTION

The HTFP facilitates payments between a payor and a provider. Doctors, dentists, and other medical service providers receive checks and other payments and may identify payments in an office practice management system. Such providers may also receive an explanation of benefits or explanation of payment which may provide information allowing them to apply the payment to an insured patient's account. Providers may accept payment from patients by credit card or debit card (such as VISA™, Mastercard™ and AmericanExpress™) using credit card machines or terminals which are used to transfer funds from a bank associated with the patient's card or acquirer bank to a merchant account associated with the particular machine/terminal. The In one embodiment, the HTFP specifies that, upon request by a provider, a payor should comply with an HTFP payment process, which in one embodiment, may be made compatible with the Patient Protection and Affordable Care Act (ACA). This may include providing an Electronic Funds Transfer (EFT) payment as well as a compliant Explanation of Payment (EOP) data file (e.g., an 835 data file), and utilizing a re-association trace number (TRN) to link the EFT payment and the EOP data file. The HTFP Automated Clearinghouse (ACH) as the EFT payment transaction type and specified ACH CCD+ format may be used to transfer the TRN when making a payment. It should be noted that in one embodiment, that the CCD+ format may note that the transaction is healthcare related (e.g., having a NACHA compliant entry where the CCD entry will include the value of "HCCLAIMPMT").

In one embodiment, the HTFP processes card payments at Level 3 and makes payments using ACH CCD+ format to make card payments compatible with ACA payment forms. In another embodiment, the HTFP pushes payments so that a provider does not have to access the provider's card machine to receive payments. In yet another embodiment, the HTFP may facilitate the use of a reloadable card compliant which the HTFP makes compatible with ACA payment forms.

HTFP

Figure 1A:
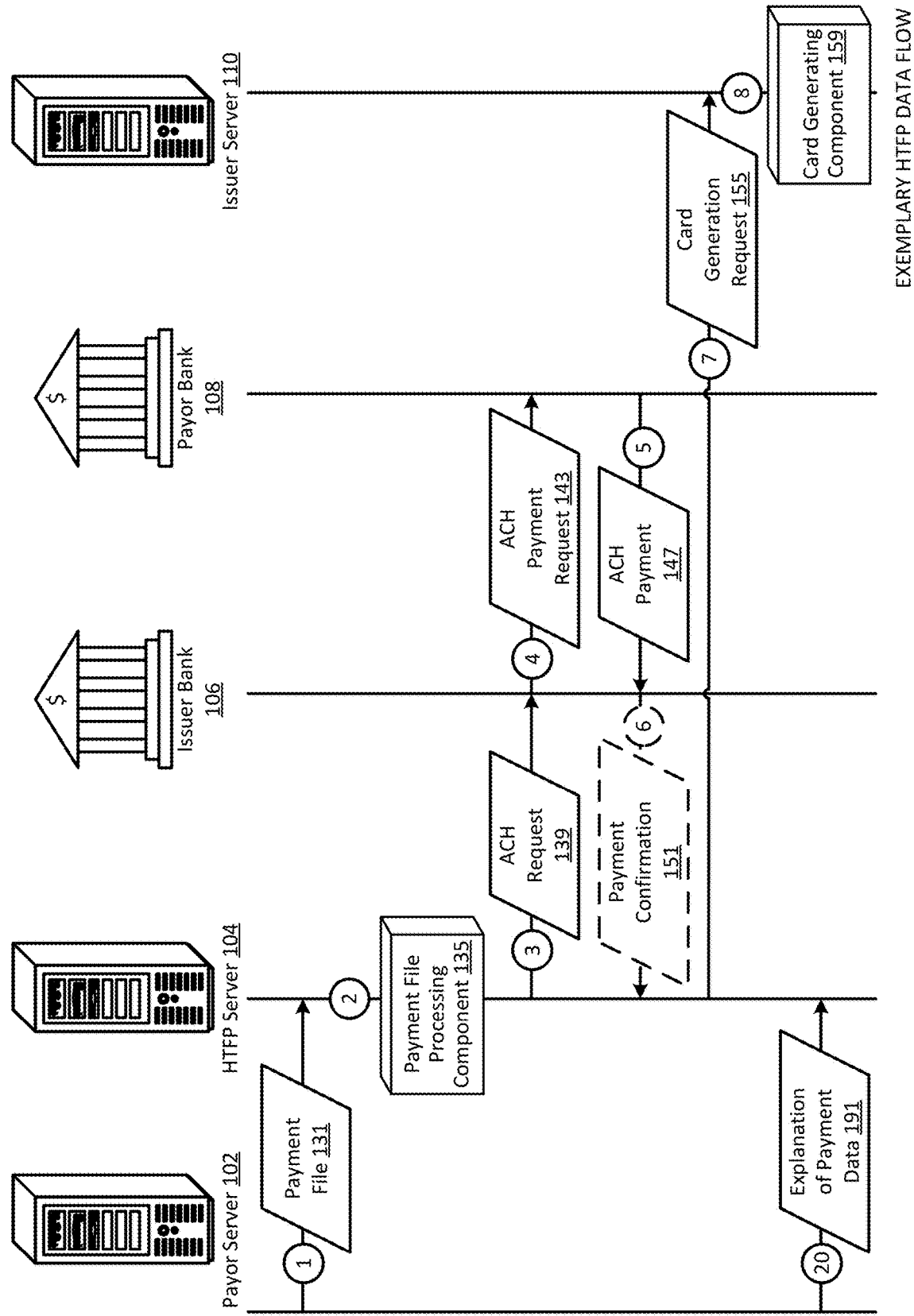
Figure 1C:
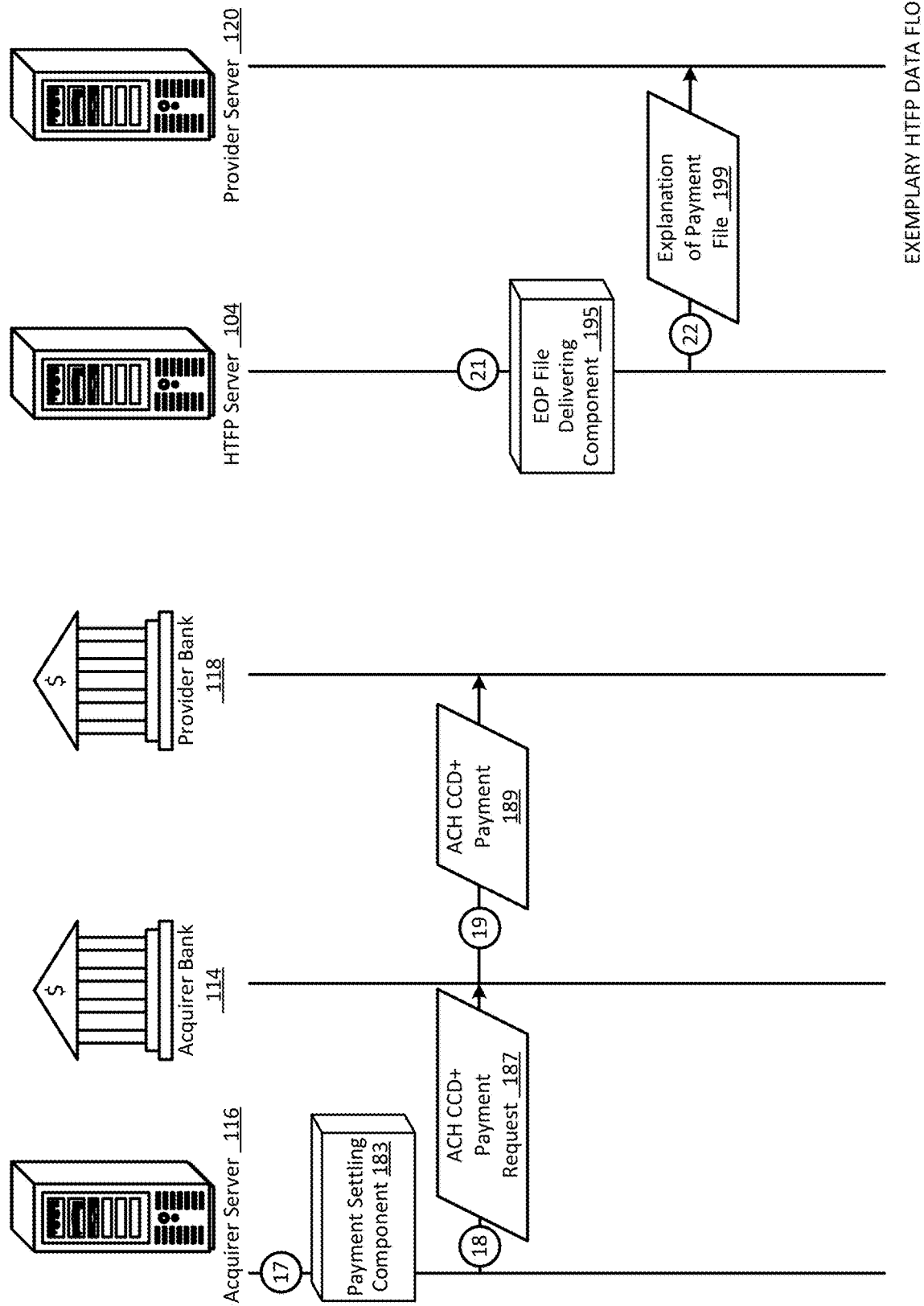

FIGS. 1A-1C show a datagraph diagram illustrating embodiments of a data flow for the HTFP. In FIGS. 1A-1C, dashed lines indicate data flow elements that may be more likely to be optional. In FIG. 1A, a payor server 102 may send a payment file 131 to a HTFP server 104. In one embodiment, a payor may include any entity that processes medical claim payments for some form of an insured or self-funded benefit plan, which may include entities such as insurance companies, self-administered employer health plans, third party administrators, health and welfare plans, and/or the like. In one implementation, the payment file may include details regarding one or more payments from the payor to a provider, and may include (e.g., for each payment) data such as a payment amount, a provider's details (e.g., a provider's name, a provider's tax identification number (TIN), a provider's address), the payor's details, a TRN associated with a payment, and/or the like. See FIG. 7 for an example of a payment file. In one embodiment, a provider may include a healthcare entity that performs medical treatments and bills for services (e.g., to a payor, to a patient, to both a payor and a patient). It is to be understood that while some embodiments describe processing the one or more payments in the payment file individually, the one or more payments in the payment file may be processed in aggregate (e.g., in one or more batches). In various implementations, the one or more payments in the payment file may be processed in real time, on demand, asynchronously, concurrently, in parallel, simultaneously, synchronously, and/or the like. The payment file may be processed by a payment file processing (PFP) component 135. See FIG. 2 for additional details regarding the PFP component.

The HTFP server may send an ACH request 139 associated with a payment (e.g., an individual payment, a batch of payments) to an issuer bank 106. The ACH request may instruct the issuer bank to obtain funds associated with the payment from a payor bank 108. For example, if the payment indicates that the payor (e.g., Health Plan) is sending a payment of $4,900.42 to the provider (e.g., ABC Healthcare Provider), the ACH request may be sent to the issuer's bank to obtain $4,900.42 from the Health Plan's bank. In one implementation, the ACH request may include data such as the payment amount, the payor's details (e.g., payor bank identifier, payor account number), issuer details (e.g., issuer name, issuer account number), and/or the like. For example, the ACH request may be formatted according to the eXtensible Markup Language (XML). An example ACH request, substantially in the form of a (Secure) Hypertext Transfer Protocol (HTTP(S)) POST message including XML-formatted data, is provided below:

```
POST /ACH_request.php HTTP/1.1
Host: www.server.com
Content-Type: Application/XML
Content-Length: 667
<?XML version = "1.0" encoding = "UTF-8"?>
<ACH_request>
    <request_identifier>ID_request_1</request_identifier>
    <payment_amount>$4,900.42</payment_amount>
    <from>
        <institution_identifier>Payor Bank</institution_identifier>
        <account_number>Payor's account
        number</account_number>
    </from>
    <to>
        <recipient_name>Issuer name</recipient_name>
        <account_number>Issuer's account
        number</account_number>
    </to>
</ACH_request>
```

The issuer bank may send an ACH payment request 143 to the payor bank. The ACH payment request may instruct the payor bank to provide funds associated with the payment to the issuer bank. For example, the ACH payment request may instruct the Health Plan's bank to send $4,900.42 to the issuer's bank. In one implementation, the ACH payment request may be sent using a standard ACH CCD format.

The payor bank may send an ACH payment 147 to the issuer bank. For example, the payor's bank may send $4,900.42 to the issuer's bank. In one implementation, the ACH payment may be sent using a standard ACH CCD format. In some embodiments, the issuer bank may send a payment confirmation 151 to the HTFP server. The payment confirmation may be used to inform the HTFP server that funds have been received. For example, the payment confirmation may be formatted according to the XML. An example payment confirmation, substantially in the form of a HTTP(S) POST message including XML-formatted data, is provided below:

```
POST /payment_confirmation.php HTTP/1.1
Host: www.server.com
Content-Type: Application/XML
Content-Length: 667
<?XML version = "1.0" encoding = "UTF-8"?>
<payment_confirmation>
    <request_identifier>ID_request_1</request_identifier>
    <status>payment received</status>
</payment_confirmation>
```

The HTFP server may send a card generation request 155 to an issuer server 110. In one embodiment, an issuer may generate cards and/or process card transactions. The issuer may have a contractual relationship with the issuer bank, which may be a sponsoring bank that allows the issuer access to a card payment network. In one implementation, the card generation request may include data such as the TRN associated with the payment, the payment amount, the provider's details, the payor's details, and/or the like. See FIG. 8 for an example of a card generation request. The card generation request may instruct the issuer to generate a card and/or process a card transaction to facilitate the payment. In various embodiments, a card may be a credit card, a stored value card, a debit card, and/or the like, and may be virtual or physical. The card generation request may be processed by a card generating (CG) component 159 and/or by a card payment processing (CPP) component 163. See FIG. 3 for additional details regarding the CG component. See FIG. 4 for additional details regarding the CPP component.

In one embodiment, the data flow may proceed as shown in FIG. 1B1. In FIG. 1B1, the issuer server may send a card payment request 167 to an acquirer server 116. In one embodiment, an acquirer may process and/or settle card transactions for the provider. The acquirer may have a contractual relationship with an acquirer bank, which may be a sponsoring bank that allows the acquirer access to a card payment network. For example, the card payment request may instruct the acquirer to process a card payment of $4,900.42 to the provider using the card generated by the issuer. In one implementation, the card payment request may be a Level 3 processing request and may include data such as issuer data (e.g., card number, card expiration date, card CVV code), payment data (e.g., payment amount, payment date), provider data (e.g., provider's name, provider's address, provider's TIN), payor data (e.g., payor's name, payor's address, payor's TIN), the TRN associated with the payment, and/or the like. For example, the card payment request may be formatted according to the XML. An example card payment request, substantially in the form of a HTTP(S) POST message including XML-formatted data, is provided below:

```
POST /card_payment_request.php HTTP/1.1
Host: www.server.com
Content-Type: Application/XML
Content-Length: 667
<?XML version = "1.0" encoding = "UTF-8"?>
<card_payment_request>
    <request_identifier>ID_request_2</request_identifier>
    <card_number>0000-0000-0000-0001</card_number>
    <card_CVV>123</card_CVV>
    <card_expiration_date>MM/YY</card_expiration_date>
    <payment_amount>$4,900.42</payment_amount>
    <provider_name>ABC Healthcare Provider</provider_name>
    <provider_TIN>111111111</provider_TIN>
    <TRN>1|2262064|1452579291|123456789</TRN>
</card_payment_request>
```

The acquirer server may send an interchange rate request 171 to a payment network 112. In one embodiment, a payment network may be a card network such as MasterCard, Visa, Discover, American Express, and/or the like. In one implementation, the acquirer server may calculate an interchange rate associated with the provider. The interchange rate is a fee paid by the provider when a card payment is processed and may include fees paid to the payment network, fees paid to the issuer of the card, fees paid to the acquirer, and/or the like. In some implementations, a business service arrangement (BSA) may be set up (e.g., to offer the provider a lower interchange rate) such that when a card payment associated with the provider's merchant identifier (MID) is sent for processing, the MID links the payment to the appropriate BSA interchange rate schedule. In some implementations, the issuer and the acquirer may be the same entity facilitating a lower interchange rate for the provider (e.g., due to increased negotiation leverage with the payment network in setting up the BSA, due to better cost and/or profitability structure). The interchange rate request may instruct the payment network to process the card payment at the calculated interchange rate. For example, the interchange rate request may be formatted according to the XML. An example interchange rate request, substantially in the form of a HTTP(S) POST message including XML-formatted data, is provided below:

```
POST /interchange_rate_request.php HTTP/1.1
Host: www.server.com
Content-Type: Application/XML
Content-Length: 667
<?XML version = "1.0" encoding = "UTF-8"?>
<interchange_rate_request>
    <request_identifier>ID_request_3</request_identifier>
    <card_number>0000-0000-0000-0001</card_number>
    <card_CVV>123</card_CVV>
    <card_expiration_date>MM/YY</card_expiration_date>
    <payment_amount>$4,900.42</payment_amount>
    <provider_name>ABC Healthcare Provider</provider_name>
    <provider_TIN>111111111</provider_TIN>
    <TRN>1|2262064|1452579291|123456789</TRN>
    <MID>ID_Merchant1</MID>
    <interchange_rate>2%</interchange_rate>
</interchange_rate_request>
```

The payment network may send an interchange rate response 173 to the acquirer server. In one embodiment, the interchange rate response may confirm the interchange rate specified for the transaction. For example, the interchange rate response may be formatted according to the XML. An example interchange rate response, substantially in the form of a HTTP(S) POST message including XML-formatted data, is provided below:

```
POST /interchange_rate_response.php HTTP/1.1
Host: www.server.com
Content-Type: Application/XML
Content-Length: 667
<?XML version = "1.0" encoding = "UTF-8"?>
<interchange_rate_response>
    <response_identifier>ID_response_3</response_identifier>
    <request_identifier>ID_request_3</request_identifier>
    <interchange_rate>2%</interchange_rate>
    <status>OK</status>
</interchange_rate_response>
```

In another embodiment, the interchange rate response may specify a different interchange rate calculated by the payment network for the transaction. For example, the interchange rate response may be formatted according to the XML. An example interchange rate response, substantially in the form of a HTTP(S) POST message including XML-formatted data, is provided below:

```
POST /interchange_rate_response.php HTTP/1.1
Host: www.server.com
Content-Type: Application/XML
Content-Length: 667
<?XML version = "1.0" encoding = "UTF-8"?>
<interchange_rate_response>
    <response_identifier>ID_response_3</response_identifier>
    <request_identifier>ID_request_3</request_identifier>
    <interchange_rate>2.5%</interchange_rate>
    <status>Recalculated</status>
    <calculation_details>Calculation details</calculation_details>
</interchange_rate_response>
```

The payment network may send an ACH payment request 175 to the issuer bank. The ACH payment request may instruct the issuer bank to provide funds associated with the payment to the payment network. For example, the ACH payment request may instruct the issuer's bank to send $4,900.42 to the payment network. In one implementation, the ACH payment request may be sent using a standard ACH CCD format. The payment network may send an ACH payment 177 to an acquirer bank 114. For example, the payment network may send $4,900.42 to the acquirer's bank. In another example, the payment network may send $4,900.42 less the interchange rate (e.g., less a portion of the interchange rate, less the entire interchange rate) to the acquirer's bank. In one implementation, the ACH payment may be sent using a standard ACH CCD format. In some implementations, the payment network may send the ACH payment request and the ACH payment in near real time. In some implementations, the payment network may send the ACH payment request and/or the ACH payment in a batch with other transactions. The issuer bank may send an ACH payment 179 to the payment network. For example, the issuer's bank may send $4,900.42 to the payment network. In one implementation, the ACH payment may be sent using a standard ACH CCD format. In some embodiments, the acquirer bank may send a payment confirmation 181 to the acquirer server. The payment confirmation may be used to inform the acquirer server that funds have been received. For example, the payment confirmation may be formatted according to the XML.

Figure 2:
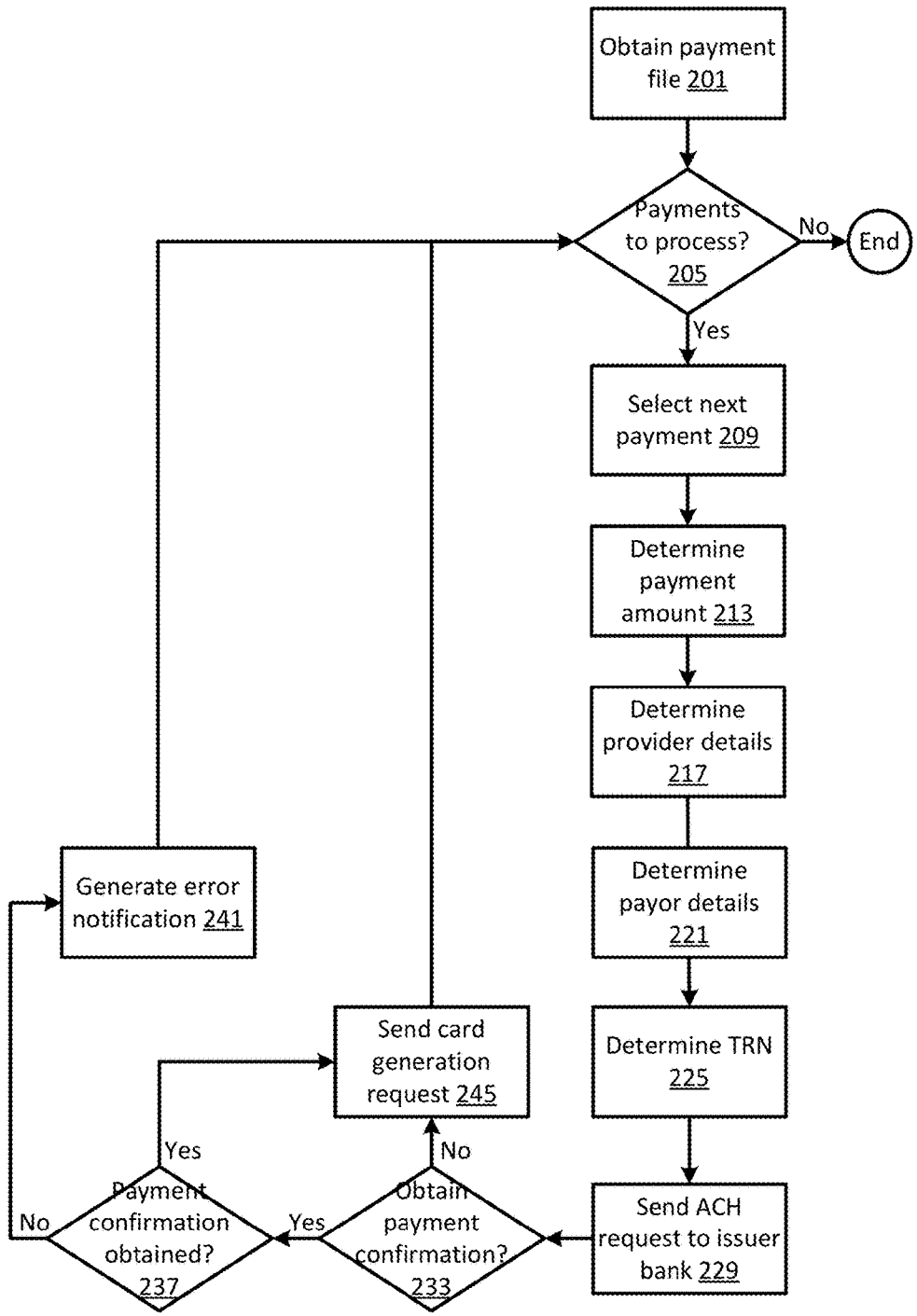
FIG. 2 shows a logic flow diagram illustrating embodiments of a payment file processing (PFP) component for the HTFP.

In another embodiment, the data flow may proceed as shown in FIG. 1B2. In FIG. 1B2, the issuer server may send a card payment request 167 to the payment network 112. For example, the card payment request may instruct the payment network to process a card payment of $4,900.42 to the provider using the card generated by the issuer. In one implementation, the payment network may calculate the interchange rate associated with the transaction (e.g., based on the provider's MID). In one implementation, the card payment request may be a Level 3 processing request and may include data such as issuer data (e.g., card number, card expiration date, card CVV code), payment data (e.g., payment amount, payment date), provider data (e.g., provider's name, provider's address, provider's TIN), payor data (e.g., payor's name, payor's address, payor's TIN), the TRN associated with the payment, and/or the like. For example, the card payment request may be formatted according to the XML. An example card payment request, substantially in the form of a HTTP(S) POST message including XML-formatted data, is provided below:

```
POST /card_payment_request.php HTTP/1.1
Host: www.server.com
Content-Type: Application/XML
Content-Length: 667
<?XML version = "1.0" encoding = "UTF-8"?>
<card_payment_request>
    <request_identifier>ID_request_2</request_identifier>
    <card_number>0000-0000-0000-0001</card_number>
    <card_CVV>123</card_CVV>
    <card_expiration_date>MM/YY</card_expiration_date>
    <payment_amount>$4,900.42</payment_amount>
    <provider_name>ABC Healthcare Provider</provider_name>
    <provider_TIN>111111111</provider_TIN>
    <TRN>1|2262064|1452579291|123456789</TRN>
    <MID>ID_Merchant1</MID>
</card_payment_request>
```

In some embodiments, the payment network may send a payment confirmation 171 to the acquirer server. The payment confirmation may be used to inform the acquirer server that the card payment has been received. For example, the payment confirmation may be formatted according to the XML. An example payment confirmation, substantially in the form of a HTTP(S) POST message including XML-formatted data, is provided below:

```
POST /payment_confirmation.php HTTP/1.1
Host: www.server.com
Content-Type: Application/XML
Content-Length: 667
<?XML version = "1.0" encoding = "UTF-8"?>
<payment_confirmation>
    <request_identifier>ID_request_2</request_identifier>
    <card_number>0000-0000-0000-0001</card_number>
    <card_CVV>123</card_CVV>
    <card_expiration_date>MM/YY</card_expiration_date>
    <payment_amount>$4,900.42</payment_amount>
    <provider_name>ABC Healthcare Provider</provider_name>
    <provider_TIN>111111111</provider_TIN>
    <TRN>1|2262064|1452579291|123456789</TRN>
    <MID>ID_Merchant1</MID>
    <interchange_rate>2%</interchange_rate>
    <status>card payment received</status>
</payment_confirmation>
```

The payment network may send an ACH payment request 175 to the issuer bank. The ACH payment request may instruct the issuer bank to provide funds associated with the payment to the payment network. For example, the ACH payment request may instruct the issuer's bank to send $4,900.42 to the payment network. In one implementation, the ACH payment request may be sent using a standard ACH CCD format. The payment network may send an ACH payment 177 to the acquirer bank. For example, the payment network may send $4,900.42 to the acquirer's bank. In another example, the payment network may send $4,900.42 less the interchange rate to the acquirer's bank. In one implementation, the ACH payment may be sent using a standard ACH CCD format. In some implementations, the payment network may send the ACH payment request and the ACH payment in near real time. In some implementations, the payment network may send the ACH payment request and/or the ACH payment in a batch with other transactions. The issuer bank may send an ACH payment 179 to the payment network. For example, the issuer's bank may send $4,900.42 to the payment network. In one implementation, the ACH payment may be sent using a standard ACH CCD format. In some embodiments, the acquirer bank may send a payment confirmation 181 to the acquirer server. The payment confirmation may be used to inform the acquirer server that funds have been received. For example, the payment confirmation may be formatted according to the XML. An example payment confirmation, substantially in the form of a HTTP(S) POST message including XML-formatted data, is provided below:

```
POST /payment_confirmation.php HTTP/1.1
Host: www.server.com
Content-Type: Application/XML
Content-Length: 667
<?XML version = "1.0" encoding = "UTF-8"?>
<payment_confirmation>
    <request_identifier>ID_request_3</request_identifier>
    <status>payment received</status>
</payment_confirmation>
```

In FIG. 1C, the payment may be settled by a payment settling (PS) component 183. See FIG. 5 for additional details regarding the PS component. The acquirer server may send an ACH CCD+ payment request 187 to the acquirer bank. In one implementation, the ACH CCD+ payment request may include data such as the TRN associated with the payment, the payment amount, the provider's details, the payor's details, and/or the like. For example, the ACH CCD+ payment request may be sent using ACH CCD+ format. See FIG. 9 for an example of ACH CCD+ format. In another example, the ACH CCD+ payment request may be sent using an equivalent format (e.g., formatted as an XML file). The ACH CCD+ payment request may instruct the acquirer bank to provide funds associated with the payment to a provider bank 118. For example, the ACH CCD+ payment request may instruct the acquirer's bank to send $4,900.42 to the provider's bank. In another example, the ACH CCD+ payment request may instruct the acquirer's bank to send $4,900.42 less the interchange rate to the provider's bank. In some implementations, the acquirer server may send the ACH CCD+ payment request in a batch with other transactions.

The acquirer bank may send an ACH CCD+ payment 189 to the provider bank. For example, the acquirer bank may send $4,900.42 to the provider's bank. In another example, the acquirer bank may send $4,900.42 less the interchange rate to the provider's bank. In one implementation, the ACH CCD+ payment may be sent using ACH CCD+ format.

As shown in FIG. 1A, the payor server may send EOP data 191 to the HTFP server. In one implementation, the EOP data may include EOP files for one or more payments from the payor to the provider, and may include (e.g., for each payment) data such as the TRN associated with the payment, the payment amount, the provider's details, the payor's details, details regarding the payment (e.g., claim number, date of service, patient identifier, amount billed, discount amount, deductible amount, coinsurance amount, allowed payment amount, reasons for specified amounts), and/or the like. See FIG. 10 for an example of an EOP file. As shown in FIG. 1C, the EOP data may be processed by an EOP file delivering (EFD) component 195. See FIG. 6 for additional details regarding the EFD component. The HTFP server may deliver an EOP file 199 to the provider. For example, the HTFP server may upload the EOP file to a provider server 120. In some implementations, the HTFP server may transmit the EOP file within a specified time of sending the card generation request (e.g., within 24 hours of each other).

FIG. 2 shows a logic flow diagram illustrating embodiments of a payment file processing (PFP) component for the HTFP. In FIG. 2, a payment file may be obtained at 201. In one implementation, the payment file may include details regarding one or more payments from a payor to a provider. For example, the payor may upload the payment file via a HTFP web portal to a HTFP server. In another example, a HTFP server may download the payment file from a secure FTP of the provider.

A determination may be made at 205 whether there remain payments to process. In one implementation, the payment file may be parsed (e.g., using PHP commands) and each of the payments in the payment file may be processed. If there remain more payments to process, the next payment to process may be selected at 209.

The payment amount associated with the payment may be determined at 213. In one implementation, payment data associated with the selected payment may be parsed (e.g., using PHP commands) to determine the payment amount. For example, the "|" character may be utilized as a field separator to facilitate the parsing. Similarly, provider details associated with the payment may be determined at 217, payor details associated with the payment may be determined at 221, and the TRN associated with the payment may be determined at 225. In some implementations, data associated with the payment may be stored via a MySQL database command similar to the following:

INSERT INTO Payments (payment_ID, payment_amount, provider_details payor_details, TRN)
VALUES ("payment identifier", "payment amount", "provider details", "payor details", "TRN");

An ACH request associated with the selected payment may be sent to an issuer bank at 229. For example, the ACH request may be sent via a network. In one implementation, parsed data associated with the selected payment may be utilized to create the ACH request. For example, the payment amount may be utilized as the amount of the ACH request. In another implementation, additional stored data may be utilized to create the ACH request. For example, the payor's TIN may be utilized to retrieve the payor's account number at the payor's bank, which may be utilized in the ACH request, via a MySQL database command similar to the following:

SELECT account_number FROM Payors WHERE payor_ID="payor's TIN";

A determination may be made at 233 whether payment confirmation should be obtained. For example, the HTFP server (e.g., operated by an issuer) may wish to be notified that the issuer's bank received funds from the payor's bank to reduce the risk of processing the payment associated with non-payment by the payor. In one implementation, this determination may be made based on a configuration setting of the HTFP server.

If it is determined that payment confirmation should be obtained, a determination may be made at 237 whether payment confirmation was obtained. For example, a determination may be made whether the issuer bank sent a payment confirmation via a network. If it is determined that payment confirmation was not obtained, an error notification may be generated at 241. For example, the error notification may notify a HTFP administrator that payment confirmation was not obtained.

If it is determined that payment confirmation was obtained or if payment confirmation is not desired, a card generation request may be sent to an issuer server at 245. For example, the card generation request may be sent via a network. In one implementation, parsed data associated with the selected payment may be utilized to create the card generation request. For example, the provider's name may be utilized in the card generation request. In another implementation, additional stored data may be utilized to create the card generation request. For example, the provider's TIN may be utilized to retrieve the provider's address, which may be utilized in the card generation request, via a MySQL database command similar to the following:

SELECT address FROM Providers WHERE provider_ID="provider's TIN";

The card generation request may instruct the issuer server to generate a card to facilitate the payment.

Figure 3:
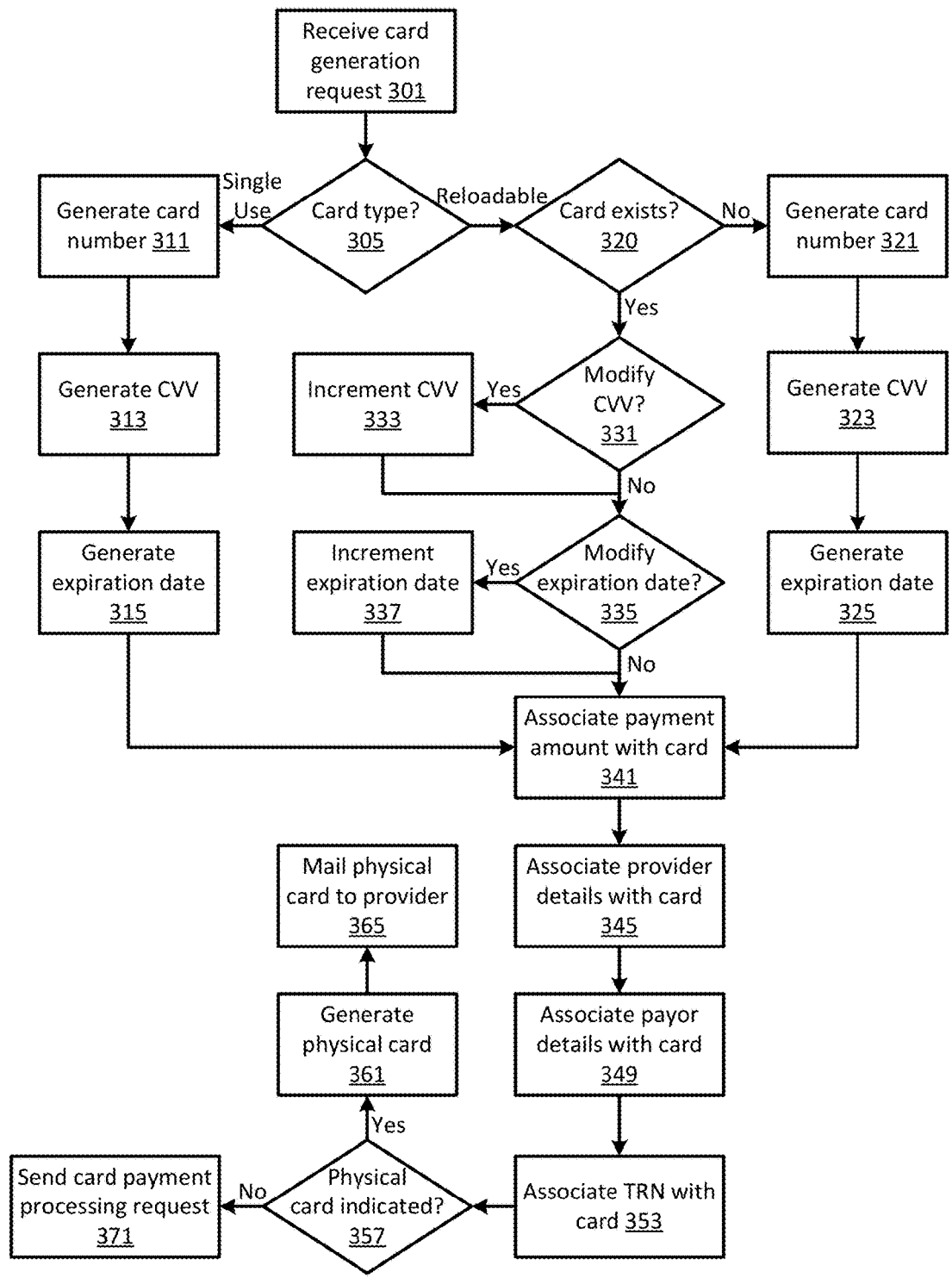
FIG. 3 shows a logic flow diagram illustrating embodiments of a card generating (CG) component for the HTFP.

FIG. 3 shows a logic flow diagram illustrating embodiments of a card generating (CG) component for the HTFP. In FIG. 3, a card generation request may be received at 301. For example, an issuer server may receive the card generation request from a HTFP server via a network.

A determination may be made at 305 regarding the type of card to generate. In one implementation, the CG component may generate a single use card. In another implementation, the CG component may generate a reloadable card. In one implementation, this determination may be made based on a configuration setting of the issuer server. In another implementation, this determination may be made based on data associated with the card generation request. For example, the card generation request may be parsed to determine a payor's identifier and/or a provider's identifier, and preferences of the payor and/or of the provider may be retrieved from a database to determine the type of card to generate.

If it is determined that a single use card should be generated, a card number associated with the card may be generated at 311. In one implementation, the card number may be generated in accordance with ISO/IEC 7812. For example, the card number may be 16 digits in length and may include a six-digit Issuer Identification Number (IIN), a nine-digit individual account identifier, and a single check digit calculated using the Luhn formula. A CVV code associated with the card may be generated at 313. In one implementation, a random three digit number may be generated. An expiration date associated with the card may be generated at 315. In one implementation, the expiration date may be set in accordance with a specified configuration setting. For example, the expiration date may be set to 60 days from the date of the card generation request. In some implementations, data associated with the card may be stored via a MySQL database command similar to the following:

```
INSERT INTO Cards (card_number, CVV_code, expiration_date)
VALUES ("card number", "CVV code", "expiration date");
```

In some implementations, the card may be configured to be usable with a specified set of allowed Merchant Category Codes (MCCs) (e.g., MCCs applicable to the healthcare industry) to minimize the risk of fraud. Accordingly, a transaction involving the card would not be processed if the provider's MCC was not on the specified set of allowed MCCs.

If it is determined that a reloadable card should be generated, a determination may be made at 320 whether a card already exists. In one implementation, this determination may be made based on data associated with the card generation request. For example, the card generation request may be parsed to determine the payor's identifier and/or the provider's identifier, and a determination may be made based on the payor's identifier and/or the provider's identifier whether an associated reloadable card already exists. In one embodiment, the card may be configured to facilitate payment refunds by the provider. For example, if the provider billed the payor $100 for a procedure, but the patient paid a $20 co-payment, the provider may have to refund $20 to the payor. While a single use card may rely on the card number to facilitate refunds, a reloadable card utilizes additional data to provide a refund for the correct payment. In one implementation, the reloadable card may associate each payment with a unique combination that includes a card number, a CVV code, and an expiration date. In this implementation, the card number stays constant, but the CVV code is incremented with each payment (e.g., from 000 to 999). Once CVV codes are used up (e.g., 999 is reached), the expiration date may be incremented and CVV codes may be reused with the new expiration date.

If it is determined that a card does not exist, a card number associated with the card may be generated at 321. In one implementation, the card number may be generated in accordance with ISO/IEC 7812. For example, the card number may be 16 digits in length and may include a six-digit Issuer Identification Number (IIN), a nine-digit individual account identifier, and a single check digit calculated using the Luhn formula. A CVV code associated with the card may be generated at 323. In one implementation, the CVV code may be set to an initial number (e.g., 000). An expiration date associated with the card may be generated at 325. In one implementation, the expiration date may be set in accordance with a specified configuration setting. For example, the expiration date may be set to 60 days from the date of the card generation request.

If it is determined that a card exists, a determination may be made at 331 whether to modify the card's CVV code. In one implementation, if CVV codes for a given expiration date have not been used up, the CVV code may be incremented (e.g., by one) at 333. For example, the CVV code associated with the card may be updated via a MySQL database command similar to the following:

```
UPDATE Cards
SET CVV_code = "old CVV code + 1"
WHERE card_number = "card number";
```

A determination may be made at 335 whether to modify the card's expiration date. In one implementation, if CVV codes for a given expiration date have been used up, the expiration date may be incremented (e.g., by one day, to be 60 days in the future if the current expiration date is less than 60 days in the future) at 337.

A payment amount may be associated with the card at 341. In one implementation, the card generation request may be parsed to determine the payment amount, and the payment amount may be associated with the card. For example, the "|" character may be utilized as a field separator to facilitate the parsing. Similarly, provider details may be determined and associated with the card at 345, payor details may be determined and associated with the card at 349, and a TRN may be determined and associated with the card at 353.

A determination may be made whether a physical card is indicated at 357. In one implementation, this determination may be made by default (e.g., utilize virtual cards). In another implementation, this determination may be made based on data associated with the card generation request. For example, the card generation request may be parsed to determine a payor's identifier and/or a provider's identifier, and preferences of the payor and/or of the provider may be retrieved from a database to determine whether to generate a physical card.

If it is determined that a physical card is indicated, a physical card may be generated at 361. The physical card may be mailed to the provider at 365.

If it is determined that a physical card is not indicated, a card payment processing request may be sent at 371. For example, the card payment processing request may be sent via a network. In another example, the card payment processing request may be sent via an API call (e.g., a PHP function call). In one implementation, transaction data associated with the card (e.g., card number, card CVV code, card expiration data, the payment amount, provider details, payor details, TRN) may be utilized to create the card payment processing request (e.g., the data may be included in the card payment processing request, the data may be referenced such as via a transaction identifier). The card payment processing request may instruct the issuer server to process a card transaction to facilitate the payment.

Figure 4:
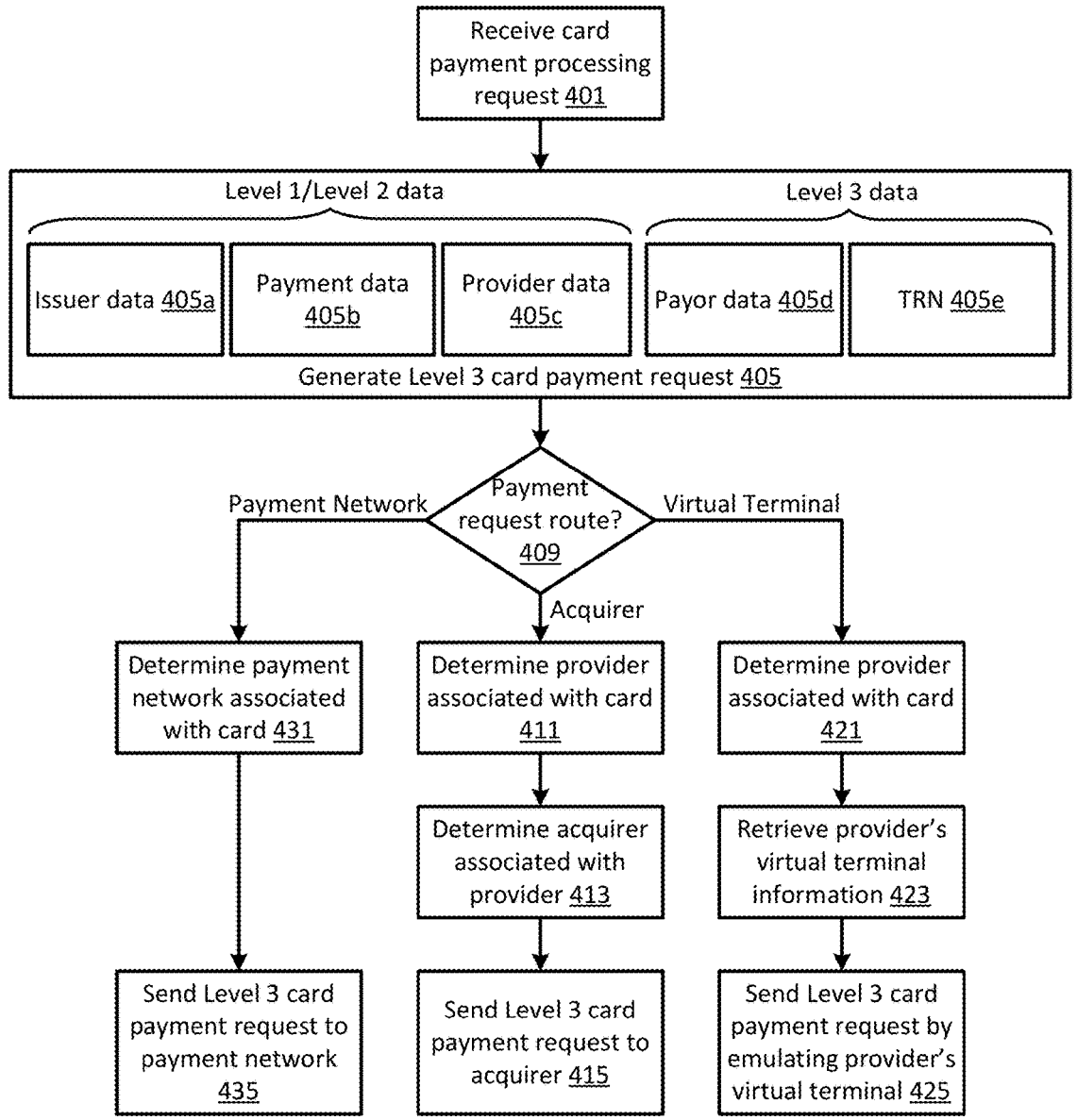
FIG. 4 shows a logic flow diagram illustrating embodiments of a card payment processing (CPP) component for the HTFP.

FIG. 4 shows a logic flow diagram illustrating embodiments of a card payment processing (CPP) component for the HTFP. In FIG. 4, a card payment processing request may be received at 401. In one implementation, the card payment processing request may be parsed to retrieve transaction data. In another implementation, a transaction identifier may be parsed from the card payment processing request and transaction data may be retrieved from a database.

A Level 3 card payment request may be generated at 405. The Level 3 card payment request may be pushed (e.g., to initiate a credit card payment transaction) by an issuer server to prevent a provider from having to manually input transaction data into the provider's card terminal (e.g., credit card machine, virtual credit card terminal) to receive the card payment associated with the card payment processing request. The Level 3 card payment request may include the TRN associated with the card payment to facilitate linking the card payment to the corresponding EOP file and making the card payment compliant with the ACA. In some implementations, the provider's issuer and acquirer may be the same entity, facilitating a lower interchange rate and/or more efficient payment processing for the provider. For example, due to reduced risk of fraud, the issuer and/or the acquirer may avoid having to charge a card not present fee for processing a virtual card payment. In another example, due to reduced risk of fraud, restrictions on a maximum payment amount per transaction may be removed (e.g., instead of processing a $1,000,000 payment as ten transactions due to a $100,000 maximum payment amount per transaction, the $1,000,000 payment may be processed as one transaction). In one implementation, transaction data associated with the card payment processing request may be used to generate the Level 3 card payment request, which may include Level 1 and/or Level 2 data, such as issuer data 405*a* (e.g., card number, card expiration date, card CVV code), payment data 405*b* (e.g., payment amount, payment date), provider data 405*c* (e.g., provider's name, provider's address, provider's TIN), and/or the like, and Level 3 data, such as payor data 405*d* (e.g., payor's name, payor's address, payor's TIN), TRN associated with the card payment 405*e*, and/or the like.

A determination may be made at 409 regarding payment request route to utilize to push the Level 3 card payment request. In one embodiment, the Level 3 card payment request may be pushed via an acquirer. A provider associated with the card may be determined at 411. For example, this determination may be made based on the provider_TIN field of the Level 3 card payment request. The acquirer associated with the provider may be determined at 413. For example, the provider's TIN may be utilized to retrieve the address of a card payment processing web page of the provider's acquirer via a MySQL database command similar to the following:

SELECT acquirer_web_page FROM Providers WHERE provider_ID="provider's TIN";

The Level 3 card payment request may be sent to the acquirer at 415. For example, the Level 3 card payment request may be sent via the acquirer's card payment processing web page.

In another embodiment, the Level 3 card payment request may be pushed via a virtual terminal. A provider associated with the card may be determined at 421. For example, this determination may be made based on the provider_TIN field of the Level 3 card payment request. The provider's virtual terminal information may be retrieved at 423. For example, the provider's TIN may be utilized to retrieve the provider's card terminal identifier, user identifier with the provider's acquirer, password associated with the user identifier, and/or the like. The Level 3 card payment request may be sent by emulating the provider's virtual terminal at 425. For example, the Level 3 card payment request may be sent via web calls and/or API calls to the provider's acquirer using the provider's virtual terminal information.

In yet another embodiment, the Level 3 card payment request may be pushed via a payment network. The payment network associated with the card may be determined at 431. For example, this determination may be made based on the card_number field (e.g., the card number may be parsed to determine the IIN, which identifies the payment network) of the Level 3 card payment request. The Level 3 card payment request may be sent to the payment network at 425. For example, the Level 3 card payment request may be sent to the payment network via web calls and/or API calls specified by a configuration setting of the issuer server for the payment network.

Figure 5:
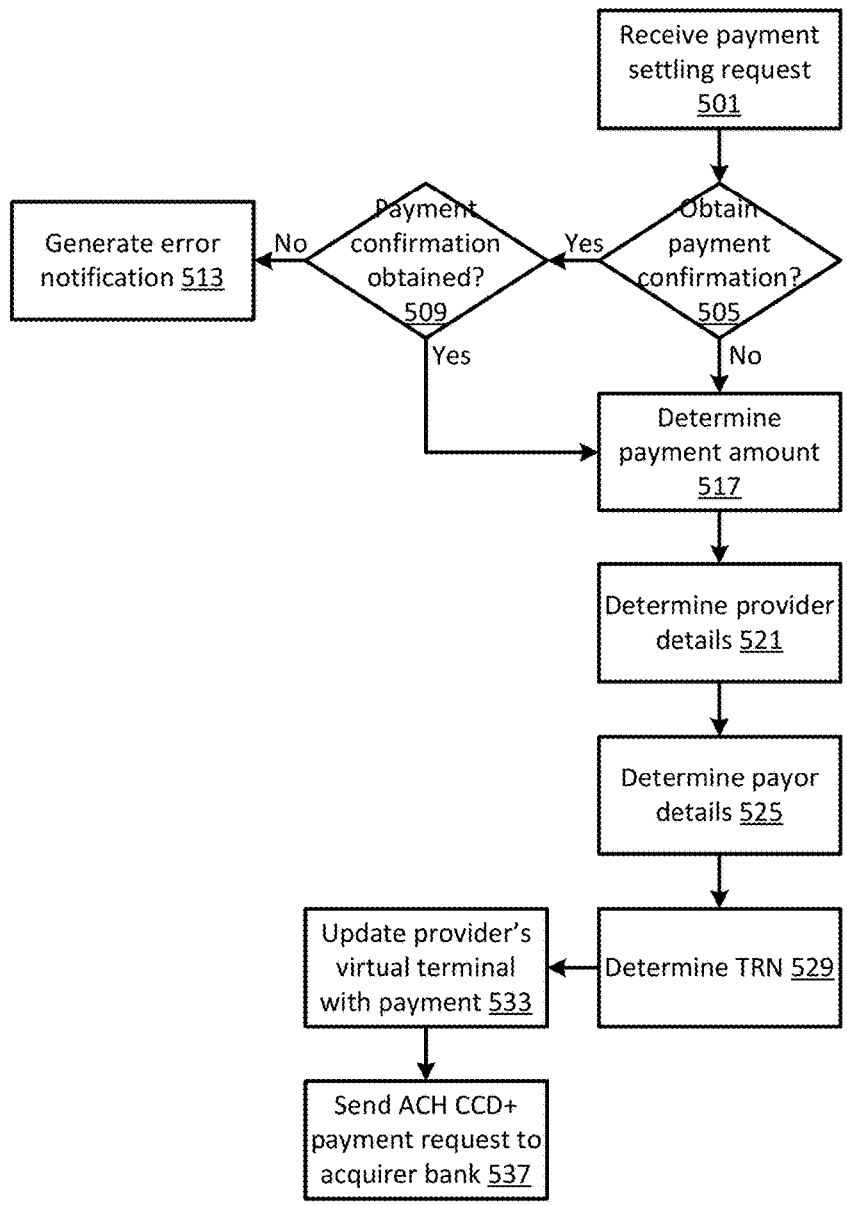
FIG. 5 shows a logic flow diagram illustrating embodiments of a payment settling (PS) component for the HTFP.

FIG. 5 shows a logic flow diagram illustrating embodiments of a payment settling (PS) component for the HTFP. In FIG. 5, a payment settling request may be received at 501. For example, an acquirer server may receive the payment settling request via an API call.

A determination may be made at 505 whether payment confirmation should be obtained. For example, the acquirer server may wish to be notified that the acquirer's bank received funds associated with a card payment from a payment network to reduce the risk of processing the card payment. In one implementation, this determination may be made based on a configuration setting of the acquirer server.

If it is determined that payment confirmation should be obtained, a determination may be made at 509 whether payment confirmation was obtained. For example, a determination may be made whether the acquirer bank sent a payment confirmation via a network. If it is determined that payment confirmation was not obtained, an error notification may be generated at 513. For example, the error notification may notify an administrator that payment confirmation was not obtained.

If it is determined that payment confirmation was obtained or if payment confirmation is not desired, the payment amount associated with the card payment may be determined at 517. In one implementation, details regarding the transaction may be determined based on transaction data sent by an issuer server in the card payment request associated with the card payment. In another implementation, details regarding the transaction may be determined based on transaction data sent by a payment network in the payment confirmation associated with the card payment. For example, transaction data may be parsed (e.g., using an XML parser) to determine the payment amount. Similarly, provider details associated with the card payment may be determined at 521, payor details associated with the card payment may be determined at 525, and the TRN associated with the card payment may be determined at 529.

The provider's virtual terminal may be updated with details regarding the card payment at 533. In one implementation, the provider's virtual terminal may show the card payment as having been received and/or may show transaction data associated with the card payment. For example, the provider may utilize the virtual terminal (e.g., a web portal accessed using a computer connected to a network, a server based application accessed via a client connected to a network) to monitor card payments.

An ACH CCD+ payment request may be sent to the acquirer bank at 537. For example, the ACH CCD+ payment request may be sent via a network. In one implementation, transaction data associated with the card payment may be utilized to create the ACH CCD+ request. For example, the payment amount may be utilized as the amount of the ACH CCD+ request. In another implementation, additional stored data may be utilized to create the ACH CCD+ request. For example, the provider's TIN may be utilized to retrieve the provider's account number at the provider's bank, which may be utilized in the ACH CCD+ request. The ACH CCD+ request may include the TRN associated with the card payment to facilitate linking the ACH CCD+ payment to the corresponding EOP file and making the ACH CCD+ payment compliant with the ACA.

Figure 6:
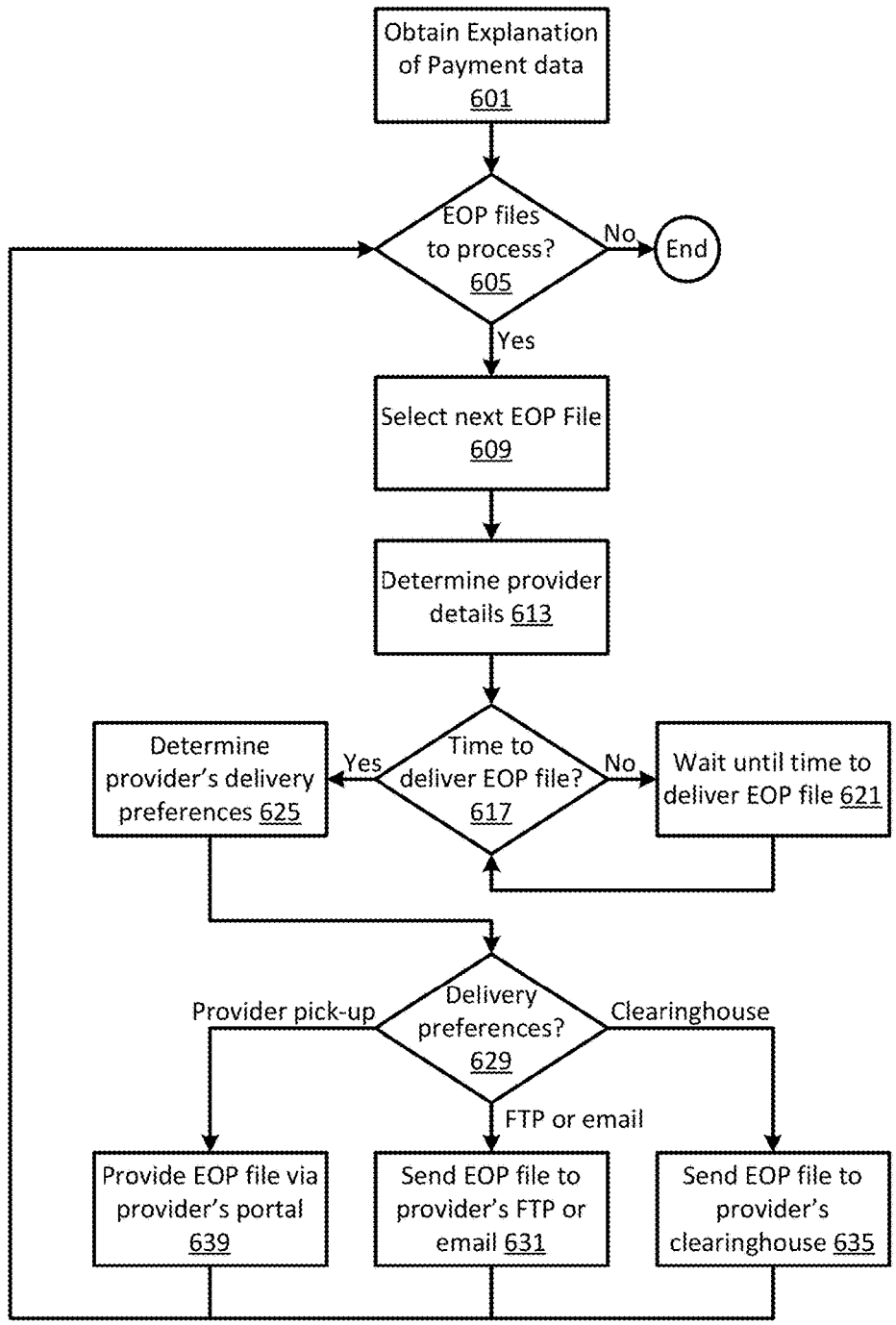
FIG. 6 shows a logic flow diagram illustrating embodiments of an EOP (Explanation of Payment) file delivering (EFD) component for the HTFP.

FIG. 6 shows a logic flow diagram illustrating embodiments of an EOP file delivering (EFD) component for the HTFP. In FIG. 6, EOP data may be obtained at 601. For example, a payor's server may send EOP data to a HTFP server. In one implementation, the EOP data may include EOP files for one or more payments from the payor to a provider.

A determination may be made at 605 whether there remain EOP files to process. In one implementation, each of the obtained EOP files may be processed. If there remain more EOP files to process, the next EOP file to process may be selected at 609.

Provider details associated with the selected EOP file may be determined at 613. In one implementation, the EOP file may be parsed to determine the identifier of the provider associated with the EOP file. In another implementation, other data, such as a TRN associated with EOP file may also be determined.

A determination may be made at 617 whether it is time to deliver the EOP file to the provider. For example, the HTFP server may be configured to deliver the EOP file within a specified time of sending a card generation request for a payment associated with the EOP file (e.g., within 24 hours of each other). Accordingly, the HTFP server may determine whether delivering the EOP file at the current time would satisfy the specified timing configuration. In one implementation, this determination may be made based on the file name (e.g., File_1.835) of the EOP file. For example, if the payment file with a corresponding file name (e.g., File_1.Payment) has been processed, it may be time to deliver the EOP file. In another implementation, this determination may be made based on a TRN associated with EOP file. For example, if the card generation request associated with the TRN has been sent, it may be time to deliver the EOP file. If it is not yet time to deliver the EOP file, the HTFP server may wait until it is time to deliver the EOP file at 621.

If it is time to deliver the EOP file, the provider's delivery preferences may be determined at 625. In one implementation, the provider's delivery preferences may be retrieved from a database based on the provider's identifier via a MySQL database command similar to the following:

SELECT delivery_preferences FROM Providers WHERE provider_ID="provider's TIN";

A determination may be made at 629 regarding delivery preferences of the provider. In one embodiment, the provider may wish to have the EOP file delivered via FTP, email, and/or the like message. Accordingly, the EOP file may be uploaded to the provider's FTP server (e.g., a secure FTP server), sent to the provider's email address, and/or the like at 631. For example, the login credentials for the provider's FTP server, the provider's email address, and/or the like may be specified by the provider's delivery preferences.

In another embodiment, the provider may wish to have the EOP file delivered to a clearinghouse or a third party vendor (e.g., that specializes in gathering EOP data from various sources, aggregating the data, and submitting the data to the provider in a single daily file). Accordingly, the EOP file may be sent to the provider's clearinghouse or third party vendor (e.g., uploaded via FTP, sent via email, and/or the like) at 635. For example, the login credentials for the clearinghouse's FTP server, the clearinghouse's email address, and/or the like may be specified by the provider's delivery preferences.

In yet another embodiment, the provider may wish to pick up the EOP file at a time convenient to the provider. Accordingly, the EOP file may be made available to the provider via a provider's portal (e.g., via a web portal) at 639. For example, the provider may be informed (e.g., via an email message) that the EOP file is available for download at the provider's portal.

FIG. 7 shows a screenshot diagram illustrating embodiments of a payment file for the HTFP. In FIG. 7, a portion of an exemplary payment file 700 is shown. The payment file shows data associated with an exemplary payment and may include details such as the payment amount associated with the payment 745, the name of the provider associated with the payment 765, the TIN of the provider 775, and/or the like. For example, the "|" character may be utilized as a field separator to facilitate parsing of the payment file.

Figure 8:
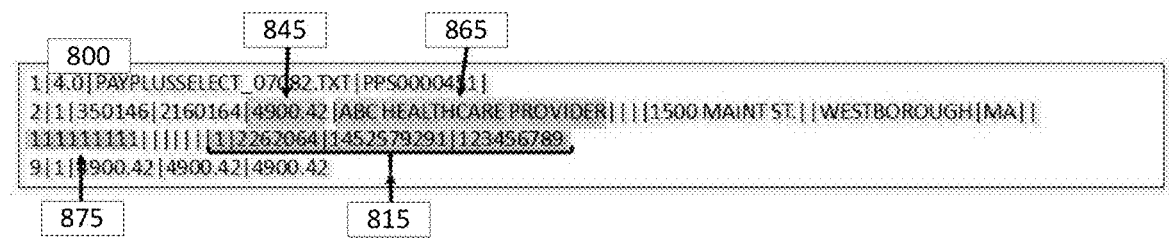
FIG. 8 shows a screenshot diagram illustrating embodiments of a card generation request for the HTFP.

FIG. 8 shows a screenshot diagram illustrating embodiments of a card generation request for the HTFP. In FIG. 8, an exemplary card generation request 800 is shown. The card generation request shows data associated with an exemplary payment and may include details such as the TRN associated with the payment 815, the payment amount associated with the payment 845, the name of the provider associated with the payment 865, the TIN of the provider 875, and/or the like. For example, the "|" character may be utilized as a field separator to facilitate parsing of the payment file.

FIG. 9 shows a screenshot diagram illustrating embodiments of an ACH CCD+ payment request for the HTFP. In FIG. 9, an exemplary ACH CCD+ format 900 is shown in an exemplary ACH CCD+ payment request 905. The ACH CCD+ payment request shows data associated with an exemplary payment and may include details such as the TRN associated with the payment 925, the payment amount associated with the payment 945, the name of the provider associated with the payment 965, and/or the like. The TRN may include details such as the payment identifier 930 that may be used to link the payment to the corresponding EOP file record, the TIN of the payor associated with the payment 935, and/or the like. For example, the "*" character may be utilized as a TRN field separator and the "\" character may be utilized as a TRN terminator to facilitate parsing of the TRN.

Figure 10:
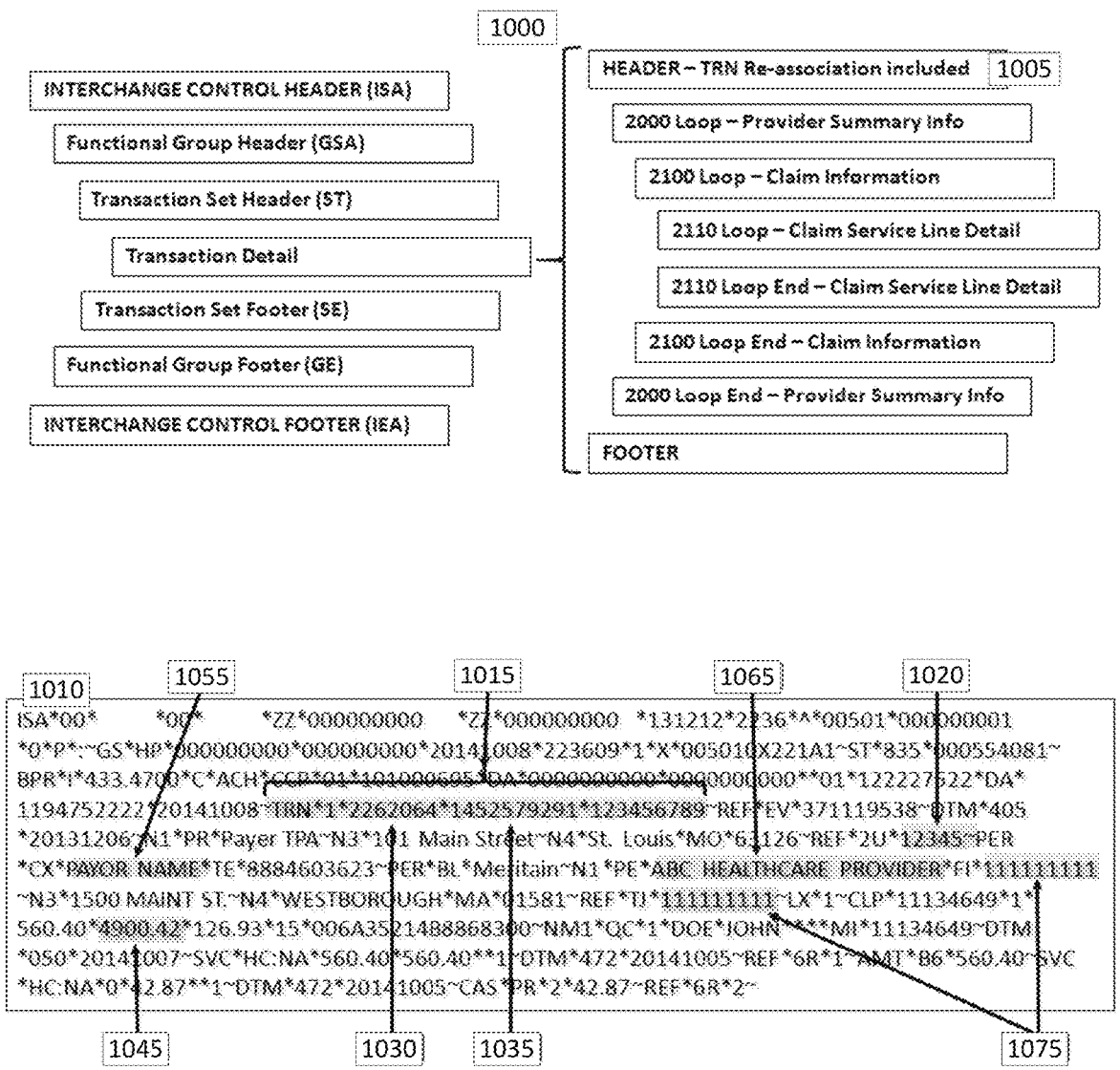
FIG. 10 shows a screenshot diagram illustrating embodiments of an EOP file for the HTFP.

FIG. 10 shows a screenshot diagram illustrating embodiments of an EOP file for the HTFP. In FIG. 10, an exemplary EOP file format (e.g., 835 data file format) 1000 is shown. The EOP file format shows that the transaction detail header 1005 may include the TRN. A portion of an exemplary EOP file record 1010 structured in accordance with the EOP file format is shown. The EOP file record shows data associated with an exemplary payment and may include details such as the TRN associated with the payment 1015, the national payor identifier of the payor associated with the payment 1020, the payment identifier 1030, the TIN of the payor 1035, the payment amount associated with the payment 1045, the name of the payor 1055, the name of the provider associated with the payment 1065, the TIN of the provider 1075, and/or the like.

Figure 12:
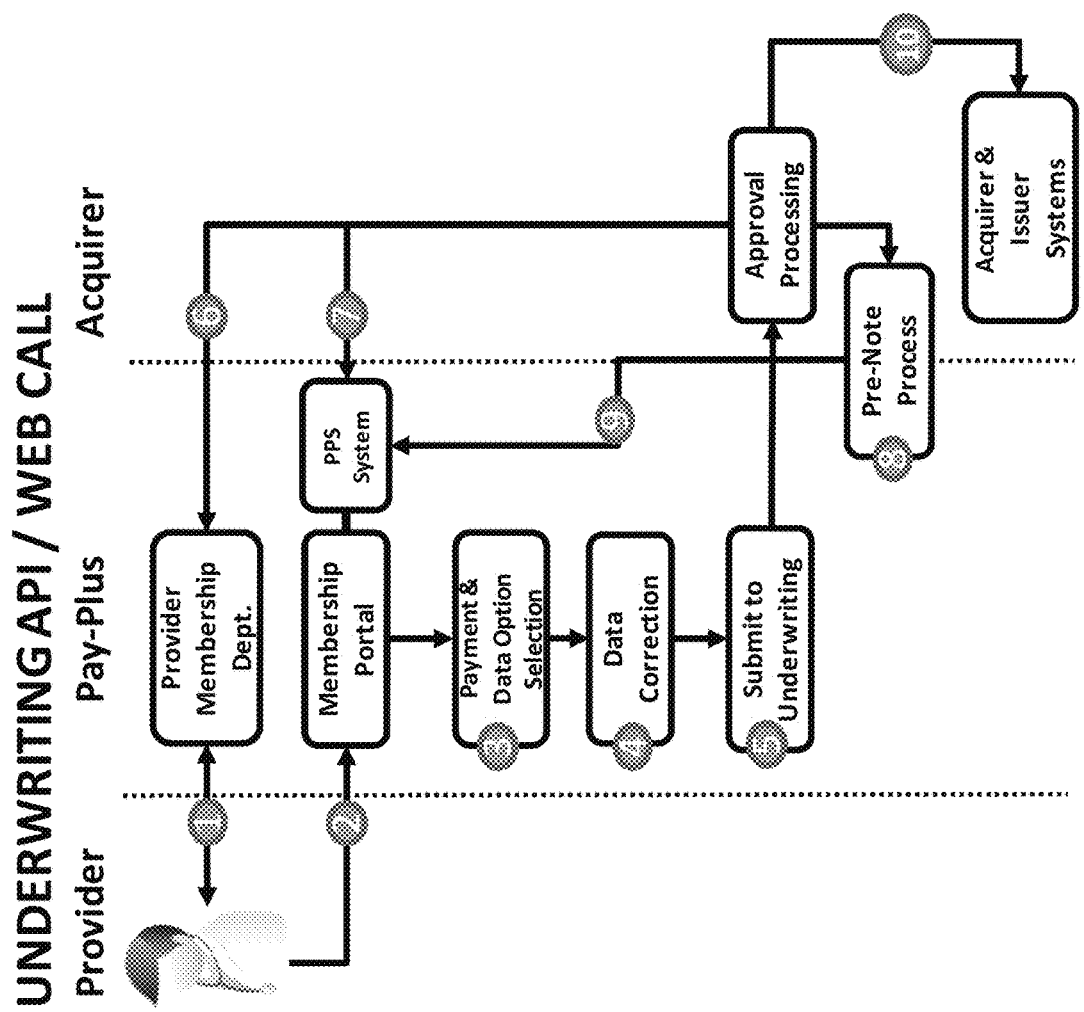

FIG. 12 illustrates alternative embodiments associated with underwriting. At 1, a provider may decide to utilize the HTFP to receive payments. For example, the provider may make this decision based on interaction with a provider membership department (e.g., via a website, via a phone call). At 2, the provider may log into a membership enrollment portal. At 3, the provider may elect a payment method, a data delivery method, notices, and/or the like. The provider's demographics may be pre-populated by the HTFP, and, at 4, correction of demographics data may be obtained from the provider (e.g., via the website of the membership enrollment portal) and/or enrollment of the provider may be finalized. At 5, data may be populated into an application and submitted to underwriting (e.g., after obtaining the provider's agreement to a click-through agreement) via an API. At 6, the acceptance or denial may be communicated to the provider. At 7, the acceptance or denial may be communicated to the HTFP. For example, if the provider is accepted, the HTFP may continue setting up the provider for service. In another example, if the provider is denied, the HTFP may prompt the provider to submit corrected and/or additional application data. At 8, a pre-note on the provider's account may be generated (e.g., by the HTFP, by a partner system) upon approval of the provider (a Pre-Note is a process of ACH debiting and crediting a financial account to validate the account may receive or send amounts of money) at 9, the HTFP may be set up for service. In some implementations, at 10, acquirer and/or issuer systems may be updated and/or may communicate member virtual terminal information so that the issuing processor may emulate a card terminal as payment is pushed via a payment network gateway.

FIG. 13 illustrates alternative embodiments associated with a reloadable card. To utilize a reloadable card, each payment must be associated with a variation of the traditional sixteen (fifteen in the case of AMEX) digit card number. In one embodiment, this is accomplished by utilizing the 16 digit card number, plus the CVV (e.g., three digits except for AMEX which is four digits), plus the expiration date (e.g., month and year) of the card as the card number. The CVV and/or the expiration date may be incremented by payment to generate different numbers for each payment. For example, the CVV code may be incremented by one every time a payment on that card number is made, and if the CVV code starts at 000 and reaches 999, the expiration date may be incremented by one month and/or year. By varying validation and/or other codes and/or expiration dates, the same card number can be reused for multiple payment transactions and thus a reloadable card can be used while still allowing for accurate tracking of which transaction, payor, health plan, and/or the like is associated with each payment.

Figure 14:
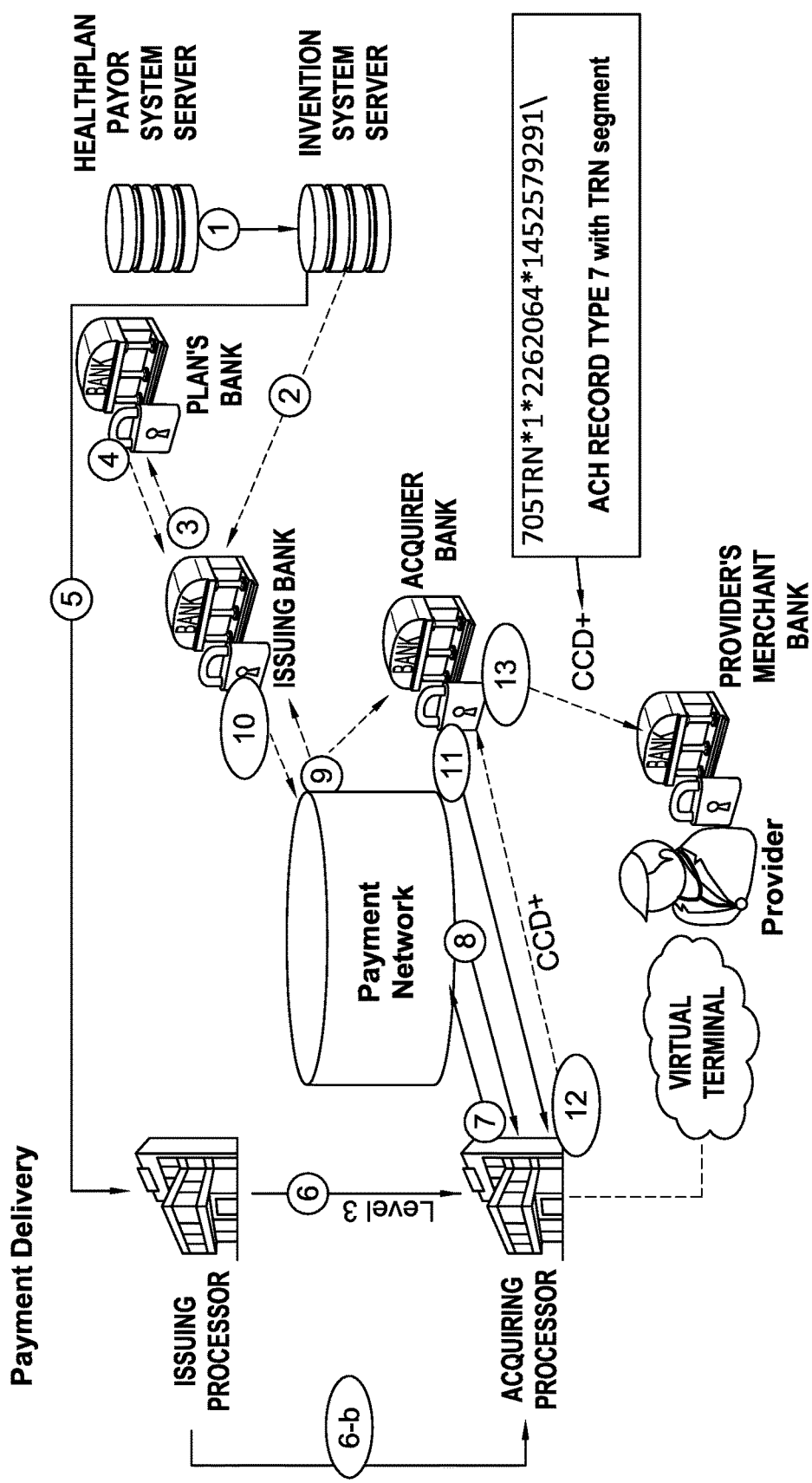

FIG. 14 illustrates alternative embodiments associated with payment processing. At 1, a payment file may be received from a payor (e.g., health plan payor system server, a client who has payments to make) by a HTFP server (e.g., PPS system server). The PPS may process the payment file, and at 2 send an ACH instruction file that includes the debits for each plan's bank account representing their part of the payment file to the PPS's issuing bank. The PPS's issuing bank may initiate a debit at 3 to each plan's bank account and may receive funds at 4. The PPS may instruct the issuing processor to initiate creation of a card at 5 (e.g., single use virtual card) and to assign the appropriate amount to the card. At 6, the issuing processor may push payment to the acquiring processor for processing using Level 3, which includes the 835 TRN (As an alternate, at 6-*b*, the Issuing Processor may send a separate file containing the 835 TRN and a key to match the 835 TRN with the payment in 6). At 7, the acquiring processor will validate pricing with the payment network (e.g., MasterCard) which may be BSA pricing which evokes a response at 8 (alternately, 6 and/or 6-*b* may connect to the card brand in the Payment Network and the card brand may return instructions to the Acquiring processor at 8). At 9, the payment network may ACH debit PPS's issuing bank for settlement funds on behalf of the acquirer and credit the acquirer bank may be sent via ACH to the PPS acquirer's bank (this action may or may not require the debit to be received before the credit is issued). Upon completion of the settlement process in one embodiment, PPS may be the acquirer and may settle the payment to the provider merchant virtual terminal. At 11, the acquiring bank may notify the acquiring processor the ACH debit from the issuing bank is complete and the acquiring bank is then instructed (at 12) to initiate an ACH credit to the provider merchant account using the CCD+ format (at 13), which includes the 835 TRN from the Level 3 data or the alternate method of a separate file at 6-*b*).

In some embodiments, doctors and other healthcare providers receive payments for the healthcare services that they provide from various sources and through various payment mechanisms. Payments may be received from insurance companies, patients, and other parties, and third party systems and services can be involved in the payment process. For example, third parties can make payments to the healthcare provider on behalf an insurance company or patient and keep track of information about such payments.

Figure 15:
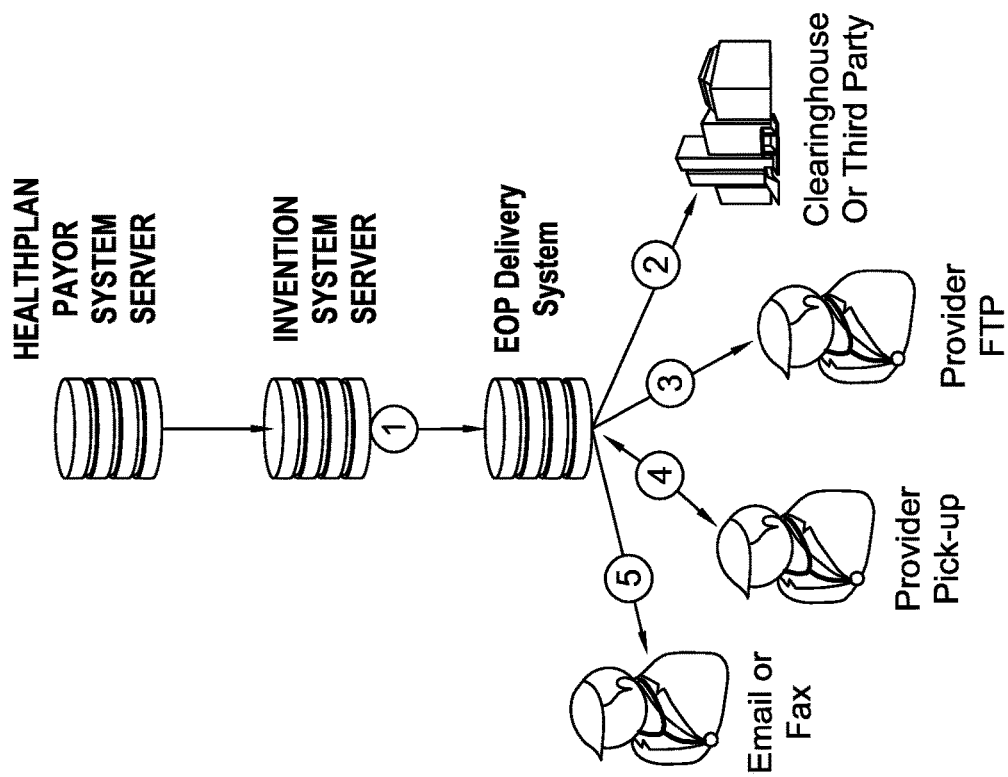

FIG. 15 illustrates alternative embodiments associated with EOP Data Delivery. At 1, EOP data may be delivered to the EOP delivery system to provide payment advice to the provider about their payments based on their delivery preferences. In one embodiment, at 2, 835 data (or some other agreed upon format) may be delivered to the provider by delivering the data to the provider's clearinghouse and/or another designated third party. In another embodiment, at 3, 835 data (or some other agreed upon format) may be delivered to the provider by uploading the data to the provider's FTP. At 4, 835 data (or some other agreed upon format) may be delivered to the provider by letting the provider pick up the data (e.g., by logging into a web portal and downloading the data at a time convenient to the provider). At 5, an email with a data file (e.g., flat file, excel file, pdf file) or a fax with an image of the EOP may be sent to the appropriate party. In some implementations, instead of having an attached data file, the email may include a secure link into a web portal that facilitates the download of the data file by the appropriate party (e.g., upon providing a username and password to log into the web portal).

Figure 16:
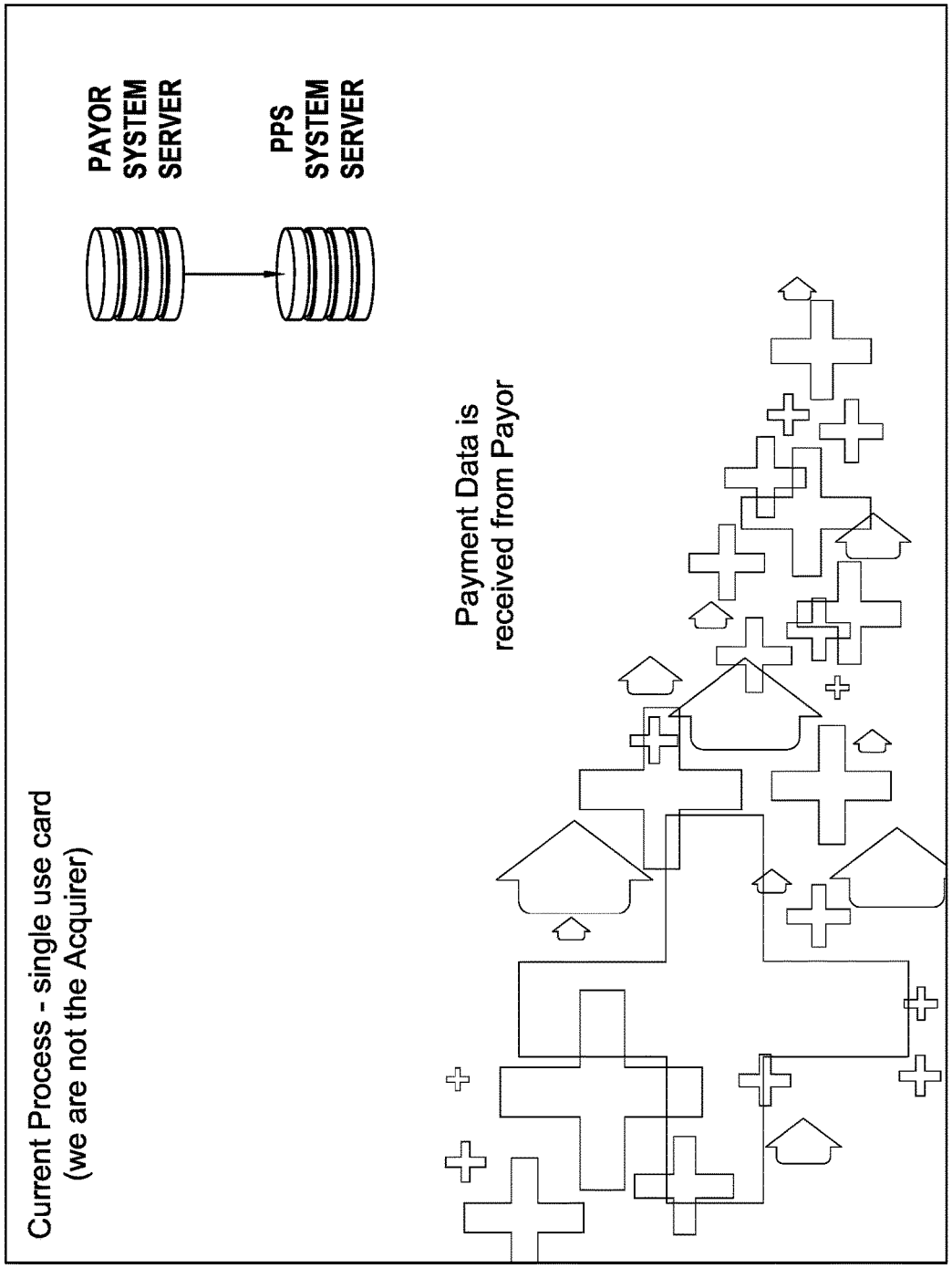

FIGS. 16-40 illustrate a technique that can be used to make payments to healthcare providers. In this example a third-party payment service PPS receives payment data from a payor in step 1, shown in FIG. 16. For example, a payer may provide information saying that a doctor D should be paid an amount X for services provided to a patent P.

Figure 17:
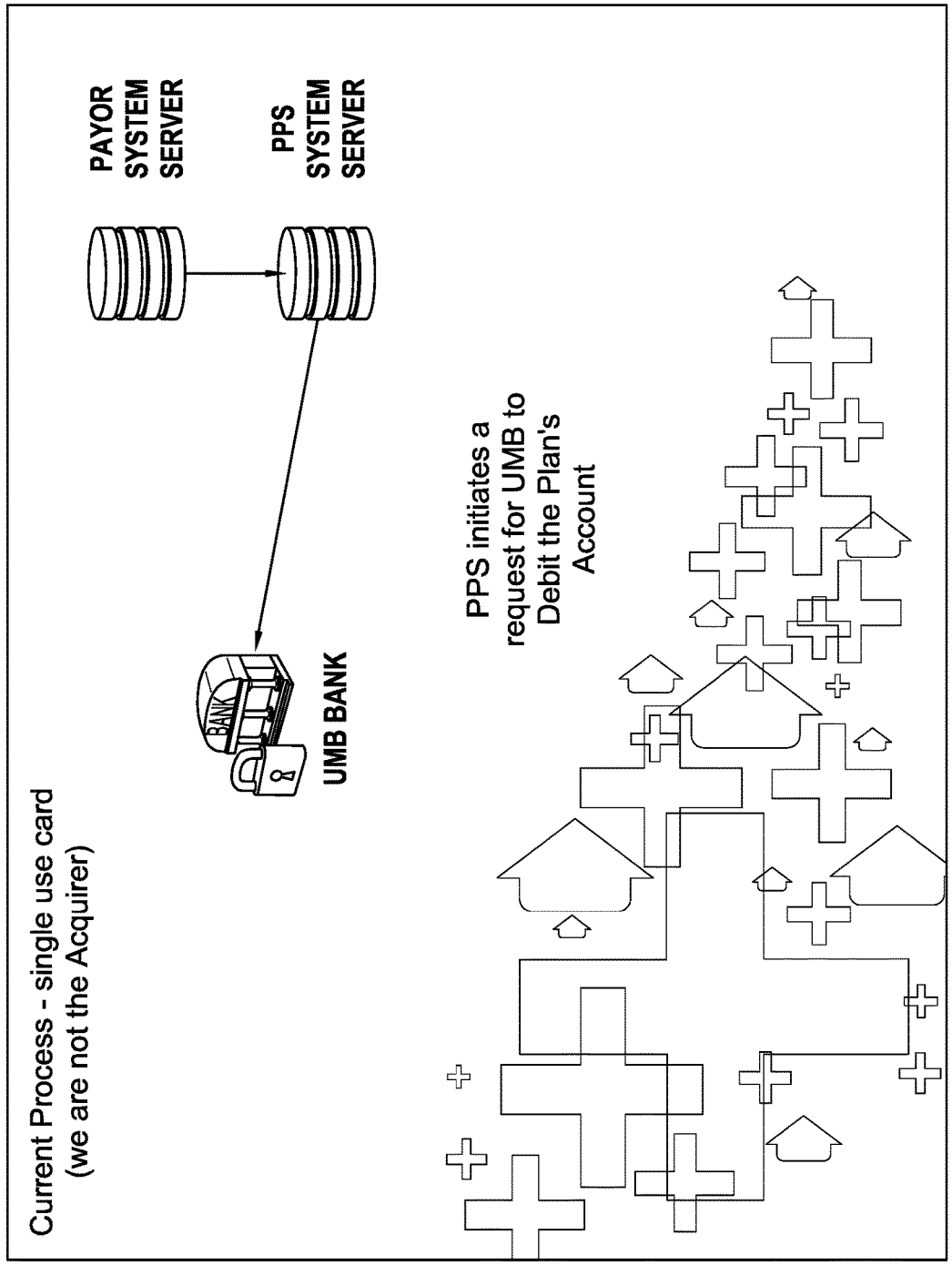

In step 2, shown in FIG. 17, the third-party payment service PPS initiates a request for a Bank (e.g. UMB) to debit the plan's account.

Figure 18:
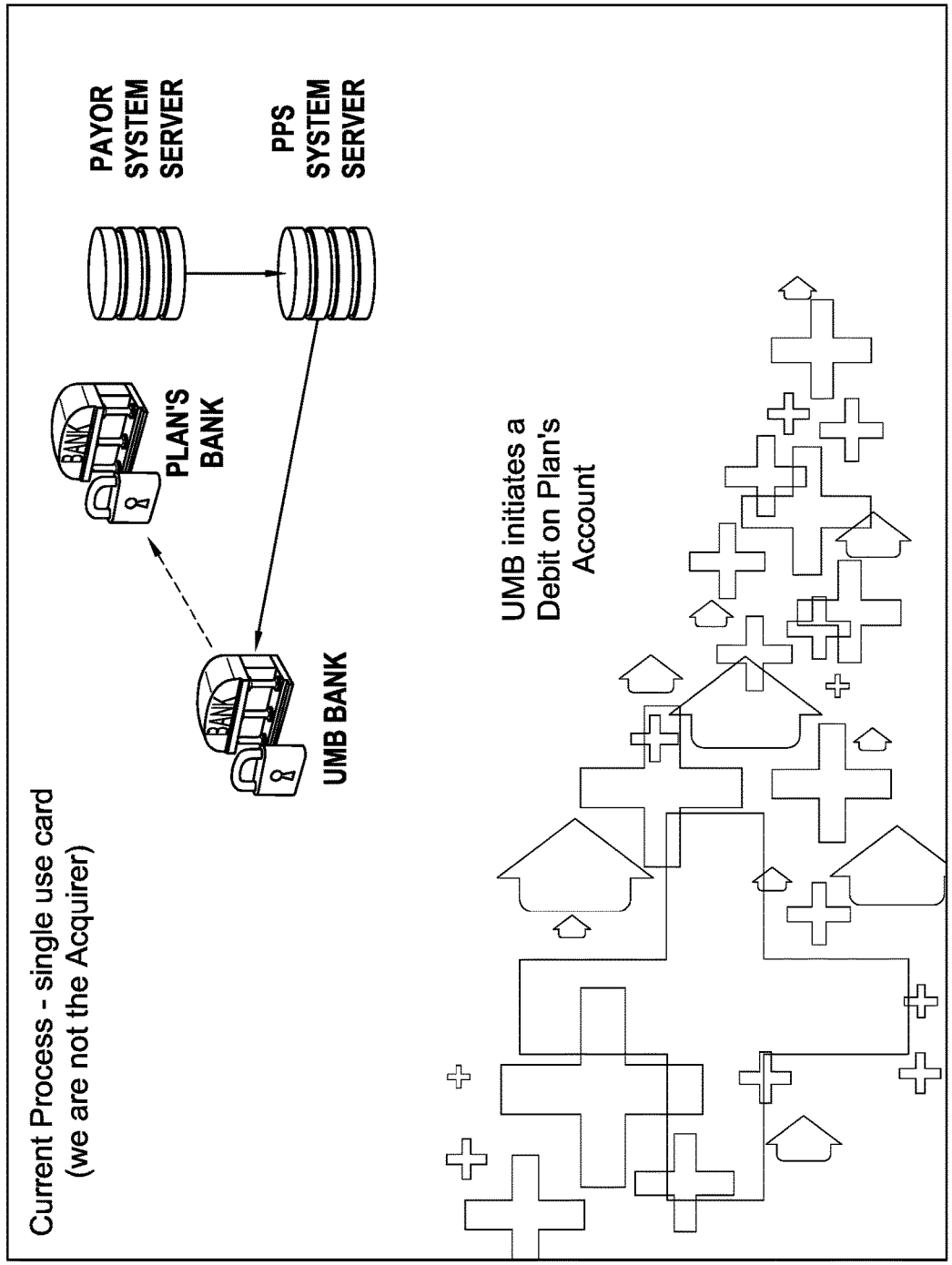

In step 3, shown in FIG. 18, a debit is initiated on the plan's account. This sets up a credit that will eventually come back to the third-party service PPS. Ideally, the third-party PPS receives the money in-house before payment is made to the healthcare provider. These steps are provided as examples of moving money to facilitate the payment, for example, via the issuance of a credit card or other instrument. Additional or alternative steps may be involved.

Figure 19:
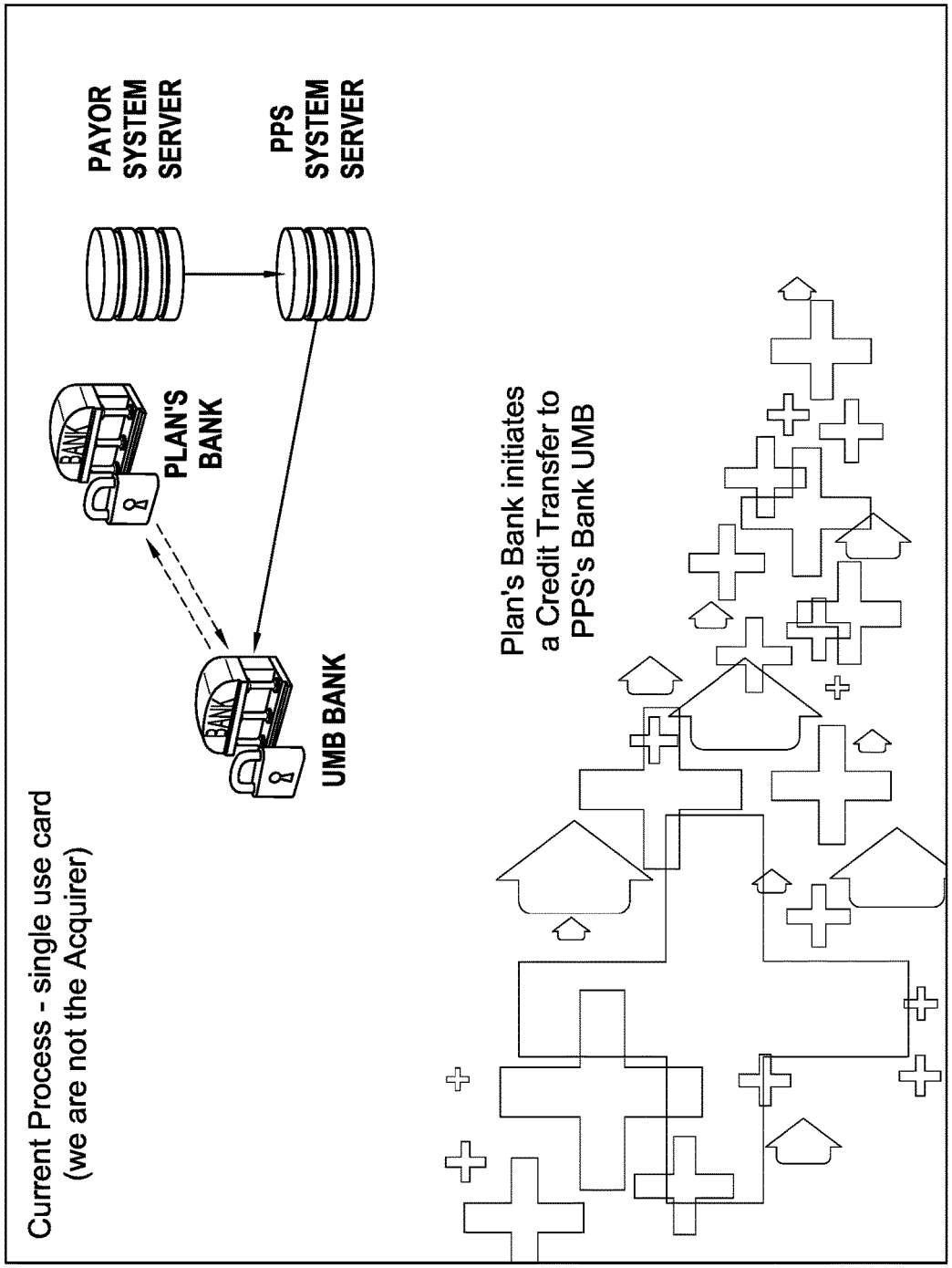

In step 4, shown in FIG. 19, the plan's bank initiates a credit transfer to the third party service provider's bank.

Figure 20:
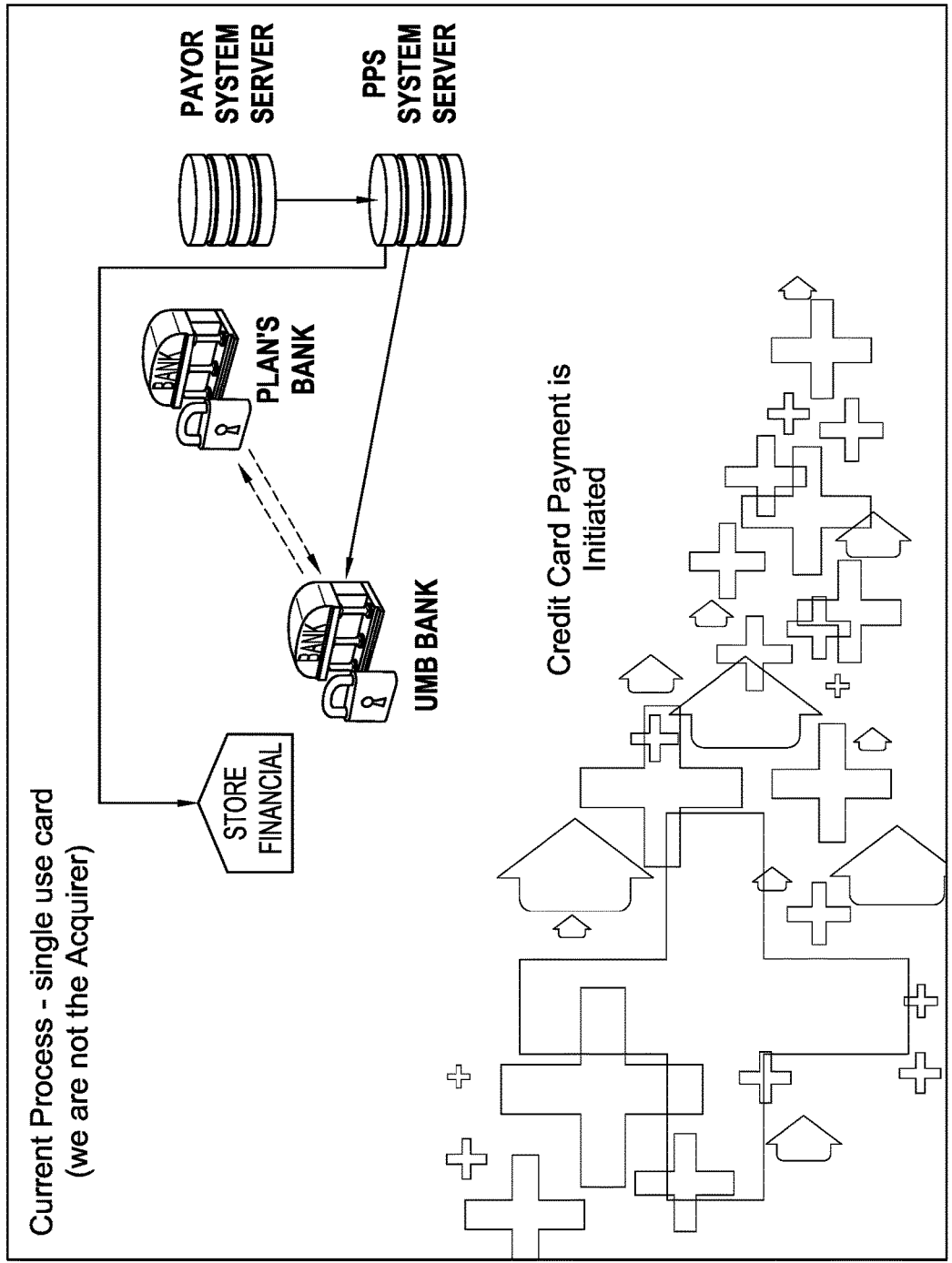

In step 5, shown in FIG. 20, a credit card payment is initiated. This may involve sending a file to an issuer credit card processor, such as Store Financial, and setting up the card so that it can be sent out.

Figure 21:
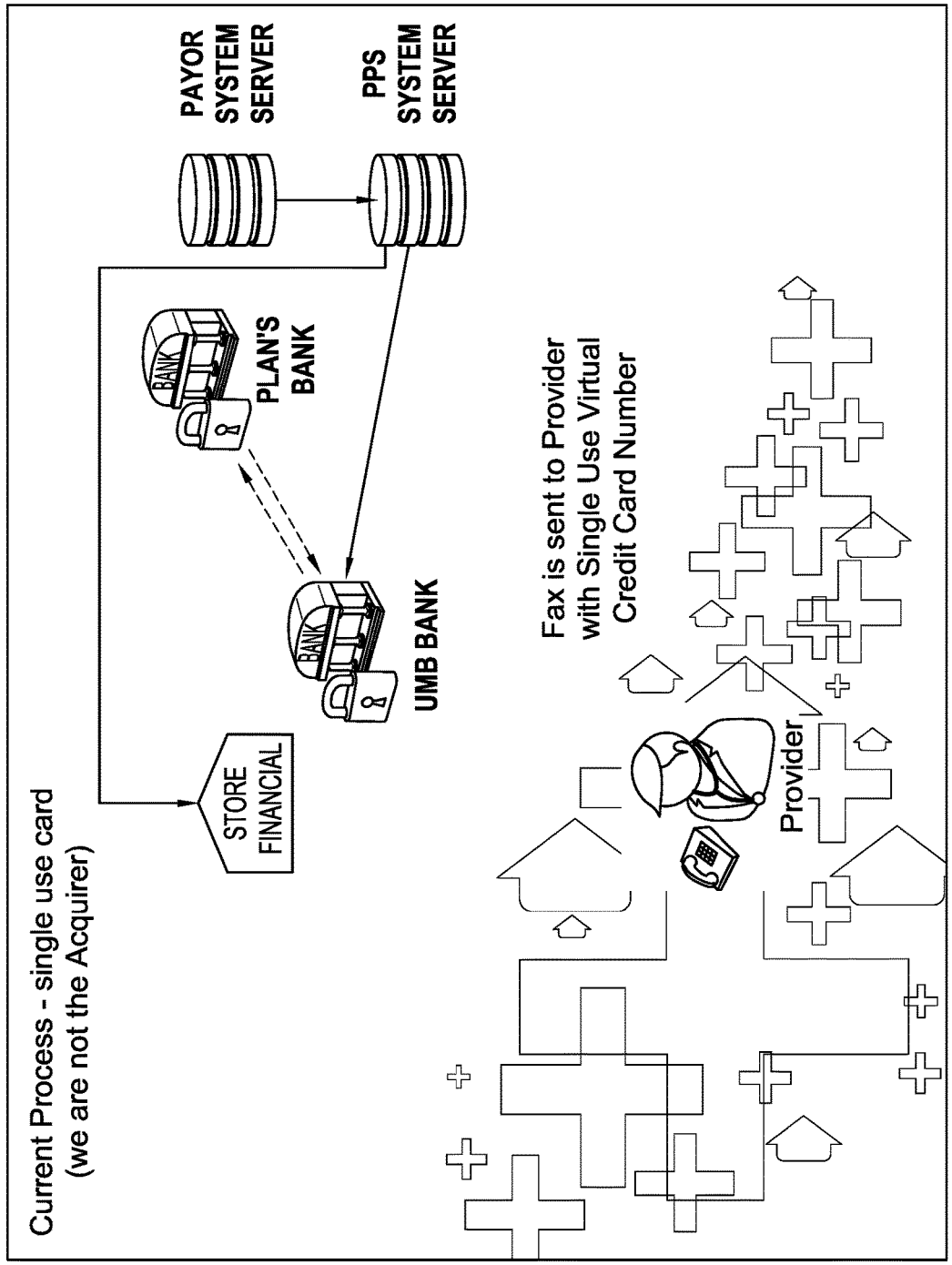

In step 6, shown in FIG. 21, two faxes are sent to the healthcare provider, one for the payment data and one for the payment. In this example, the fax has a single use virtual credit card number that the healthcare provider can use to receive payment.

Figure 22:
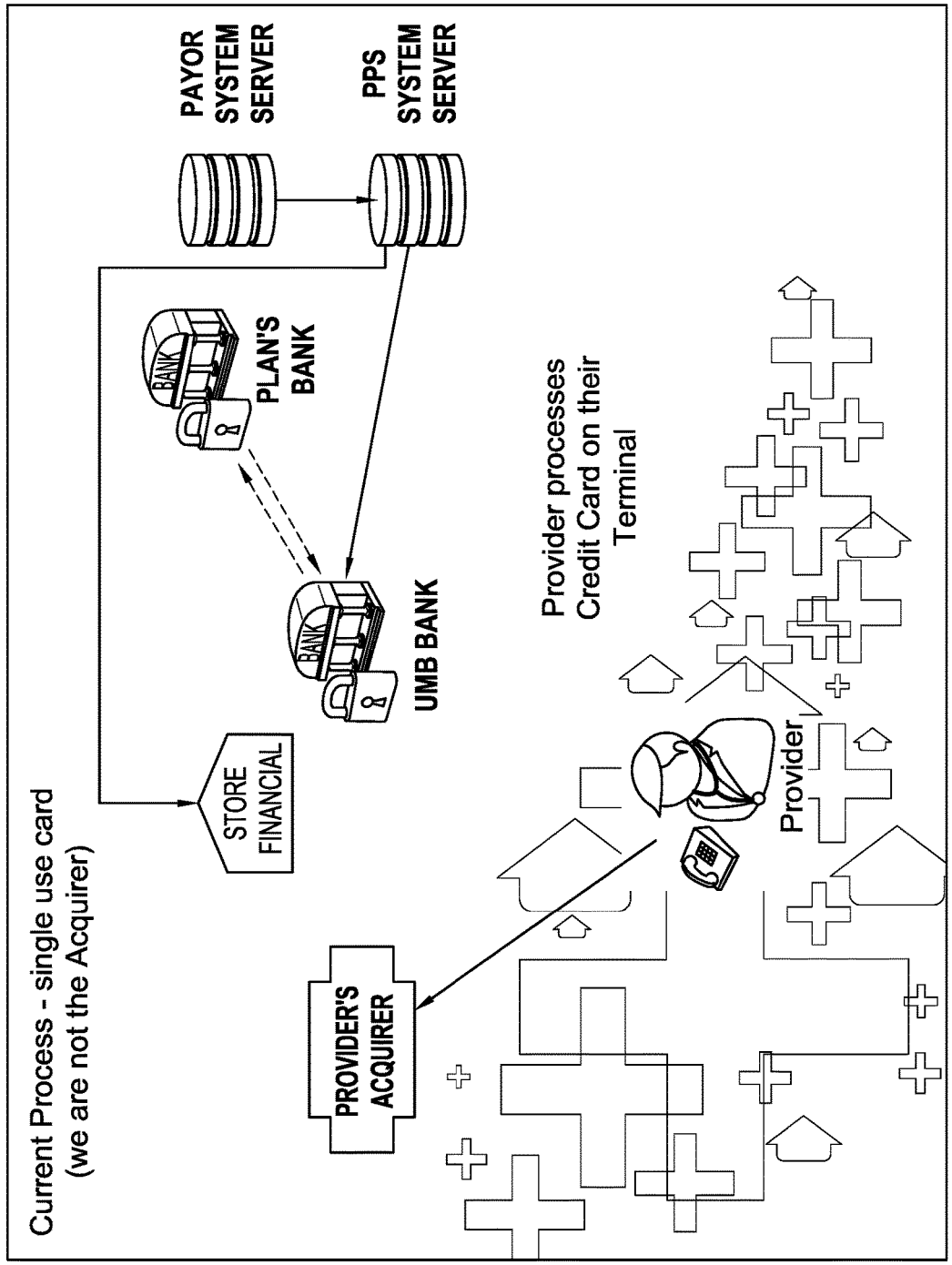

In step 7, shown in FIG. 22, the healthcare provider processes the payment, in this example, by processing the received credit card information using an actual or virtual credit card terminal.

Figure 23:
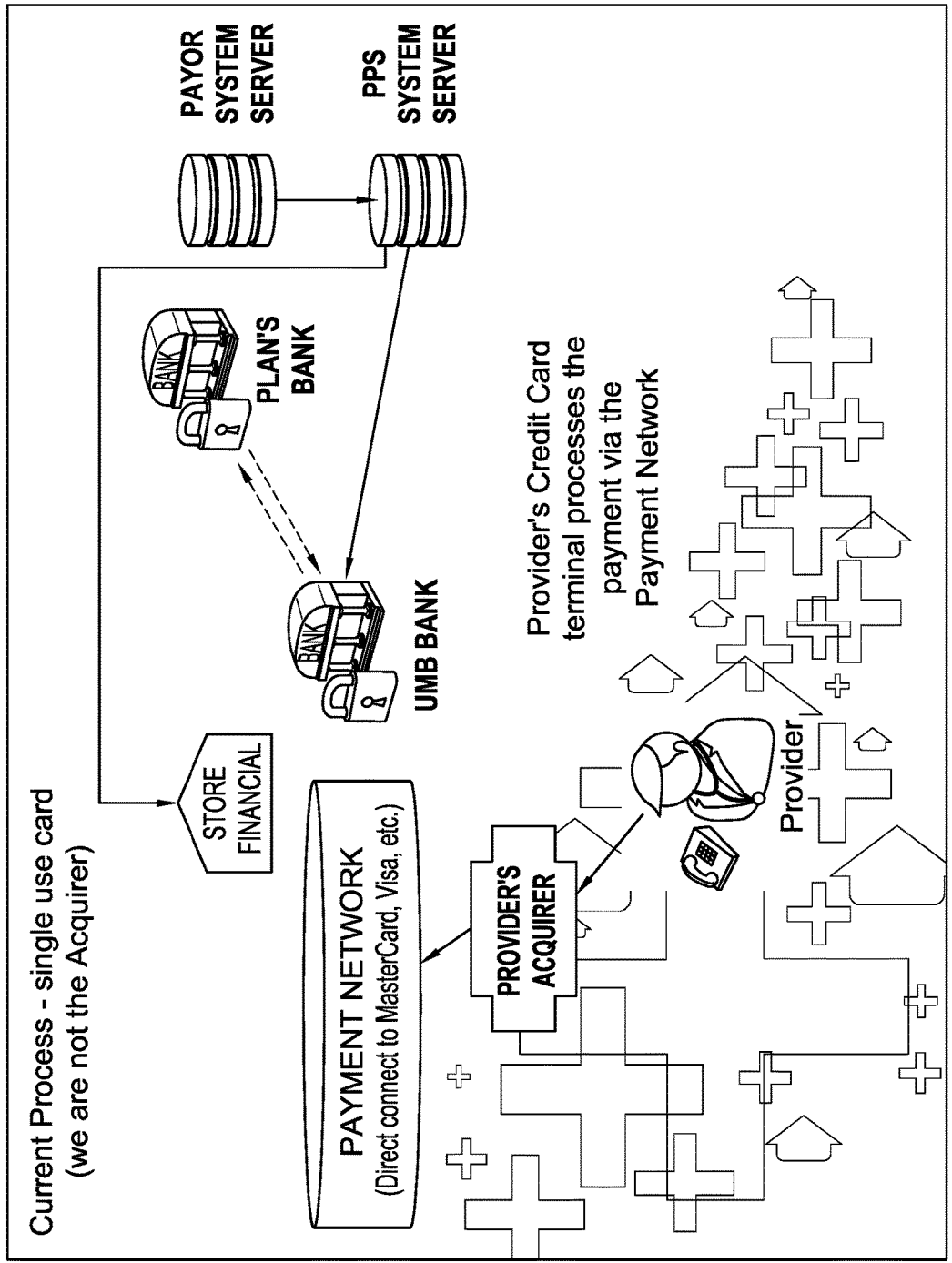

In step 8, shown in FIG. 23, the provider's credit card terminal processes the payment via the payment network. For example, the credit card terminal may connects to a credit card network to connect directly to MasterCard, Visa or another credit card system.

In addition or as an alternative to using credit cards, push payment techniques and other payment techniques may be used.

Figure 24:
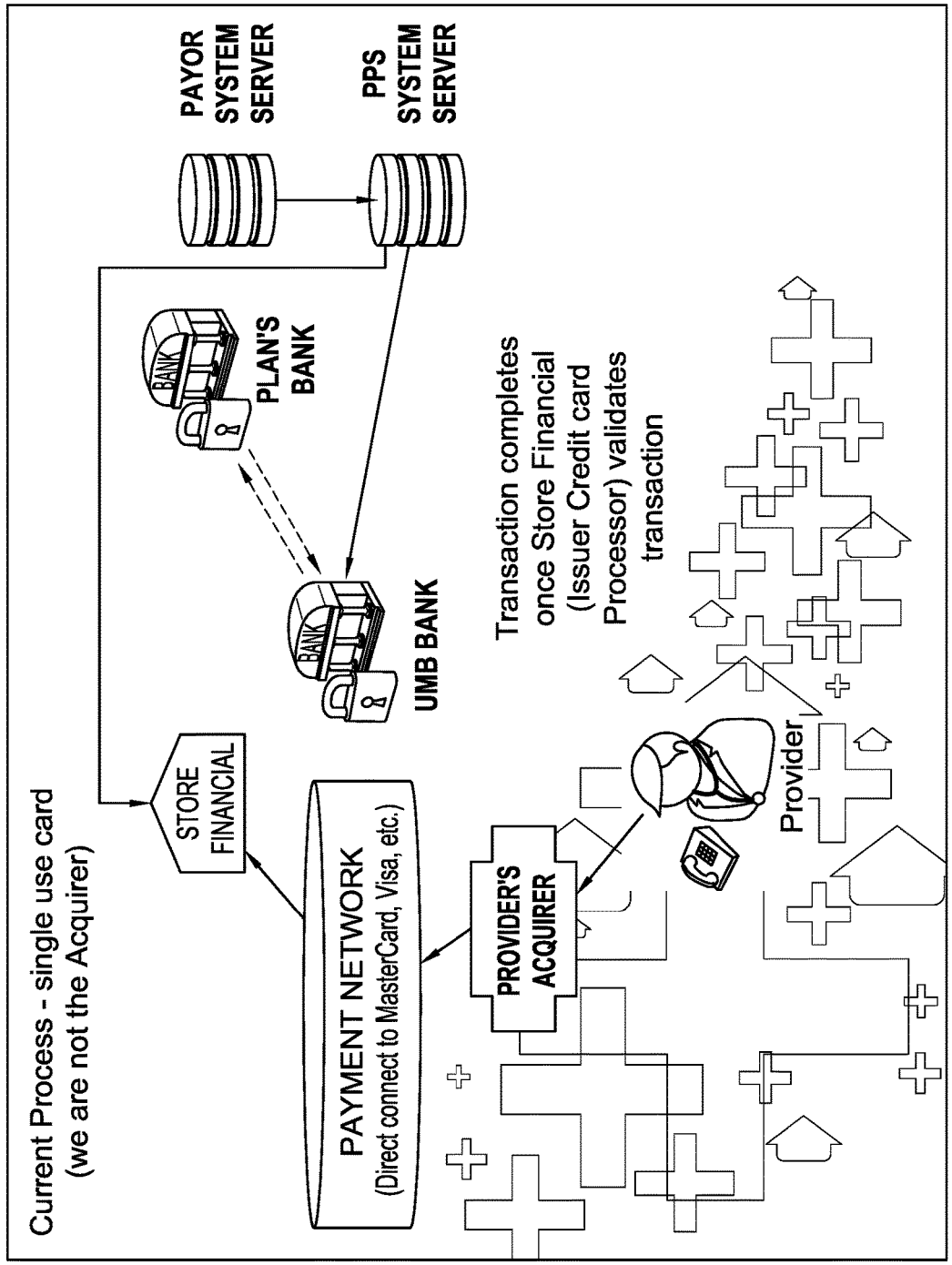

In step 9, shown in FIG. 24, the transaction completes when the issuer credit card processor such as Store Financial validates the transaction. The transaction can be completed by connecting to Store Financial and having Store Financial verify the amount.

Figure 25:
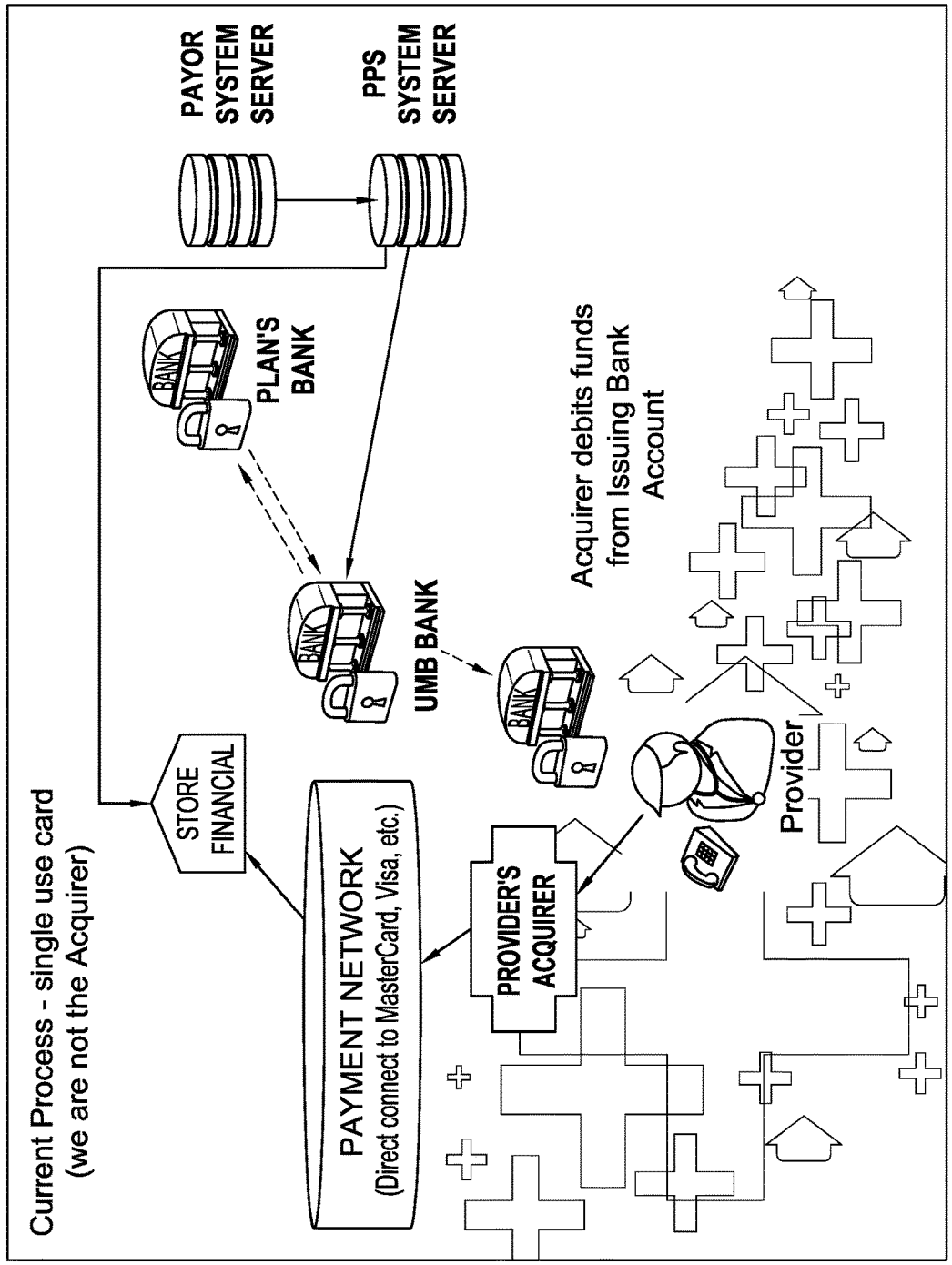
Figure 26:
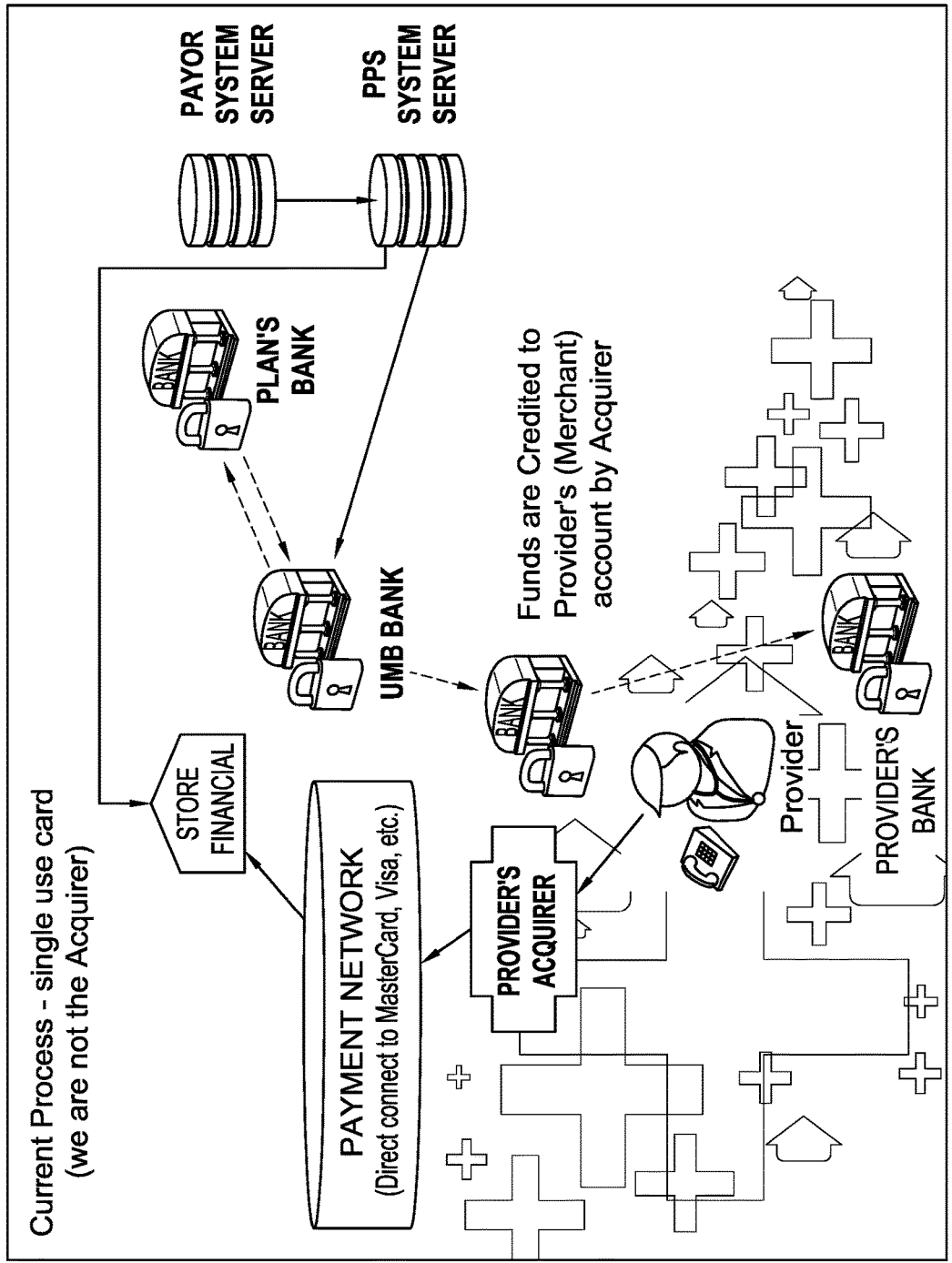

In step 10, shown in FIG. 25, the healthcare provider (i.e., the acquirer) debits funds from the issuing bank account and in step 11, shown in FIG. 26, funds are credited to the healthcare provider's account. These steps move the money from the third party payment service account to the healthcare provider account.

Figure 27:
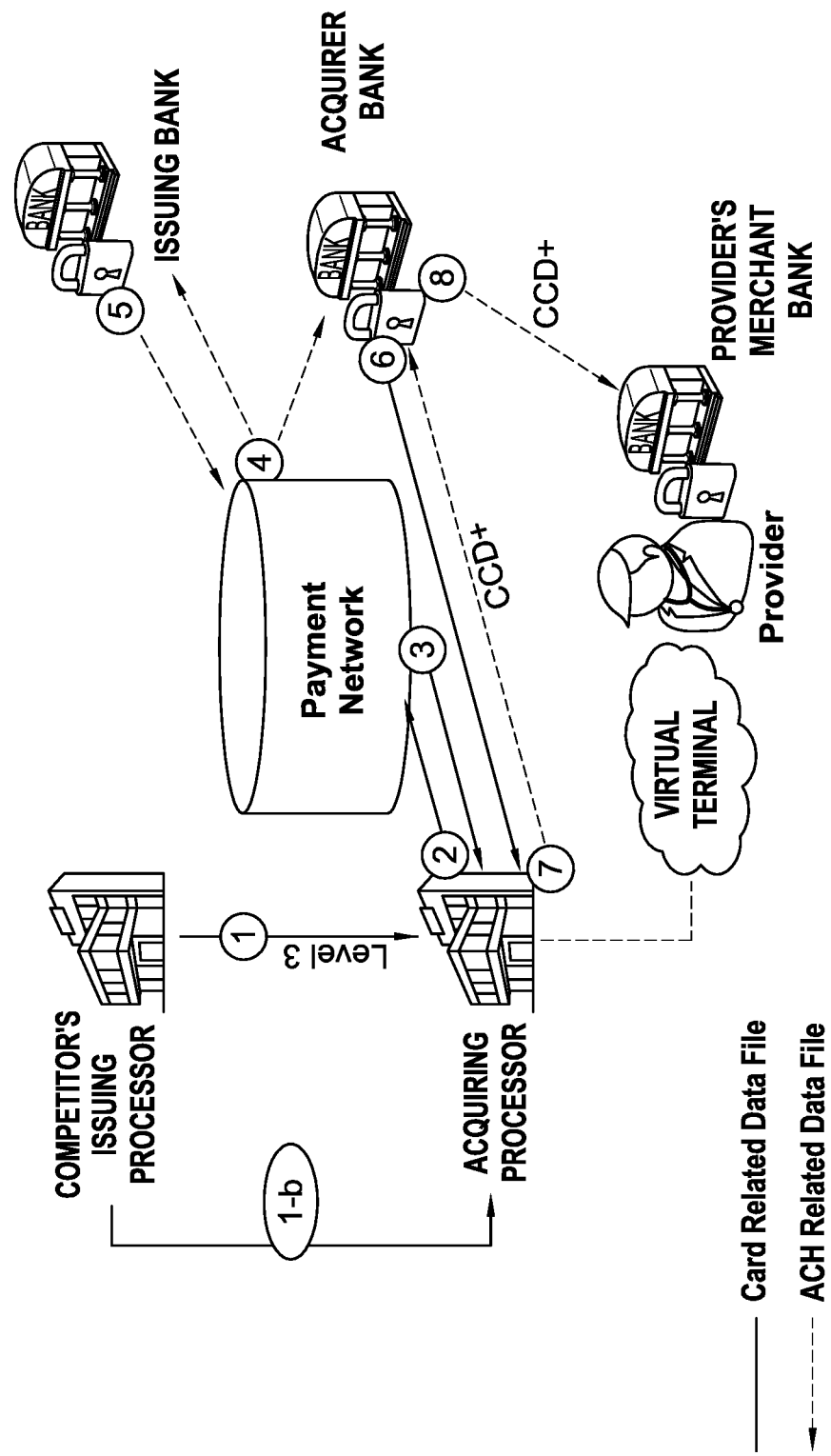

In FIG. 27, a third-party payment service (e.g., Pay-Plus) is the acquiring processor gateway and uses the gateway to capture competitor payments to reduce pricing and earn fees for processing the payments. The healthcare provider may receive payment information from those competitors that are entered into the third-party payment service (e.g., Pay-Plus) provided credit card machines. At 1, the other B2B competing issuing processor may push payment to the acquiring processor for processing using Level 3, which may include the 835 TRN (As an alternate, at 1-*b*, the Issuing Processor may send a separate file containing the 835 TRN and a key to match the 835 TRN with the payment in 1). At 2, the acquiring processor will validate pricing with the payment network (e.g., MasterCard) which may be BSA pricing which evokes a response at 3. At 4, the payment network may ACH debit Pay-Plus's issuing bank for settlement funds on behalf of the acquirer and credit to the acquirer bank may be sent via ACH to the Pay-Plus acquirer's bank. At 5, the issuing bank may forward the funds to the payment network (e.g., MasterCard). Upon completion of the settlement process in one embodiment, Pay-Plus may be the acquirer and may settle the payment to the provider merchant virtual terminal. At 6, the acquiring bank may notify the acquiring processor the ACH debit from the issuing bank is complete and the acquiring bank is then instructed at 7 to initiate an ACH credit to the provider merchant account using the CCD+ format (at 8), which includes the 835 TRN from the Level 3 data.

In some embodiments, a medical service provider may provide services to multiple patients and accept payments from multiple payors including but not limited to the patients themselves, insurance companies, self-funded corporations, unions, and other third-party payors. An intermediary can act between payors and service providers to reduce the amount of effort required by the medical service provider to accept and track payments made by payors for services provided to patients.

An exemplary payment facilitation system may use an intermediary server which acts as an intermediary between one or more payors and one or more service providers to provide various functions related to the payment of a provider for services. Such functions include, but are not limited to, aggregating payments, providing a physical or virtual card preloaded with funds for payment, pushing the payments to a provider's credit card merchant account, transferring the payment to a provider's bank account and/or tracking information related to the payments. A merchant account may be a line of credit account or a bank account with an acquiring bank or financial institution that processes credit and/or debit card payments. The intermediary server may be provided by a third party other than the payors and service providers. The payors and service providers, for example, may contract with the third party intermediary to perform such functions. In one embodiment, the system offers different tiers of membership where the different tiers receive different services. As a specific example, the intermediary may process payments on behalf of a payor to both service providers that are members and service providers that are not members, providing features to members that are not available to the non-members.

An exemplary payment facilitation system may include a third party system that receives a plurality of payment files, payable to one or more member and non-member providers of the third party system, from a plurality of payors. The system may determine that one or more of the payment requests are payable to a member provider. The system may then request and aggregate funds from multiple payors into a single payment to a member provider. The single payment is made to an account associated with the member. If the member provider has chosen to have his aggregated payment pushed into his merchant account, the payment may be pushed into his merchant account without requiring that the member act to receive the payment. To accomplish this, the member provider may have provided the third party system with information sufficient to identify his merchant account. Thus, the member provider would receive the aggregated payment in his merchant account as a push payment, i.e., without necessarily having to enter any information into his credit card machine, terminal or web based computer program.

In another embodiment the member provider may have chosen to have the single aggregated payment transferred from the account associated with the member provider directly to his bank account using the Automated Clearing House (ACH), which is an e-payment network which allows fund transfers to occur using Electronic Funds Transfer (EFT).

The following example is provided to illustrate an exemplary use of a system in which an intermediary acts to aggregate and/or push payments directly into a member provider's merchant account or bank account. In this example, two payors (P1 and P2) each send requests to the intermediary server requesting payments be made and delivered to each of two medical service providers M1 and M2. An exemplary request is an electronic message or file containing the details of the request. Medical service provider M1 is a member of the third party system and has set up his account to have his/her aggregated payments pushed to his merchant account, in doing so M1 has provided the third party system with sufficient information to identify his merchant account with a merchant bank, for example the member provider's Merchant ID and Terminal ID. Service provider M2 is also a member of the third party system and has set up his account to have his his/her aggregated payments deposited directly into his bank account, and has provided the system with sufficient information to identify his bank account. The intermediary server receives P1 and P2's payment requests and determines that payments are to be made to both M1 and M2.

The intermediary server requests the funds for M1 from P1 and P2's accounts and coordinates the transfer of those funds into a bank account associated with M1. This account is used by the system for issuing payments to M1. The intermediary server then instructs the bank server to push the funds, which amount to the aggregated payment from P1 and P2, from the bank account associated with M1 to a processor for receipt, processing and depositing into M1's merchant bank account. In doing so, the funds appear in M1's merchant account as if M1 accepted a credit card payment via the member provider's credit card machine or terminal for the single aggregated payment amount, but without any action being taken by M1, i.e., M1 does not have to swipe a credit card through a credit card machine. The push can be facilitated by a transaction processor that, for example, also receives requests to make payments into the merchant account via an associated credit card machine or terminal. The processor may be a part of a credit card network, it may be associated with the intermediary server, it may be associated with a merchant bank server, or may otherwise be provided.

Service provider M2, having requested his aggregated payment be deposited directly into his bank account, will have provided the third party system with information related to his bank account, such as the routing and account numbers for the member provider's account. The intermediary server requests the funds for M2 from P1 and P2's accounts and transfers those funds into a bank account associated with M2 and used by the system for issuing payments to M2. The intermediary server then instructs the bank server to push the funds, which amount to the aggregated payment from P1 and P2, from the bank account associated with M2 directly into M2's bank account, in some cases using ACH. Both M1 and M2 may receive notification of the aggregate payment made and may have access to information related to their respective aggregate payments via a secure web portal.

Pushing payments into a member provider's merchant account may be accomplished in various ways. In an exemplary payment facilitation system where a member provider chooses to have his/her single aggregated payments pushed to his merchant account, he may provide information sufficient to identify his merchant account including, for example, one or more of a Merchant ID, Terminal ID, Connection User Name, Connection Password, BIN (Bank Identification Number), Terminal ID, Bank ID, User Name, Password, Check Digit, POSID (Point of Sale ID), Authentication Code, Merchant Zip Code, or other information sufficient to identify the member provider's merchant account.

In still yet another embodiment the member may be issued a virtual or physical card, which may be a reloadable or a one-time use card. The card may be associated with an account at a card issuer bank associated with the member provider. The member provider may choose to have his/her single aggregated payments transferred to the account at the card issuer bank associated with the member provider's card. When swiped in a payment card device, either physically or by manually entering the card numbers into the device, the card may move funds from the card issuer bank account associated with the member (and card) to the account to which the credit card device is linked. When the card is swiped the number is entered into the credit card terminal and the payment amount is entered, the terminal requests funds from the card issuer bank server using a processor such as the United States credit card association network. A response, such as an approval, may be transmitted to the credit card terminal. Upon approval, funds may be electronically moved from the account associated with the member at the card issuer bank to the account associated with the credit card terminal as dictated by the bank associated with the card's settlement process. For example, funds payable to a member provider from various payors may be deposited into an account associated with the member provider (and card) at the card issuing bank, and when the card is swiped in the credit card terminal, the funds may be moved from the account at the card issuer bank to the merchant account linked to the credit card terminal. The member provider may receive a notification, such as an e-mail, text message or fax, notifying the member provider that funds are available on the member's card and the amount of the aggregated payment available.

A reloadable card may be similar to a stored value card in that an amount is deposited for either type of card. A reloadable card may differ from a stored value card in that a stored value card may be a one-time use card, for example a gift card. A reloadable card may be used multiple times for multiple transactions. A reloadable card may have an expiration date, but like credit cards the card may expire years after the issue date, and may be replaced with a current card prior to that expiration date. A stored value card may have an expiration date for the amount loaded on the card, may not be reissued, and may not be loaded with additional funds beyond the initial value. A virtual card may comprise a file or notification containing information sufficient to allow the provider to transfer funds from the account associated with the member provider to the member provider's merchant account, using the member provider's credit card terminal. For example, a virtual card may be an e-mail or facsimile containing a card number, an expiration date and a card security code, each of which may be manually entered into the member provider's credit card terminal to transfer funds from the account associated with the member provider and the card to the member provider's merchant account.

In an embodiment, once a provider becomes a member, information about the provider may be compiled and added to a membership list. A card associated with a card issuing bank may be mailed or delivered to the member provider office staff. This delivery may also include introductory materials. This card delivery may be initiated by the system. The member provider card may be physically sent out by the card issuing bank. The system may direct the card issuing bank regarding what cards and/or materials to send and when, where, and how to send them. In some embodiments, the acts of sending out the card and associated materials may be performed by the card issuing bank. In other embodiments, the card issuing bank may outsource the process to a certified fulfillment company. In some other embodiments, no card may be issued, in which case the aggregated payment may be made directly between banks through ACH transfers, may be pushed directly into a member provider's merchant account, or otherwise.

In some embodiments, member providers may have a merchant category code (MCC) assigned to their reloadable card which may limit the card's use to certain payment card terminals. For example, the MCC code may be a four-digit number assigned to a business by MasterCard, VISA, or some other card provider. In some card networks and systems, all merchants have an MCC associated with their payment card terminal when the business starts accepting a reloadable card as a form of payment. In the case of a member provider, the MCC may signify that the MCC assignee is a medical provider. The card may be limited to use with a card terminal having a matching MCC assignment and/or to card terminals having codes indicating that they are associated with medical providers.

Non-member providers may not be offered the same options for payment for their services. For example, non-member providers may only receive non-aggregated payments on a payor-by-payor basis via either printed check, or one-time use cards. The one-time use card may be either a physical card or a virtual card and may be pre-loaded with the payment amount associated with a single payor's payment. A non-member may not have access to the portal and may not receive a notification that a payment has been loaded onto the one-time use card, other than receipt of the card and instructions for its use.

In an embodiment the intermediary server may also provide a member provider with a notification of a payment made via ACH, deposited into the merchant account, or made available via the virtual or physical card. The intermediary server may also provide access to information related to the aggregated payment, for example the payments aggregated on a payor-by-payor basis, and an explanation of payment (EOP) for each payment included in the aggregate payment. This information may be accessible via a web portal or other network access.

The web portal may provide several functions to users. For example, providers may elect to become members, options may be made available to members such as communication options for notification of available funds (for example, by text message to a phone. e-mail, or fax), options on how to receive data detailing payment information (such as EOP data) into member record keeping systems or practice management systems (such as system A40 shown in FIG. 28) (for example by printing and manual entry, downloading various file types for importing into the practice management system, and/or visually reviewing the EOP data).

Users associated with the member providers may log into the web portal and may view transactions, print them, and/or download them in a file which may be imported into the member provider's practice management system. For example, this file may be used to note received payments in patient accounts. Historical and recent transaction records may be maintained and made accessible in the web portal. The data downloaded by the member provider may be transmitted using any technology, for example SMTP, SMS, MMS, HTTP, HTTPS, FTP, and/or other formats. In some embodiments the member provider users may download a spreadsheet file, a CSV file, a PDF file, or an 835 file for loading into their practice management system. An 835 is an insurance industry standard X12 Transaction Set. The data contents of the health care claim payment/advice 835 file may be used to make a payment and/or send an EOP remittance advice from a payor to a health care provider either directly or via a financial institution. The web portal may also allow a user to select member features, to select how they are notified of funds availability, and/or select how they obtain data to load into their practice management system and reconcile payments. For example, a day's payment may be an aggregated amount of $12,000 for ten different patients from ten different payor servers. By loading the file into their practice management system, a user may be able to electronically cancel out receivables for the ten patients from the ten different payor servers. The web portal may provide information about membership benefits and policies. The web portal may also enable membership activation by collecting registration data from providers. Should a provider decide to become a provider member, they may have the ability to create a user ID and password within the membership portal, elect notification means for payment notifications (for example, e-mail, dial-up IVR, fax, text message to a mobile device, member log-in), agree to terms of membership, give notice of payors from which they would like to receive payment through the system, and/or provide a digital signature agreeing to terms of membership.

Figure 28:
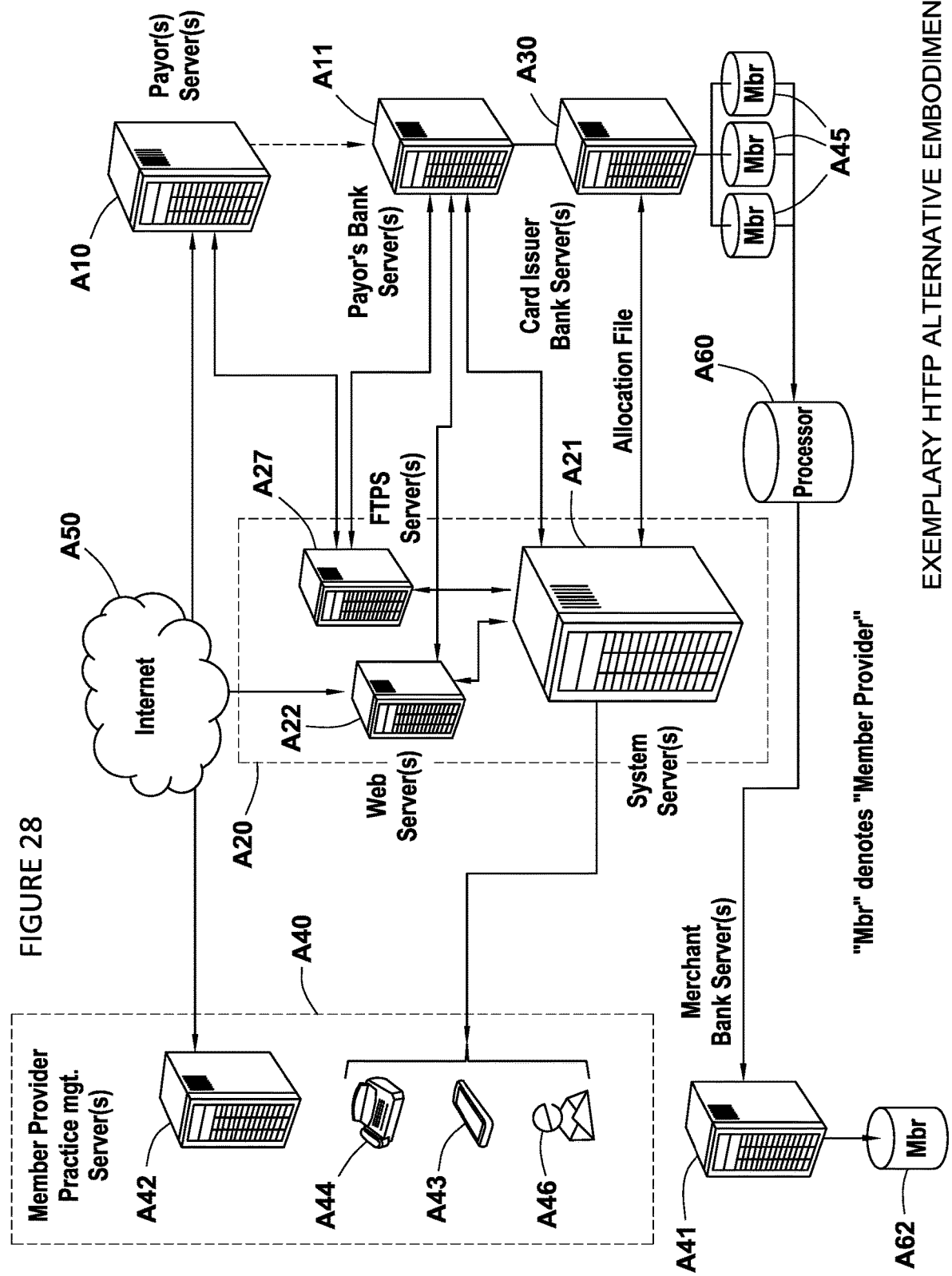

FIG. 28 depicts an exemplary payment facilitation system. In some embodiments, the system A20 may facilitate payments for medical services to medical service providers from entities responsible for paying at least a portion of those services ("payors"). The system A20 may comprise one or more computers. A computer may be any programmable machine capable of performing arithmetic and/or logical operations. In some embodiments, computers may comprise processors, memories, data storage devices, and/or other commonly known or novel components. These components may be connected physically or through a network or wireless links. Computers may also comprise software comprising instructions performed by one or more processors that may direct the operations of the aforementioned components. Computers may include servers, PCs, mobile devices, and other devices that are capable of performing the described functions.

The computers of the system A20 may include one or more servers A21, webservers A22, and/or FTP servers A27. In some embodiments, various functions associated herein with the system servers A21, web servers A22, and FTP servers A27 may be added, omitted, or modified. In some cases different servers may perform different functions, or functions may be shared among servers in different ways without departing from the scope of the specification. A system server A21 may process data sent to or received from a payor server A10, payor's bank server A11, card issuer bank server A30, member provider server A42, and/or any other server. The system server A21 may communicate with these servers via a web server A22, FTP server A27, and/or any other communication channels or networks which may connect the various servers using traditional or novel communication lines and protocols. The member provider server A42 may be a server, Person Computer (PC), mobile device, or other device capable of performing the described functions.

The web server A22 may provide a communications portal which houses the system's website, and may handle communication with the Internet A50 in some embodiments. The system's website or web portal, may provide public and/or private visibility to membership services and information which may be associated with the system. Providers may sign up to be members of the system and in doing so may have increased options and benefits for services provided by the system as compared with non-members. For example, non-members may not receive single aggregated payments, but instead may be limited to receiving a payment on a payor-by-payor basis via a physical or virtual card that must be swiped or manually entered in their credit card terminal. Member providers, however, may receive single aggregated payments from multiple payors that may be pushed directly into their merchant accounts without having to swipe a credit card, or transferred to their bank account via an ACH transfer.

One or more payor servers A10 may be connected to the system A20. A payor server A10 may be a server operated by a payor, such as an insurance company, self-funded corporation, third-party administrator, union, or the like. Connections to the payor server A10 may include a variation of file transfer protocol such as FTP or FTPS, Internet A50 file transfer, a direct data line connection using commercially available or propriety data lines and transmission protocols, and/or secure and non-secure email communication via the Internet A50. The FTP server A27 may provide FTP and/or FTPS (secure FTP) connectivity between computers in the system A20 and external servers such as the payor server A10, the payor's bank server A11, and/or others. In some embodiments the connection type may be selected by the payor server A10.

One or more of payor's bank servers A11 may be connected to the system A20. A payor's bank server A11 may be a server operated by a bank at which one or more payors has an account. Connections to the payor's bank server A11 may include FTPS, Internet A50 file transfer, a direct data line connection using commercially available or proprietary data lines and transmission protocols, and/or secure and non-secure email via the Internet A50. In some embodiments the connection type may be chosen by either the payor server A10 or the payor's bank server A11. In some embodiments the system A20 may communicate with the payor's bank server A11 through the payor server A10. This communication option may be provided instead of or in addition to, a connection between the system A20 and the payor's bank server A11. In such an example, the system A20 may communicate with the payor's bank server A11 through the payor server A10 by sending a communication to the payor server A10, which may reroute the communication using any of the above communication options.

One or more card issuer bank servers A30 may be connected to the system A20. In another example the card issuer bank may outsource the server's functions to a third party processor. A card issuer bank server A30 may be a server operated by a bank which may issue real or virtual cards linked to an account at the card issuer bank. The system server A21 may instruct the payor's bank server A11 to transfer funds from the payor's accounts to the card issuing bank server A30. The system server A21 may then instruct the card issuing bank server A30 to divert the funds received from the payor's bank server A11 into specific accounts associated with specific member providers A45. The card issuer bank server A30 may have accounts A45, each associated with individual member providers. The system server A21 may instruct the card issuer bank server A30 to push funds from the member provider's account A45 to a processor A60 for authorization and deposit into the member provider's merchant account A62. The processor A60 may be a credit card processor, a merchant account provider, a credit card network, the system server A21, a payment gateway or another third party processor. The processor A60 authorizes the transfer of funds and instructions the merchant bank server A41 to deposit the funds into the member provider's merchant account A62. In summary, the funds are transferred from the account A45 associated with the member provider into the member provider's merchant account A62 as if the payment had been made at the member provider's office using the member provider's credit card machine/terminal. The system may be notified by the processor A60 that the funds were successfully deposited in the member provider's merchant account A62, the system may send a notification to the member provider in a method the member provider has chosen (for example, email A46, fax A44, text A43, or displayed when a user associated with a member provider logs into the member web portal provided on web server A22). The member provider A40 may access the member web portal using member provider practice management server A42 via the Internet A50.

Figure 29:
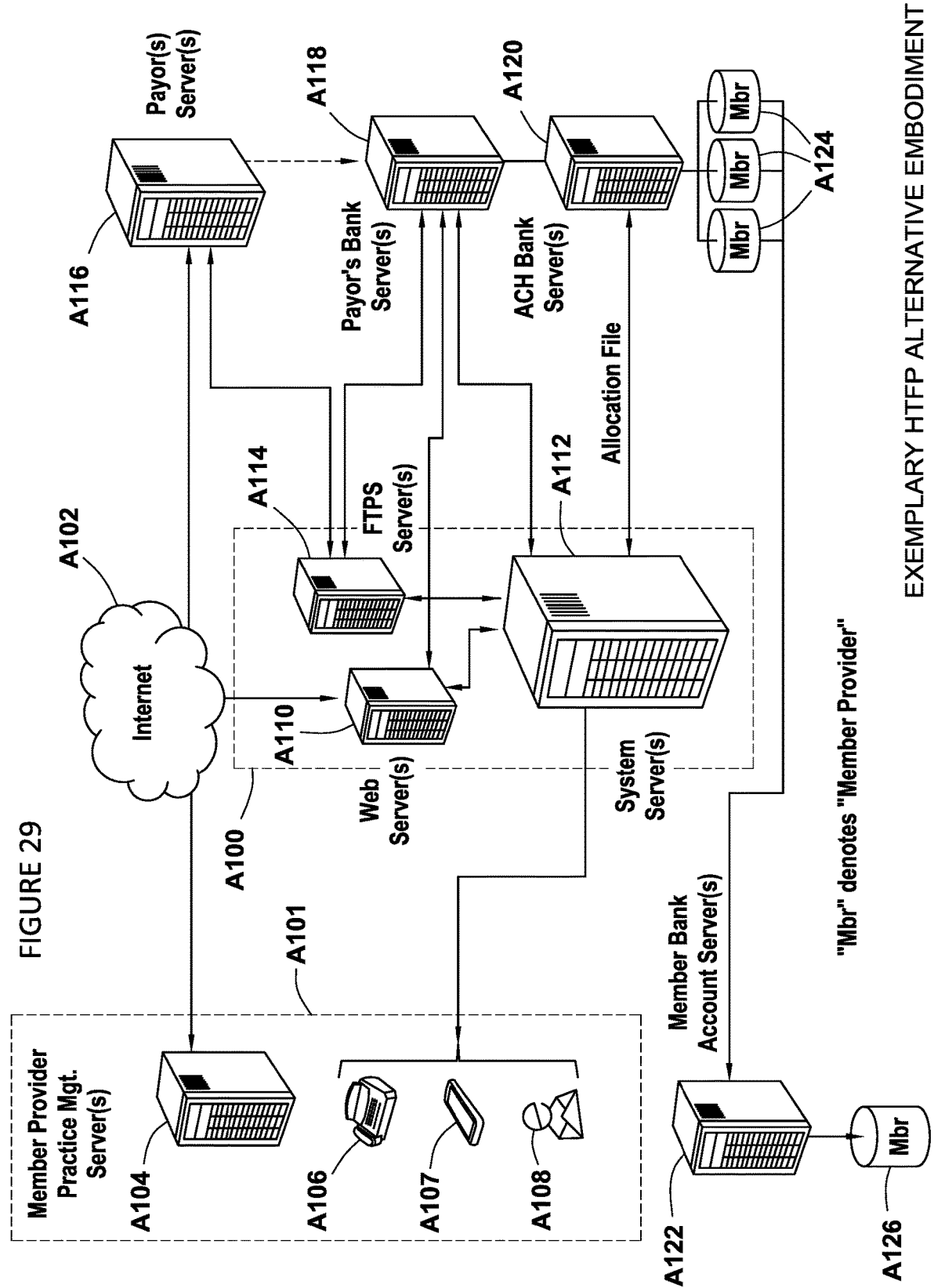

In other embodiments a bank server accessible to the Automated Clearing House Network (ACH) and member bank account server may communicate directly using ACH funds transfer systems, as depicted, for example in FIG. 29. As shown in FIG. 29 a system A100, having a system server A112 may process data sent to or received from a payor server A116, payor's bank server A118, ACH bank server A120, member bank account server A122, and/or any other server. The system server A112 may communicate with these servers via a web server A110, FTP server A114, and/or any other communication channels or networks which may connect the various servers using traditional or novel communication lines and protocols.

The web server A110 may provide a communications portal which houses the system's website, and may handle communication with the Internet A102 in some embodiments. The system's website or web portal, may provide public and/or private visibility to membership services and information which may be associated with the system. Providers may sign up to be members of the system and in doing so may have increased options and benefits for services provided by the system as compared with non-members. For example, non-members may not receive aggregated payments, but instead may be limited to receiving a payment on a payor-by-payor basis via a physical or virtual card that must be swiped in their credit card terminal. Member providers, however, may receive an aggregated payment from multiple payors that may be pushed directly into their bank account via the ACH.

One or more payor servers A116 may be connected to the system A100. A payor server A116 may be a server operated by a payor, such as an insurance company, self-funded corporation, third-party administrator, union, or the like. Connections to the payor server may include a variation of file transfer protocol such as FTP or FTPS, Internet file transfer, a direct data line connection using commercially available or propriety data lines and transmission protocols, and/or secure and non-secure email communication via the Internet A102. The FTP server A114 may provide FTP and/or FTPS (secure FTP) connectivity between computers in the system A100 and external servers such as the payor server A116, the payor's bank server A118, the ACH bank server A120, and/or others. In some embodiments the connection type may be selected by the payor server A116.

In some embodiments the system A100 may communicate with the payor's bank server A118 through the payor server A116. This communication option may be provided instead of or in addition to, a connection between the system A100 and the payor's bank server A118. In such an example, the system A100 may communicate with the payor's bank server A118 through the payor server A116 by sending a communication to the payor server A116, which may reroute the communication using any of the above communication options.

One or more ACH bank server(s) A120 may be connected to the system A100, in another example the ACH bank server A120 may outsource the server's functions to a third party processor. An ACH bank server A120 may be a server operated by a bank. The system server A112 may instruct the payor's bank server A118 to transfer funds from the payor's accounts to the ACH bank server A120. The system server A112 may then instruct the ACH bank server A120 to divert the funds received from the payor's bank server A118 into specific accounts A124 associated with individual member providers. The system server A112 may instruct the ACH bank server A120 to transfer funds from the member provider's account A124 to the member provider's member bank account server A122, with instructions to divert funds in the member provider's bank account A126. In summary, the funds are transferred from the account associated with the member provider A124 into the member provider's bank account A126. The system A100 may be notified by the ACH bank server A120 or the member bank account server A122 that the funds were successfully deposited in the member provider's account A126. The system A100 may then send notification to the member provider by a method the member provider has chosen (for example, email A108, fax A106, text A107, or displayed when a user associated with a member provider logs into the member web portal).

Figure 30:
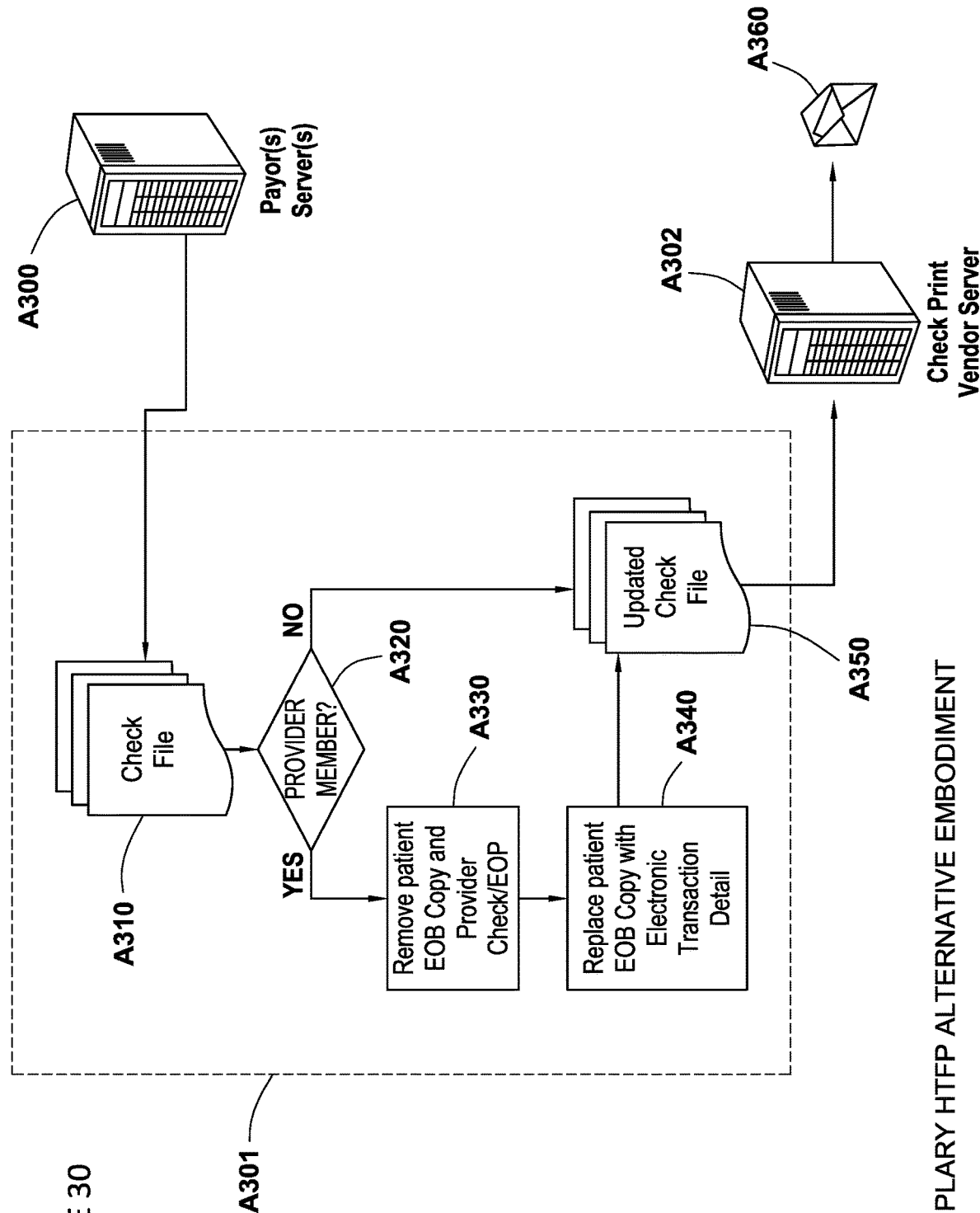

FIG. 30 depicts an exemplary process of obtaining and converting a data file intended for a printer to produce checks/EOBs and EOPS into an electronic payment file. The system A301 may provide a fully electronic payment settlement service to its provider members using various embodiments of the present invention, including, for example without limitation, a push payment to the provider's merchant account, direct transfers to the provider's bank account using the Automated Clearing House (ACH) network, though other suitable means for payment may also be used. Payor servers A300 may send check files directly to the system rather than to a check rendering vendor. The check file A310 format and any payor administrator's processes may be in any format from the payor server A300. The system A301 may import the check file A310 and compare providers' Tax Id Number (TIN), or other identifying information, in the check file A310 to a the member provider file A320, which may include information on current member providers such as TIN, to determine which claims are for payment to member providers versus non-member providers. If the payment is for a member provider, the check file A310 may be converted to an electronic payment file. If the member provider TIN is found in the check file A310, a payment to the member provider may be removed from the check file A310. The patient's EOB copy may be removed and/or adjusted to reflect electronic payment rather than check payment A330 and then replaced A340 with an EOB containing electronic transaction details. The remaining check file A350 containing non member payments and corrected patient EOB copies may be forward on to a check rendering vendor server A302 for normal printing and mailing A360. In some embodiments the updated check file A350 may be sent to the payor, and the payor may send the updated check file A350 to the check print vendor A302.

Figure 31:
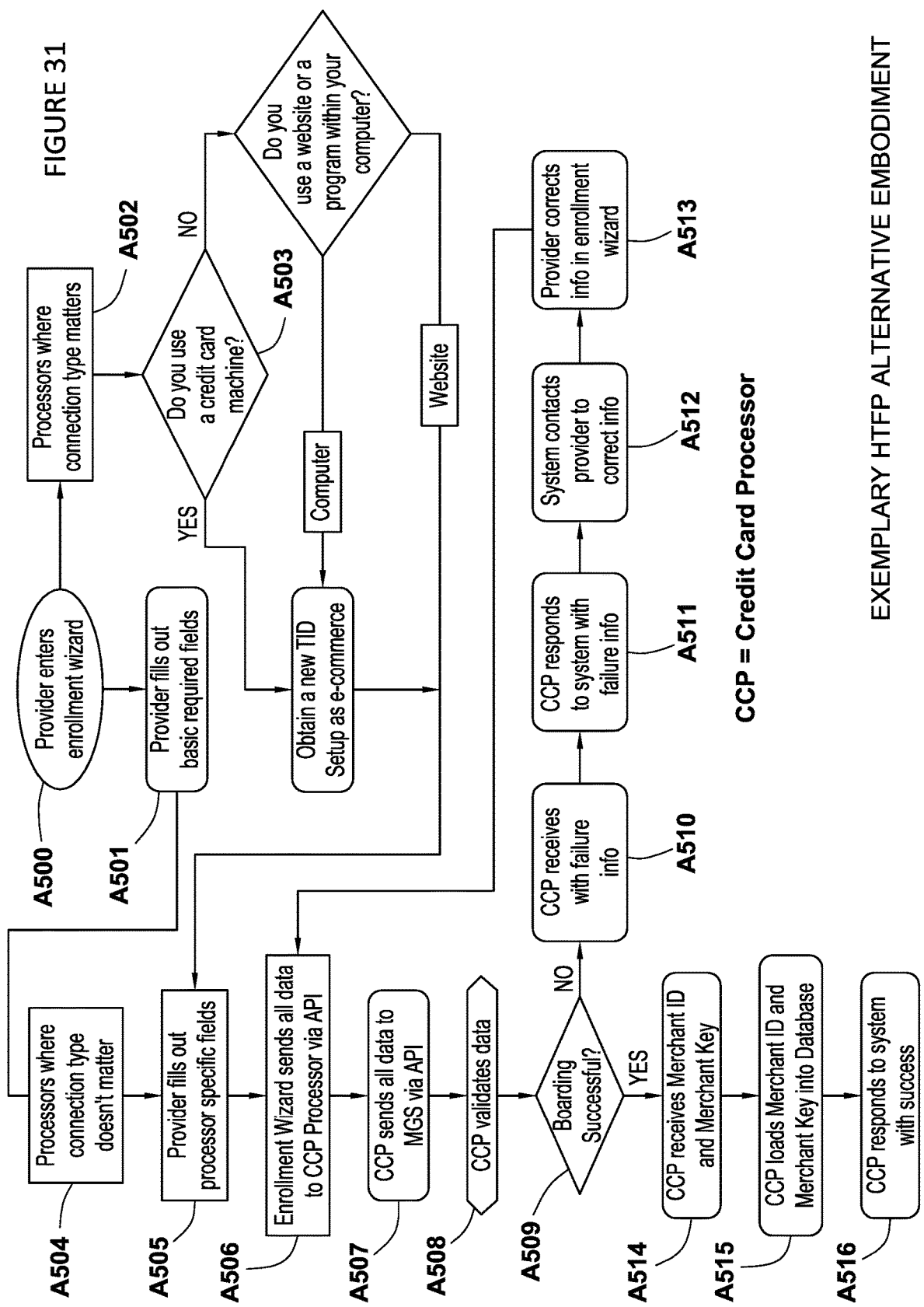

FIG. 31 depicts a process of enrollment wherein the member provider chooses to have his/her aggregated payments from payors pushed into the member provider's merchant account. The provider begins the enrollment process with the system by entering the enrollment wizard A500. If the connection type of the credit card processor used by the member provider matters A502 then the member provider selects whether the member provider uses a credit card machine A503. If the member does not accept credit cards at all, then he is routed to the ACH payment enrollment system. If the member provider uses a credit card machine then he is instructed to obtain a new Tax ID setup as e-commerce. If the member provider does not use a credit card machine then he is directed how to complete setup based on whether he uses a website or a computer program to accept credit card payments. If the member provider uses a program within the computer then he is instructed to obtain a new Tax ID setup for e-commerce. If the member provider uses a website, then he continues on in enrollment process to step A505 where he fills out processor specific fields. For member provider's whose credit card processors connection type doesn't matter, the member provider fills out basic required fields A501. Where a member provider's processor connection type does not matters A504, the member provider fills out processor specific fields A505. The enrollment wizard then send all the data it has collected from the member to the credit card processor, which may be located on the merchant bank's server, via API (application programming interface) A506. The credit card processor sends the data to a second tier processor via API at step A507. The credit card processor validates the data provided at step A508 and if the boarding is successful at step A509 then the credit card processor receives the Merchant ID and Merchant Key A514, loads the Merchant ID and Merchant Key into the Database A515 and the credit card processor responds to the system's server with success A516. If the Boarding was not successful at step A509, then the credit card processor receives notice of failure A510, the credit card processor responds to the system's server with failure info A511, the system's server contacts the member provider to correct the information provided during enrollment A512 and the member provider corrects the information entered in the enrollment wizard A513 and the enrollment wizard again sends the data to the credit card processor via API at A506 and the process continues as described above.

Figure 32:
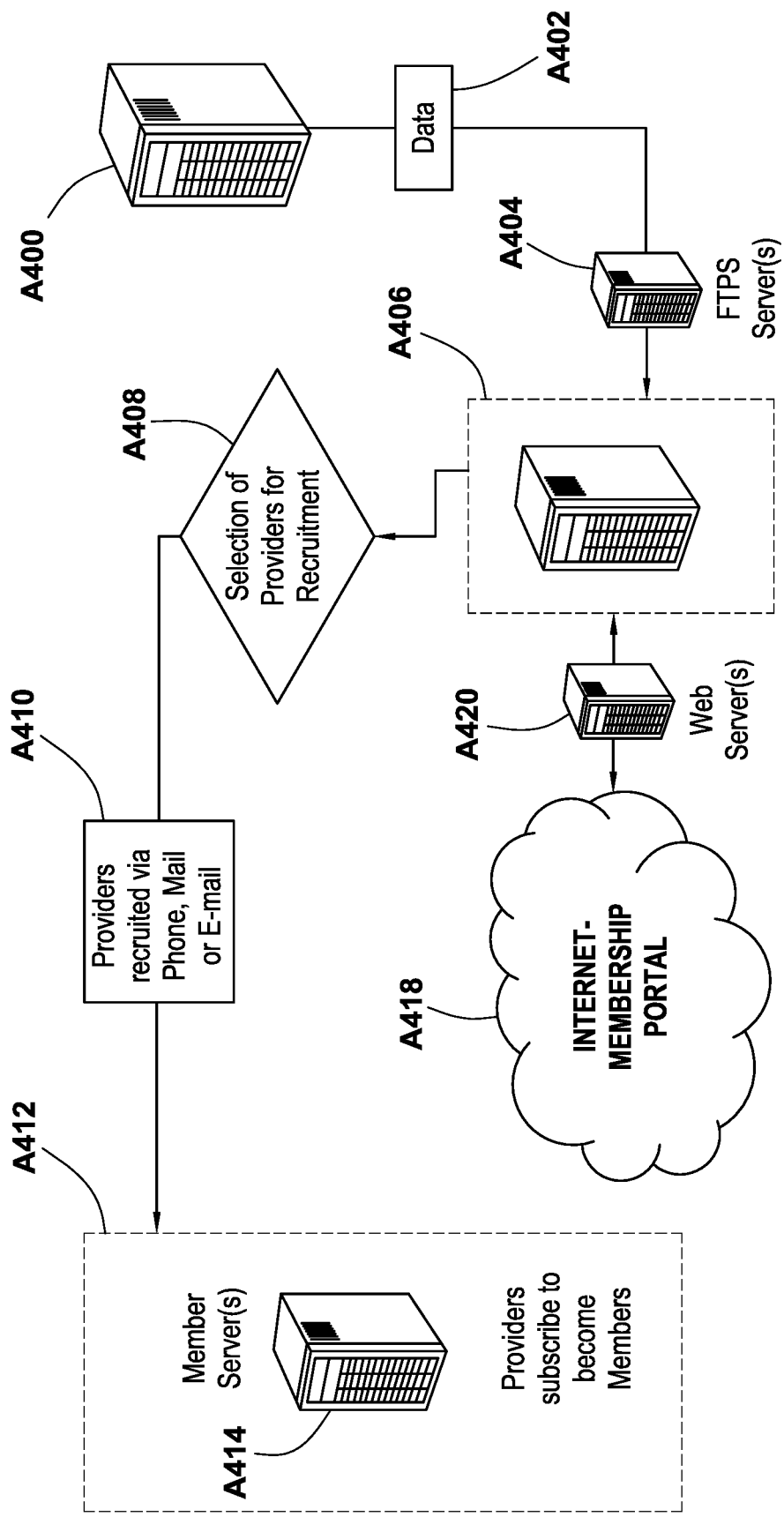

FIG. 32 depicts a membership recruitment process according to an embodiment of the invention. This process may enable the system A406 to recruit providers A412 who may then receive payments through the system A406 and/or have access to data and services provided by the system A406. Profiles of prospective member providers may be created by the system A406. Various payor servers A400 may provide data A402 detailing historical provider payments which may be imported into the system server A407 through the secure FTP server A404 or some other suitable channel. Other commercially available data may also be included when constructing the profile. Data A402 from some or all payor servers A400 may be aggregated. This data A402 may include summary data on frequency of historical payments, amounts of historical payments, and/or other relevant information. The data A402 may be used to select providers A412 for recruitment A408, and the data A402 may be used in recruitment materials.

Providers A412 who are current members and/or providers A412 who may have previously opted not to be member providers may be set aside by the system A406. In some embodiments, providers A412 who have opted out may be periodically selected for recruitment A408 and re-approached. The system A406 may select A408 providers A412 who have a relatively high frequency of payments over a dollar threshold. The frequency and/or dollar threshold may vary by marketing campaign. In some embodiments, other selection criteria may be used.

Once the providers A412 are selected for marketing A408, they may be contacted via a combination of various methods A410, for example by e-mail, mail via USPS or other carrier, telephone, and/or fax. Information presented in the recruitment process may include an Internet URL for the web portal A418. The web server A420 may also be used to recruit providers A412 using various web marketing techniques such as web blogs, random e-mail campaigns, search engine advertising, and/or the like. These web marketing techniques may direct the providers A412 to the web portal A418. A provider A412 may access the internet membership portal A418 to enroll in the system and become a member provider using the provider's server A414.

Figure 33:
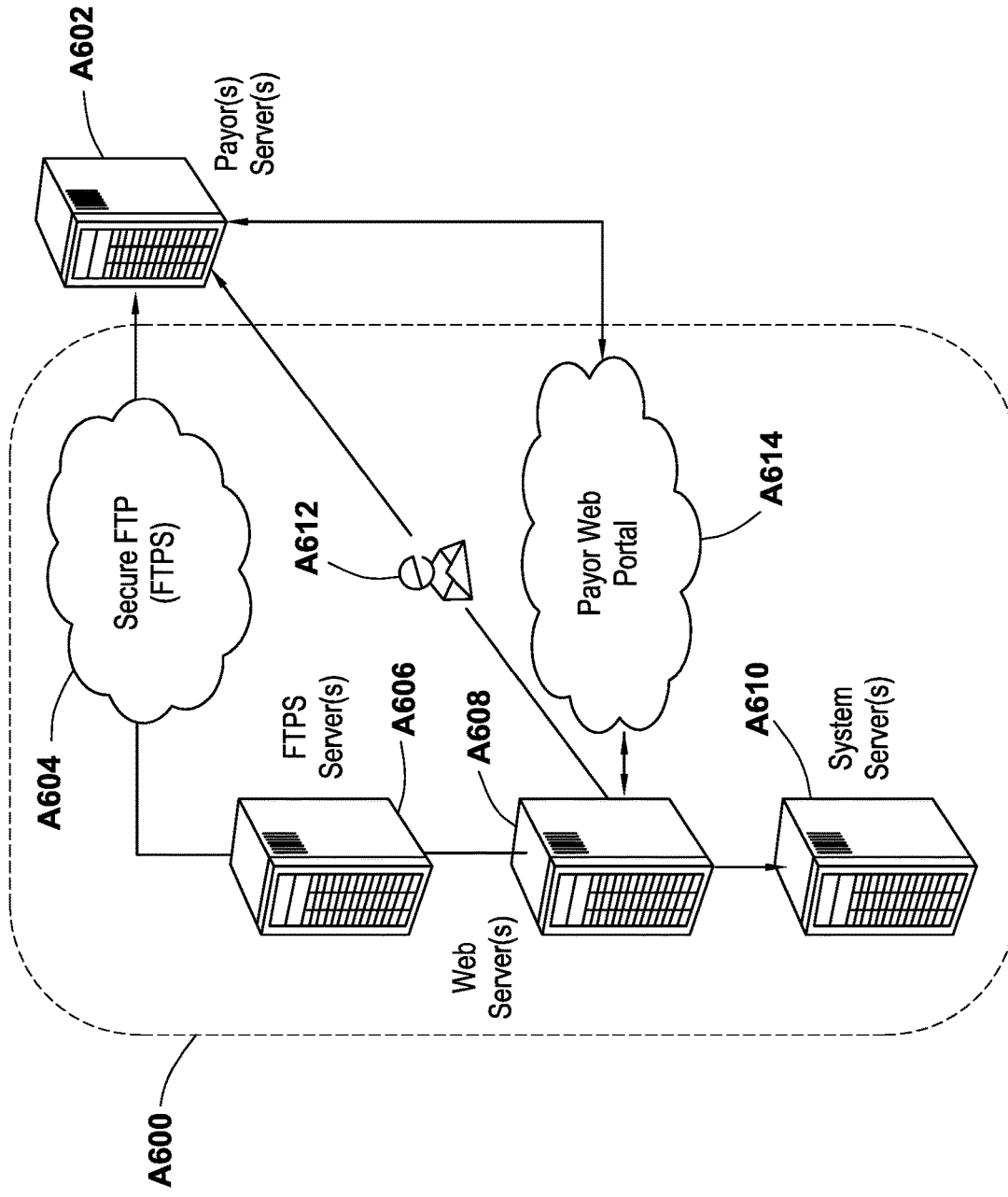

FIG. 33 depicts an exemplary process of reconciling payments to member providers. When a period's transactions have been aggregated, a payor server A602 reconciliation file may be created by the system A600. The period may be determined by the system A600, the payor, or the member provider. The reconciliation file may include the various electronic payments which are associated with checks replaced in a payor check print file. This reconciliation file may indicate which checks were replaced by an electronic payment with a reference to the electronic payment record. For example, if check number 8000 became an electronic payment, the file may contain the check number 8000 and the data receipt for the electronic payment and the corresponding amount paid. This reconciliation process may be provided in addition to an electronic file received by the payor bank displaying cleared checks. Based on the payor server A602 set up, the file may be made available to the payor server A602 through a secure FTP site A604 which may be maintained by the FTP server A606 and/or on the web portal A614 by webserver A608. The web portal A614 may be the same portal described above with respect to FIGS. 28-31, or it may be a separate portal. In some embodiments a secure email A612 may be sent to the payor server A602 indicating a file is available. In other embodiments the system server A310 may perform the actions of the web server A608 as described above.

HTFP Controller

Figure 11:
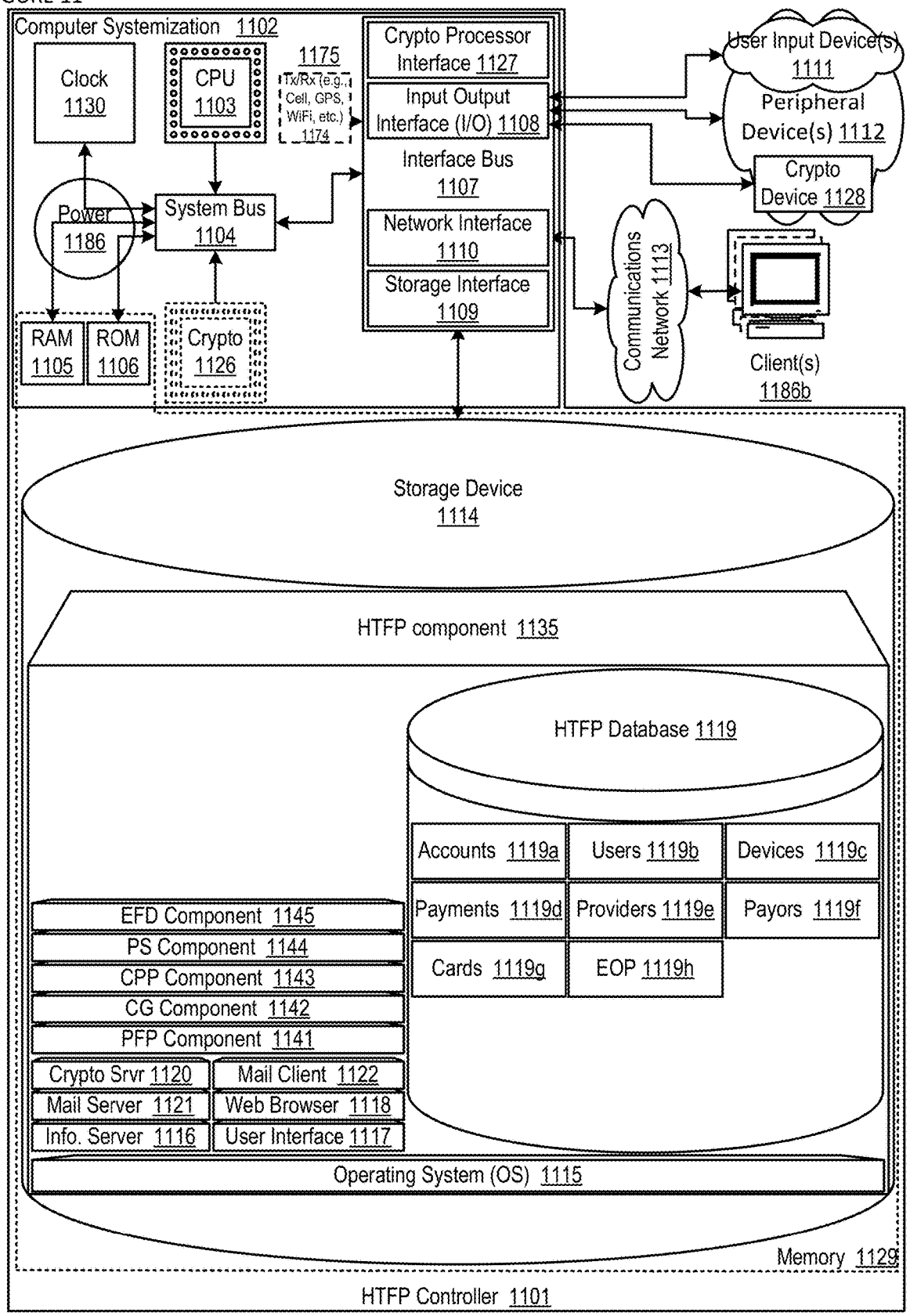
FIG. 11 shows a block diagram illustrating embodiments of a HTFP controller.

FIG. 11 shows a block diagram illustrating embodiments of a HTFP controller. In this embodiment, the HTFP controller 1101 may serve to aggregate, process, store, search, serve, identify, instruct, generate, match, and/or facilitate interactions with a computer through payment platforms technologies, and/or other related data.

Typically, users, which may be people and/or other systems, may engage information technology systems (e.g., computers) to facilitate information processing. In turn, computers employ processors to process information; such processors 1103 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1129 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the HTFP controller 1101 may be connected to and/or communicate with entities such as, but not limited to: one or more users from user input devices 1111; peripheral devices 1112; an optional cryptographic processor device 1128; and/or a communications network 1113.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The HTFP controller 1101 may be based on computer systems that may comprise, but are not limited to, components such as: a computer systemization 1102 connected to memory 1129.

Computer Systemization

A computer systemization 1102 may comprise a clock 1130, central processing unit ("CPU(s)" and/or "processor(s)" (these terms are used interchangeable throughout the disclosure unless noted to the contrary)) 1103, a memory 1129 (e.g., a read only memory (ROM) 1106, a random access memory (RAM) 1105, etc.), and/or an interface bus 1107, and most frequently, although not necessarily, are all interconnected and/or communicating through a system bus 1104 on one or more (mother)board(s) 1102 having conductive and/or otherwise transportive circuit pathways through which instructions (e.g., binary encoded signals) may travel to effectuate communications, operations, storage, etc. The computer systemization may be connected to a power source 1186; e.g., optionally the power source may be internal. Optionally, a cryptographic processor 1126 may be connected to the system bus. In another embodiment, the cryptographic processor and/or transceivers (e.g., ICs) 1174 may be connected as either internal and/or external peripheral devices 1112 via the interface bus I/O 1108 (not pictured) and/or directly via the interface bus 1107. In turn, the transceivers may be connected to antenna(s) 1175, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+ EDR, FM, etc.); a Broadcom BCM4750IUB8 receiver chip (e.g., GPS); a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); an Infineon Technologies X-Gold 618-PMB9800 transceiver chip (e.g., providing 2G/3G HSDPA/HSUPA communications); a MediaTek MT6620 transceiver chip (e.g., providing 802.11a/b/g/n, Bluetooth 4.0 LE, FM, global positioning system (GPS) (thereby allowing HTFP controller to determine its location); a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large mainframe computers, down to mini computers, servers, desktop computers, laptops, netbooks, tablets (e.g., iPads, Android and Windows tablets, etc.), mobile smartphones (e.g., iPhones, Android and Windows phones, etc.), wearable devise (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1129 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, etc.); ARM's application, embedded and secure processors; IBM and/or Motorola's DragonBall and PowerPC; IBM's and Sony's Cell processor; Intel's 80×86 series (e.g., 80386, 80486), Pentium, Celeron, Core (2) Duo, i series (e.g., i3, i5, i7, etc.), Itanium, Xeon, and/or XScale; Motorola's 680×0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the HTFP controller and beyond through various interfaces. Should processing requirements dictate a greater amount speed and/or capacity, distributed processors (e.g., Distributed HTFP), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the HTFP may be achieved by implementing a microcontroller such as CAST's R8051XC2 microcontroller; Intel's MCS 51 (i.e., 8051 microcontroller); and/or the like. Also, to implement certain features of the HTFP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the HTFP component collection (distributed or otherwise) and/or features may be implemented via the microprocessor and/or via embedded components; e.g., via ASIC, coprocessor, DSP, FPGA, and/or the like. Alternately, some implementations of the HTFP may be implemented with embedded components that are configured and used to achieve a variety of features or signal processing.

Depending on the particular implementation, the embedded components may include software solutions, hardware solutions, and/or some combination of both hardware/software solutions. For example, HTFP features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the HTFP features. A hierarchy of programmable interconnects allow logic blocks to be interconnected as needed by the HTFP system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the HTFP may be developed on regular FPGAs and then migrated into a fixed version that more resembles ASIC implementations. Alternate or coordinating implementations may migrate HTFP controller features to a final ASIC instead of or in addition to FPGAs. Depending on the implementation all of the aforementioned embedded components and microprocessors may be considered the "CPU" and/or "processor" for the HTFP.

Power Source

The power source 1186 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1186 is connected to at least one of the interconnected subsequent components of the HTFP thereby providing an electric current to all subsequent components. In one example, the power source 1186 is connected to the system bus component 1104. In an alternative embodiment, an outside power source 1186 is provided through a connection across the I/O 1108 interface. For example, a USB and/or IEEE 1394 connection carries both data and power across the connection and is therefore a suitable source of power.

Interface Adapters

Interface bus(ses) 1107 may accept, connect, and/or communicate to a number of interface adapters, conventionally although not necessarily in the form of adapter cards, such as but not limited to: input output interfaces (I/O) 1108, storage interfaces 1109, network interfaces 1110, and/or the like. Optionally, cryptographic processor interfaces 1127 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X), PCI Express, Personal Computer Memory Card International Association PCMCIA), and/or the like.

Storage interfaces 1109 may accept, communicate, and/or connect to a number of storage devices such as, but not limited to: storage devices 1114, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1110 may accept, communicate, and/ or connect to a communications network 1113. Through a communications network 1113, the HTFP controller is accessible through remote clients 1133*b* (e.g., computers with web browsers) by users 1133*a*. Network interfaces may employ connection protocols such as, but not limited to: direct connect, Ethernet (thick, thin, twisted pair 10/100/ 1000/10000 Base T, and/or the like), Token Ring, wireless connection such as IEEE 802.11a-x, and/or the like. Should processing requirements dictate a greater amount speed and/or capacity, distributed network controllers (e.g., Distributed HTFP), architectures may similarly be employed to pool, load balance, and/or otherwise decrease/increase the communicative bandwidth required by the HTFP controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 1110 may be used to engage with various communications network types 1113. For example, multiple network interfaces may be employed to allow for the communication over broadcast, multicast, and/or unicast networks.

Input Output interfaces (I/O) 1108 may accept, communicate, and/or connect to user input devices 1111, peripheral devices 1112, cryptographic processor devices 1128, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/ or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1111 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1112 may be connected and/or communicate to I/O and/or other facilities of the like such as network interfaces, storage interfaces, directly to the interface bus, system bus, the CPU, and/or the like. Peripheral devices may be external, internal and/or part of the HTFP controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the HTFP controller may be embodied as an embedded, dedicated, and/or monitor-less (i.e., headless) device, wherein access would be provided over a network interface connection.

Cryptographic units such as, but not limited to, microcontrollers, processors 1126, interfaces 1127, and/or devices 1128 may be attached, and/or communicate with the HTFP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 1129. However, memory is a fungible technology and resource, thus, any number of memory embodiments may be employed in lieu of or in concert with one another. It is to be understood that the HTFP controller and/or a computer systemization may employ various forms of memory 1129. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1129 will include ROM 1106, RAM 1105, and a storage device 1114. A storage device 1114 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 1129 may contain a collection of program and/or database components and/or data such as, but not limited to: operating system component(s) 1115 (operating system); information server component(s) 1116 (information server); user interface component(s) 1117 (user interface); Web browser component(s) 1118 (Web browser); database(s) 1119; mail server component(s) 1121; mail client component(s) 1122; cryptographic server component(s) 1120 (cryptographic server); the HTFP component(s) 1135; and/or the like (i.e., collectively a component collection). These components may be stored and accessed from the storage devices and/or from storage devices accessible through an interface bus. Although non-conventional program components such as those in the component collection, typically, are stored in a local storage device 1114, they may also be loaded and/or stored in memory such as: peripheral devices, RAM, remote storage facilities through a communications network, ROM, various forms of memory, and/or the like.

Operating System

The operating system component 1115 is an executable program component facilitating the operation of the HTFP controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the HTFP controller to communicate with other entities through a communications network 1113. Various communication protocols may be used by the HTFP controller as a subcarrier transport mechanism for interaction, such as, but not limited to: multicast, TCP/IP, UDP, unicast, and/or the like.

Information Server

An information server component 1116 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the HTFP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the HTFP database 1119, operating systems, other program components, user interfaces, Web browsers, and/or the like.

Access to the HTFP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the HTFP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the HTFP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome; Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 1117 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1118 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the HTFP enabled nodes. The combined application may be nugatory on systems employing standard Web browsers.

Mail Server

A mail server component 1121 is a stored program component that is executed by a CPU 1103. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the HTFP.

Access to the HTFP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1122 is a stored program component that is executed by a CPU 1103. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1120 is a stored program component that is executed by a CPU 1103, crypto-graphic processor 1126, cryptographic processor interface 1127, cryptographic processor device 1128, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the HTFP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the HTFP component to engage in secure transactions if so desired. The cryptographic component facilitates the secure accessing of resources on the HTFP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The HTFP Database

The HTFP database component 1119 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the HTFP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the HTFP database is implemented as a data-structure, the use of the HTFP database 1119 may be integrated into another component such as the HTFP component 1135. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1119 includes several tables 1119*a-h:*

An accounts table 1119*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 1119*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a HTFP);

A devices table 1119*c* includes fields such as, but not limited to: deviceID, accountID, assetIDs, paymentIDs, deviceType, deviceName, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, device Preferences, deviceRestrictions, and/or the like;

A payments table 1119*d* includes fields such as, but not limited to: payment_ID, payment_amount, provider_details, payor_details, TRN, accountID, userID, paymentType, paymentAccountNo, paymentAccountName, paymentAccountAuthorizationCodes, paymentExpirationDate, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

A providers table 1119*e* includes fields such as, but not limited to: provider_ID, provider_name, provider_phone, provider_address, provider_city, provider_state, provider_ZIPCode, provider_country, provider_bank_routing_number, provider_bank_account_number, provider_payments, delivery_preferences, provider_MID, provider_interchange_rate, acquirer_web_page, provider_virtual_terminal_ID, provider_virtual_terminal_password, and/or the like;

A payors table 1119*f* includes fields such as, but not limited to: payor_ID, payor_name, payor_phone, payor_address, payor_city, payor_state, payor_ZIPCode, payor_country, payor_bank_routing_number, payor_bank_account_number, payor_payments, delivery_preferences, payor_MID, payor_interchange_rate, and/or the like;

A cards table 1119*g* includes fields such as, but not limited to: card_ID, card_number, card_amount, CVV_code, payment_date, expiration date, valid_MCCs, card_payment_network, card_interchange_rate, TRN, provider_ID, payor_ID, payment_ID, and/or the like;

An EOP table 1119*h* includes fields such as, but not limited to: EOP_FileID, TRN, payment_amount, claim_number, date_of_service, patient_identifier, amount_billed, discount_amount, deductible_amount, coinsurance_amount, allowed_payment_amount, reason_codes, delivery_preferences, provider_ID, payor_ID, payment_ID, and/or the like.

In one embodiment, the HTFP database may interact with other database systems. For example, employing a distributed database system, queries and data access by search HTFP component may treat the combination of the HTFP database, an integrated data security layer database as a single database entity.

In one embodiment, user programs may contain various user interface primitives, which may serve to update the HTFP. Also, various accounts may require custom database tables depending upon the environments and the types of clients the HTFP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1119*a-h*. The HTFP may be configured to keep track of various settings, inputs, and parameters via database controllers.

The HTFP database may communicate to and/or with other components in a component collection, including itself, and/or facilities of the like. Most frequently, the HTFP database communicates with the HTFP component, other program components, and/or the like. The database may contain, retain, and provide information regarding other nodes and data.

The HTFPs

The HTFP component 1135 is a stored program component that is executed by a CPU. In one embodiment, the HTFP component incorporates any and/or all combinations of the aspects of the HTFP that was discussed in the previous figures. As such, the HTFP affects accessing, obtaining and the provision of information, services, transactions, and/or the like across various communications networks. The features and embodiments of the HTFP discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the HTFP's features and facilities, and in many cases reduce the costs, energy consumption/requirements, and extend the life of HTFP's underlying infrastructure; this has the added benefit of making the HTFP more reliable. Similarly, many of the features and mechanisms are designed to be easier for users to use and access, thereby broadening the audience that may enjoy/employ and exploit the feature sets of the HTFP; such ease of use also helps to increase the reliability of the HTFP. In addition, the feature sets include heightened security as noted via the Cryptographic components 1120, 1126, 1128 and throughout, making access to the features and data more reliable and secure The HTFP transforms payment file and EOP data inputs, via HTFP components (e.g., PFP, CG, CPP, PS, EFD), into ACH request, card generation request, card payment request, ACH CCD+ request, and EOP file outputs.

The HTFP component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the HTFP server employs a cryptographic server to encrypt and decrypt communications. The HTFP component may communicate to and/or with other components in a component collection, including itself, and/or facilities of the like. Most frequently, the HTFP component communicates with the HTFP database, operating systems, other program components, and/or the like. The HTFP may contain, communicate, generate, obtain, and/or provide program component, system, user, and/or data communications, requests, and/or responses.

Distributed HTFPs

The structure and/or operation of any of the HTFP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the HTFP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the HTFP controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for Healthcare Transaction Facilitation Platform Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a HTFP individual and/or enterprise user, database configuration and/or relational model, data type, data transmission and/or network framework, syntax structure, and/or the like, various embodiments of the HTFP, may be implemented that enable a great deal of flexibility and customization. For example, aspects of the HTFP may be adapted for processing dental payments, processing payments from customers (e.g., Home Depot) to suppliers (e.g., hammer manufacturers), and/or the like. While various embodiments and discussions of the HTFP have included payment platforms, however, it is to be understood that the embodiments described herein may be readily configured and/or customized for a wide variety of other applications and/or implementations.

What is claimed is:

1. A payment processing apparatus, comprising:
a memory;
a component collection in the memory, including:
 a card generating component, and
 a card payment processing component;
 a payment settling component;
a processor disposed in communication with the memory, and configured to issue a plurality of processing instructions from the component collection stored in the memory,
 wherein the processor issues instructions from the payment settling component, stored in the memory, to:
  receive a payment settling request datastructure via the payment settling component;
  determine, via processor, an ACH CCD+ payment amount and an ACH CCD+ re-association trace number by parsing the payment settling request, wherein the re-association trace number links an EFT payment with an EOP data file; and
  provide, via a network, an ACH CCD+ payment request;
 wherein the processor issues instructions from the card generating component, stored in the memory, to:
  obtain a request to generate a payment card datastructure associated with the ACH CCD+ payment request to a provider via the card generating component via a network, wherein the request to generate a payment card datastructure is a request configured to generate the creation of a new payment card, and wherein the new payment card is any of: debit card, credit card, virtual debit card, virtual credit card, reloadable debit card, one-time credit card, one-time debit card;
  determine, via processor, a payment amount and a re-association trace number by parsing the card generation request;
  generate, via processor, a payment card datastructure for the payment;
  associate, via processor, the payment card datastructure with the payment amount and the re-association trace number; and
  send, via processor, a card payment processing request associated with the card;
 wherein the processor issues instructions from the card payment processing component, stored in the memory, to:
  obtain the card payment processing request via the card payment processing component;
  generate, via processor, a Level 3 card payment request datastructure, wherein the Level 3 card payment request datastructure includes the payment amount and the re-association trace number;
  determine, via processor, a payment request route associated with the card; and
  pushing, via a network, the Level 3 card payment request datastructure via the determined payment request route.

2. The apparatus of claim 1, further, comprising:
 the processor issues instructions from the card generating component, stored in the memory, to:
  configure the payment card datastructure to be usable with a specified set of allowed Merchant Category Codes.

3. The apparatus of claim 1, wherein the payment card datastructure involves a single use card.

4. The apparatus of claim 3, wherein generating the payment card datastructure includes generating a card number, a CVV, and an expiration date for the card.

5. The apparatus of claim 1, wherein the payment card datastructure involves a reloadable card.

6. The apparatus of claim 5, wherein generating the payment card datastructure includes generating a card number, a CVV, and an expiration date for the card.

7. The apparatus of claim 6, wherein generating the payment card datastructure includes incrementing the CVV for a card to generate a unique identifier for the payment.

8. The apparatus of claim 6, wherein generating the payment card datastructure includes incrementing the expiration date for a card to generate a unique identifier for the payment.

9. The apparatus of claim 1, wherein the payment request route is one of: an acquirer, a payment network, and a virtual terminal.

10. The apparatus of claim 1, wherein the Level 3 card payment request datastructure is sent from an issuer's server to a payment network's server.

11. The apparatus of claim 1, wherein the Level 3 card payment request datastructure is sent from an issuer's server to an acquirer's server.

12. The apparatus of claim 11, wherein the acquirer's server calculates an interchange rate associated with a card based on the provider's merchant identifier.

13. The apparatus of claim 11, wherein the issuer and the acquirer are the same entity.

14. The apparatus of claim 1, further, comprising:
 the processor issues instructions from the card payment processing component, stored in the memory, to:
  calculate an interchange rate associated with a card based on the provider's merchant identifier.

15. The apparatus of claim 1, wherein
the processor issues instructions from the payment settling component, stored in the memory, to: send, via a network, an ACH CCD+ payment request, wherein the ACH CCD+ payment request includes the ACH CCD+ payment amount and the ACH CCD+ re-association trace number.

16. The apparatus of claim 15, wherein the ACH CCD+ payment amount is the payment amount less a fee, and wherein the ACH CCD+ re-association trace number is the re-association trace number.

17. The apparatus of claim 15, further, comprising:
the processor issues instructions from the payment settling component, stored in the memory, to:
update the provider's virtual terminal with details regarding the payment, wherein the details include the ACH CCD+ payment amount and the ACH CCD+ re-association trace number.

18. The apparatus of claim 1, further, comprising:
an EOP file delivering component in the component collection, and
the processor issues instructions from the EOP file delivering component, stored in the memory, to:
select an EOP file associated with the re-association trace number;
determine the provider's EOP file delivery preferences; and
deliver the EOP file per the provider's EOP file delivery preferences.

19. The apparatus of claim 18, wherein the EOP file delivery preferences include one of: FTP, email, clearinghouse, and provider pick-up.

20. The apparatus of claim 18, wherein the EOP file is delivered within a specified time of the card generation request being sent.

21. The apparatus of claim 1, wherein the payment is one of the plurality of payments in a batch of payments that are processed in aggregate.

* * * * *